(12) United States Patent
Sato

(10) Patent No.: US 8,031,409 B2
(45) Date of Patent: Oct. 4, 2011

(54) IMAGING LENS, OPTICAL DEVICE THEREOF, AND METHOD FOR MANUFACTURING IMAGING LENS

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 217 days.

(21) Appl. No.: 12/328,257

(22) Filed: Dec. 4, 2008

(65) Prior Publication Data

US 2009/0190220 A1 Jul. 30, 2009

(30) Foreign Application Priority Data

Jan. 22, 2008 (JP) ................................. 2008-011078
Jun. 23, 2008 (JP) ................................. 2008-162705

(51) Int. Cl.
*G02B 15/14* (2006.01)
(52) U.S. Cl. ........................................ 359/676; 359/766
(58) Field of Classification Search .......... 359/676–679, 359/683–685, 754–757, 763, 764, 766
See application file for complete search history.

(56) References Cited

U.S. PATENT DOCUMENTS

| | | | |
|---|---|---|---|
| 6,025,962 A | 2/2000 | Suzuki | |
| 6,035,145 A | 3/2000 | Kanai | |
| 6,246,833 B1 | 6/2001 | Harada | |
| 7,218,457 B2 | 5/2007 | Sensui | |
| 2002/0131173 A1 | 9/2002 | Misaka | |
| 2003/0103268 A1* | 6/2003 | Nishikawa et al. | ........... 359/683 |
| 2006/0066951 A1 | 3/2006 | Sensui | |
| 2006/0256453 A1* | 11/2006 | Endo | .............................. 359/754 |
| 2008/0225406 A1 | 9/2008 | Wada | |

FOREIGN PATENT DOCUMENTS

| | | |
|---|---|---|
| EP | 1 843 187 A | 10/2007 |
| JP | 2001-272601 A | 10/2001 |
| JP | 2006-106112 A | 4/2006 |

* cited by examiner

*Primary Examiner* — Darryl J Collins
(74) *Attorney, Agent, or Firm* — Miles & Stockbridge P.C.

(57) ABSTRACT

An imaging lens includes at least a first positive lens group, a first negative lens group that moves during focusing, a second positive lens group that moves during focusing, a second negative lens group that can move in a direction substantially vertical to an optical axis, and a positive lens group, which are disposed in order from an object, wherein a condition of an expression, which is $2.0<(-f4)/d34<20.8$, is satisfied, where f4 is a focal length of the second negative lens group (vibration proof group) that can move in a direction substantially vertical to the optical axis, and d34 is an air distance on the optical axis upon focusing on infinity, between a lens surface disposed closest to an image of a lens group (the second positive lens group in the case of this embodiment) which is disposed to an object side of the second negative lens group that can move in a direction substantially vertical to the optical axis, and a lens surface disposed closest to the object of the negative lens group that can move in a direction substantially vertical to the optical axis.

28 Claims, 44 Drawing Sheets

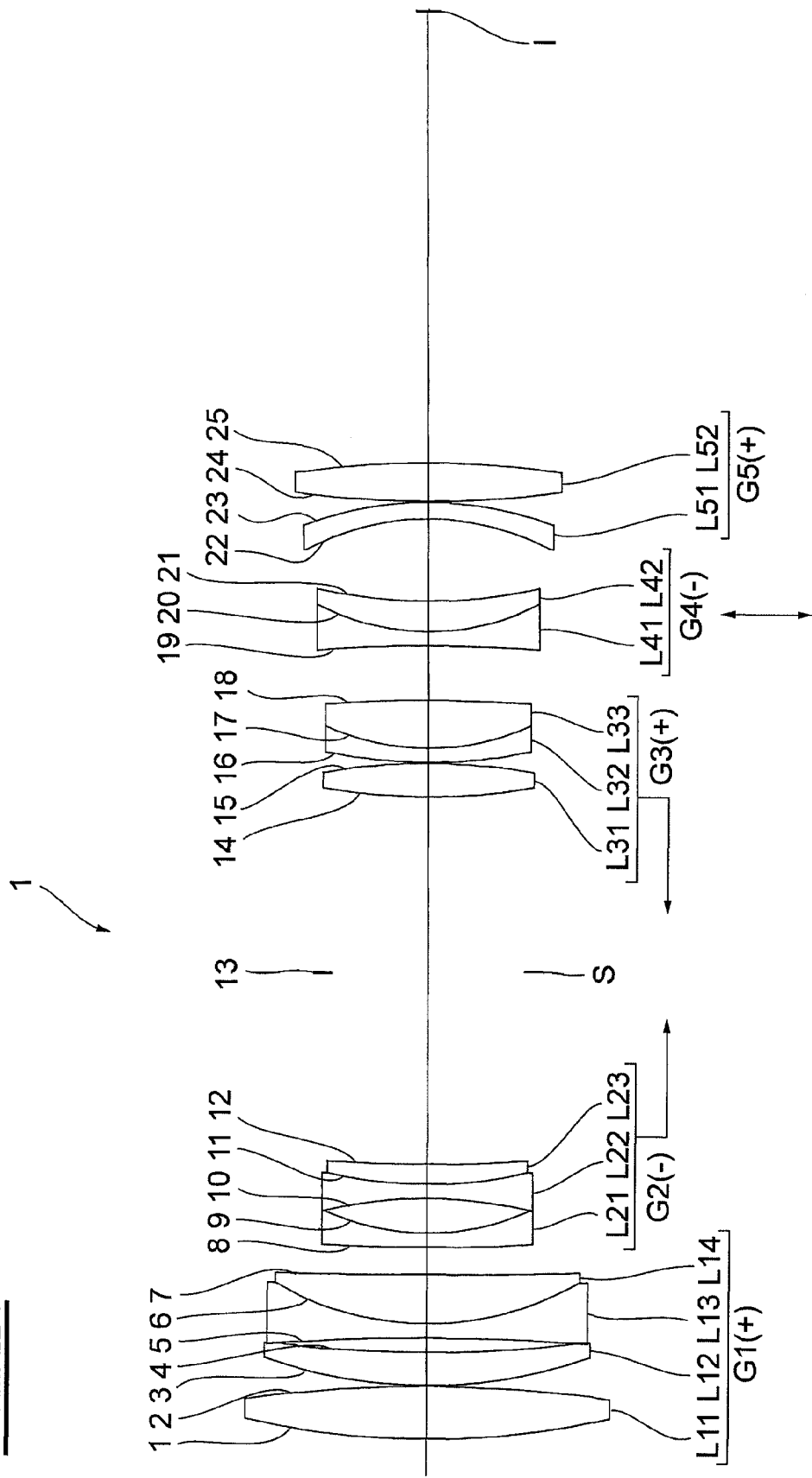

COMA ABERRATION

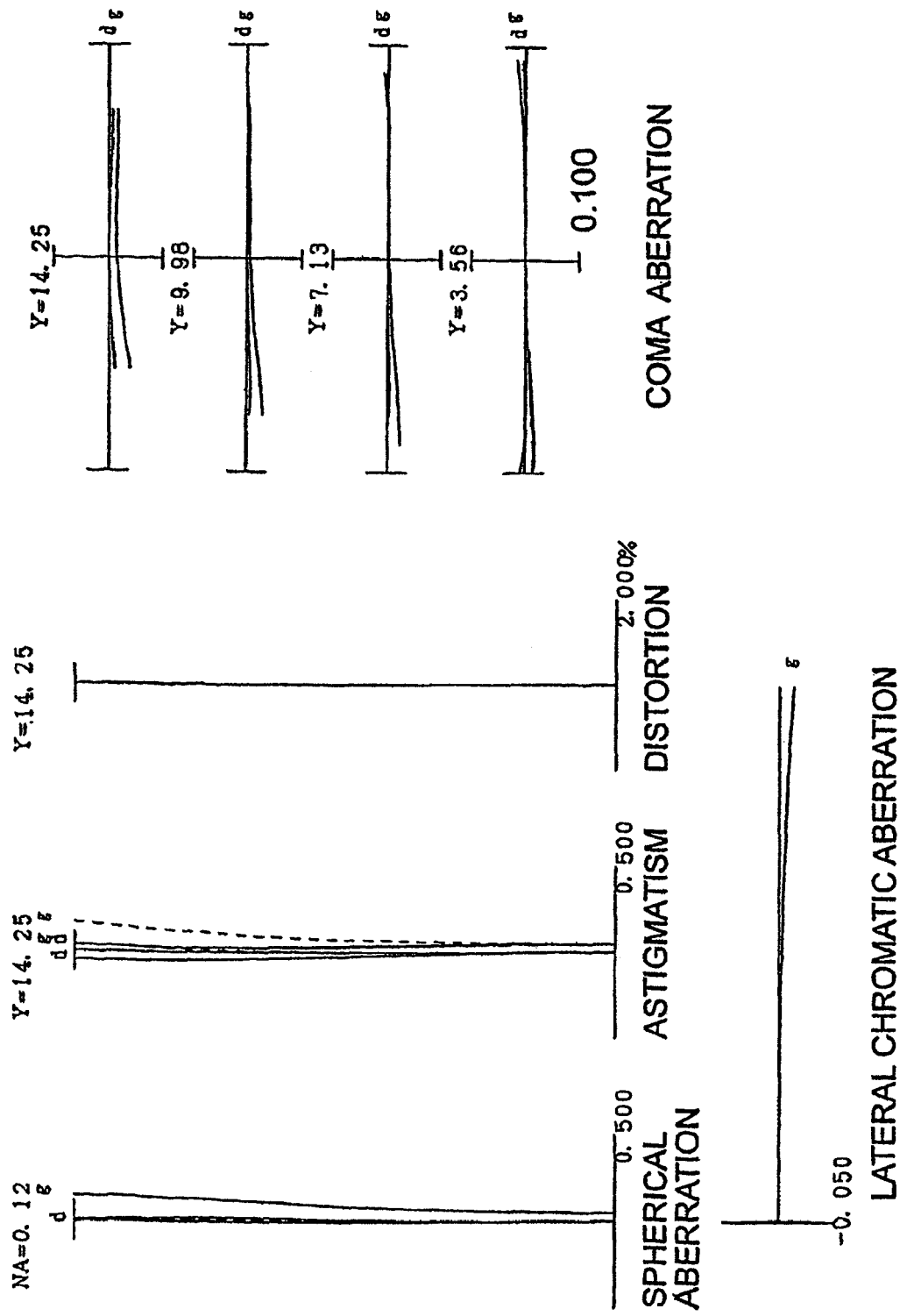

COMA ABERRATION

COMA ABERRATION

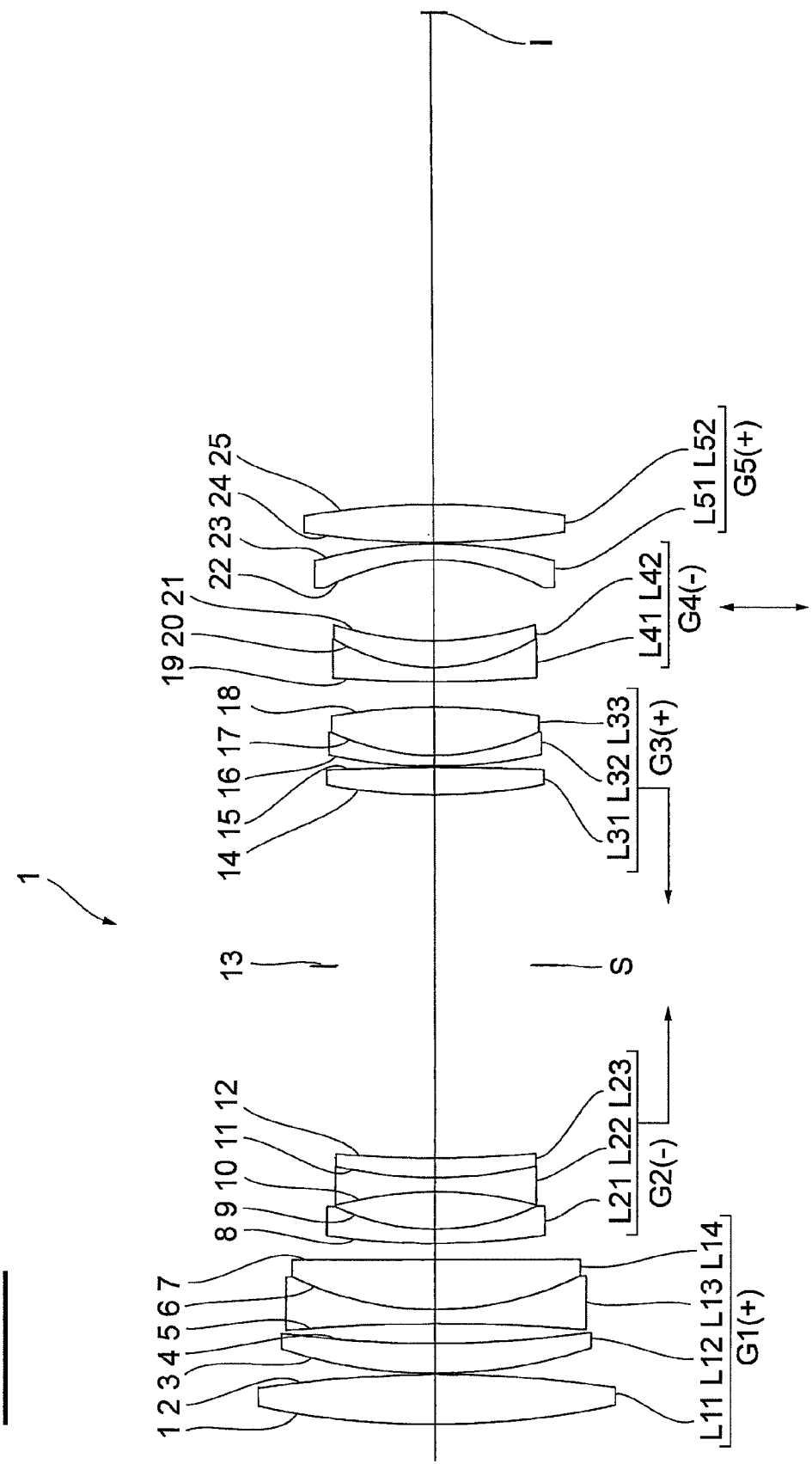

COMA ABERRATION

COMA ABERRATION

COMA ABERRATION

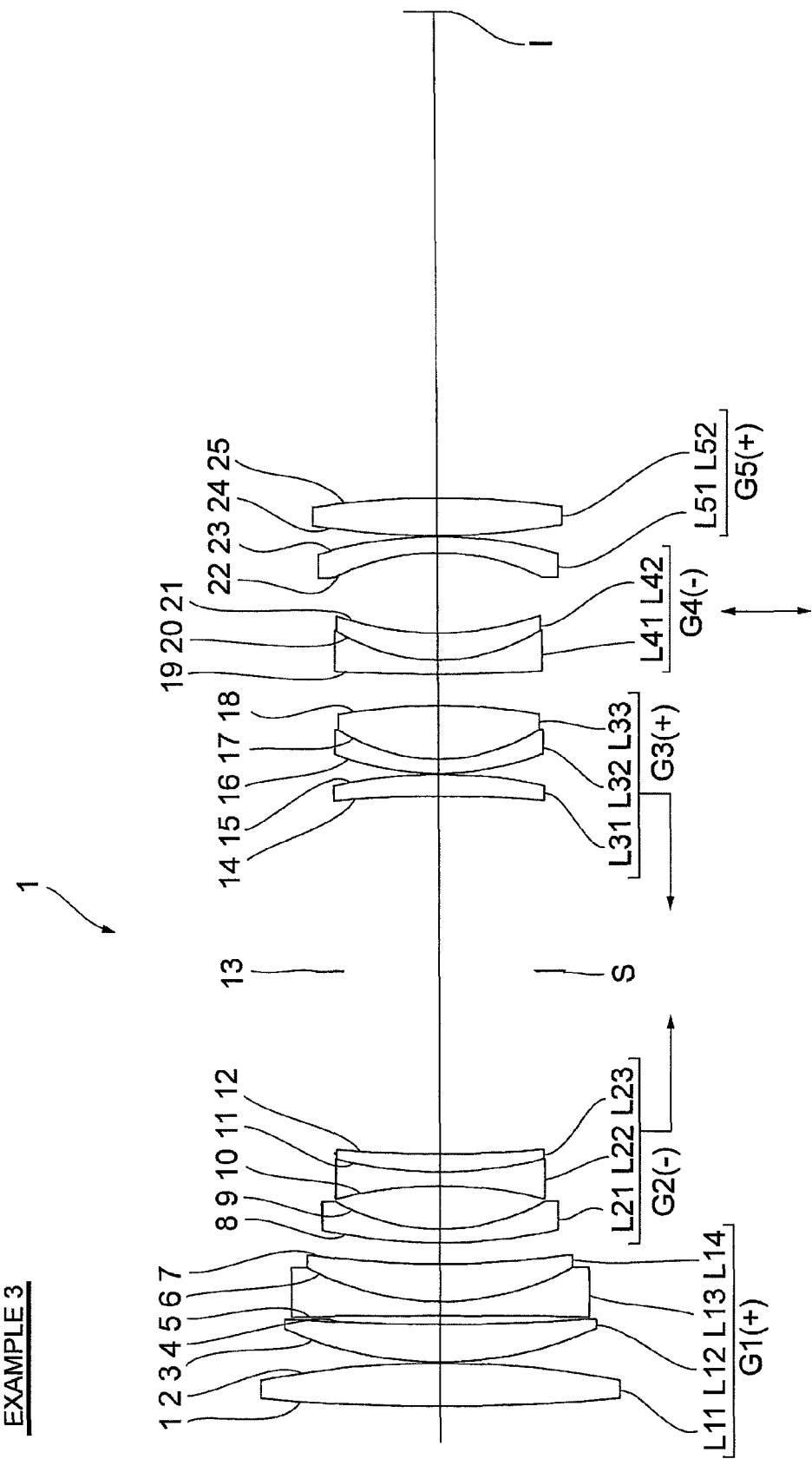

COMA ABERRATION

COMA ABERRATION

COMA ABERRATION

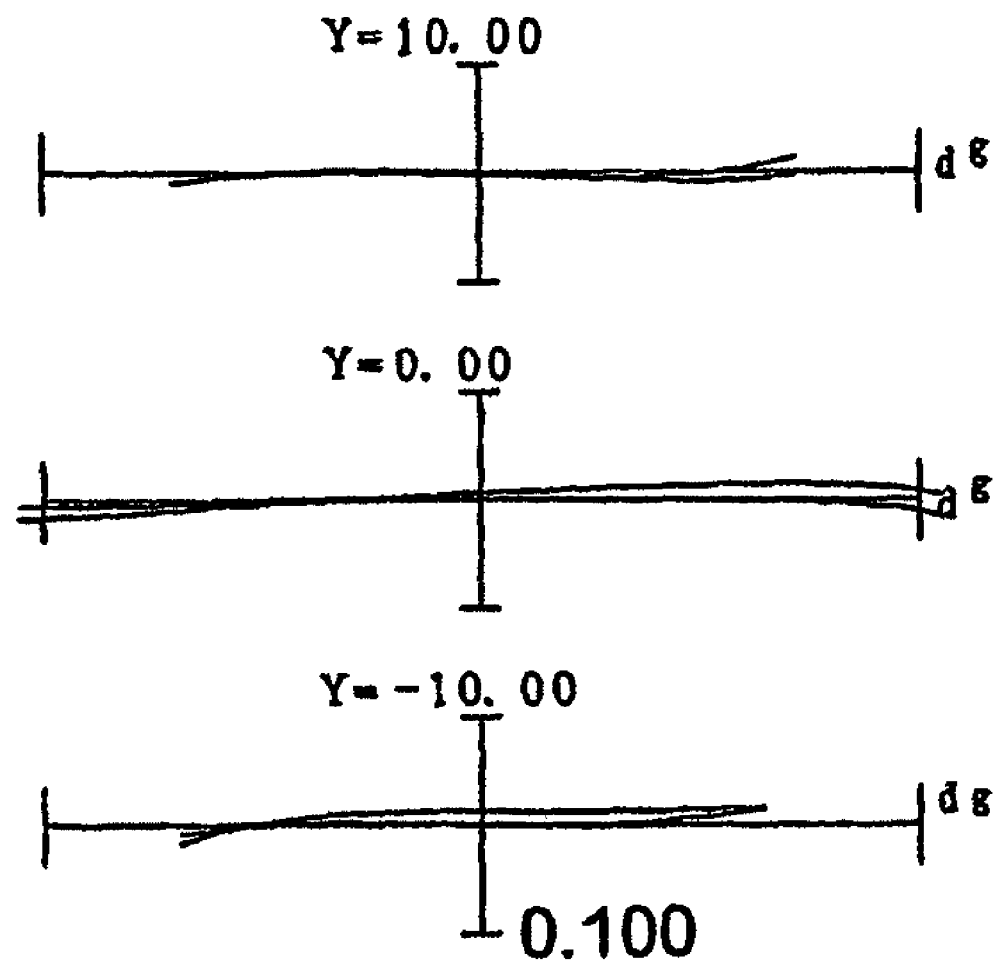

COMA ABERRATION

COMA ABERRATION

EXAMPLE 5

LATERAL ABERRATION

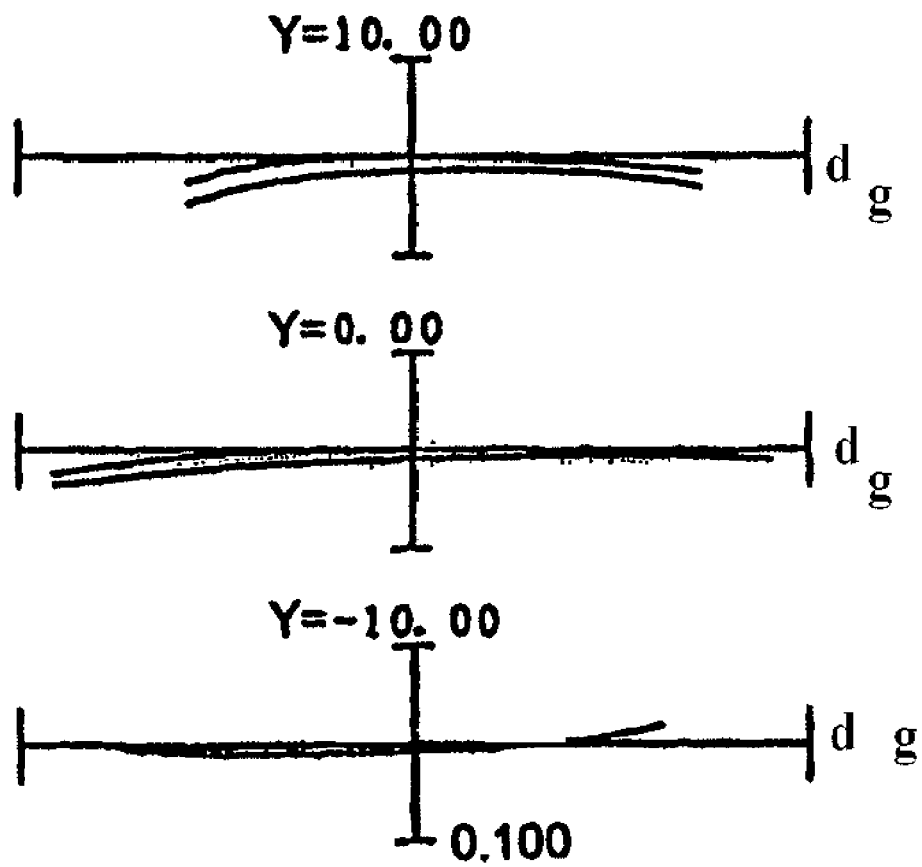

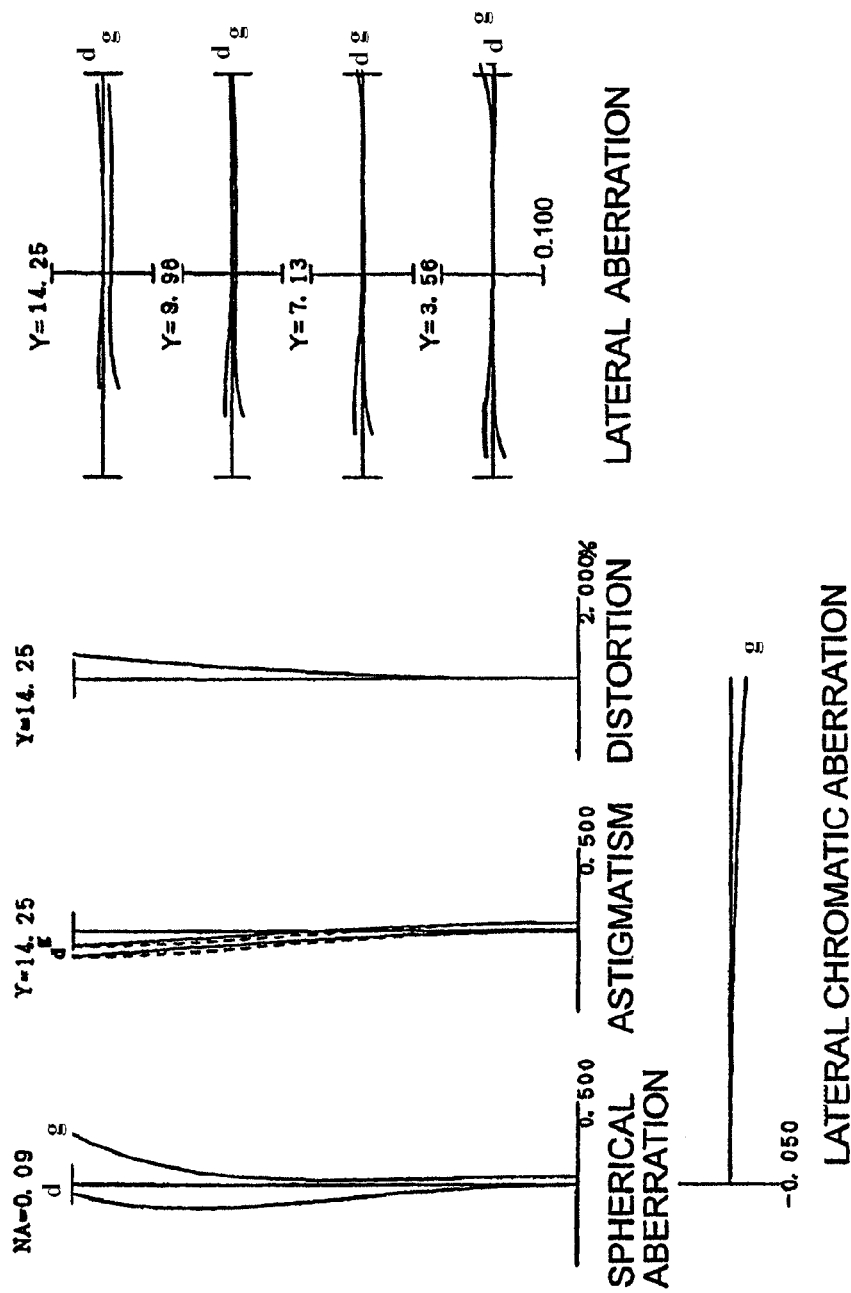

LATERAL ABERRATION

EXAMPLE 6

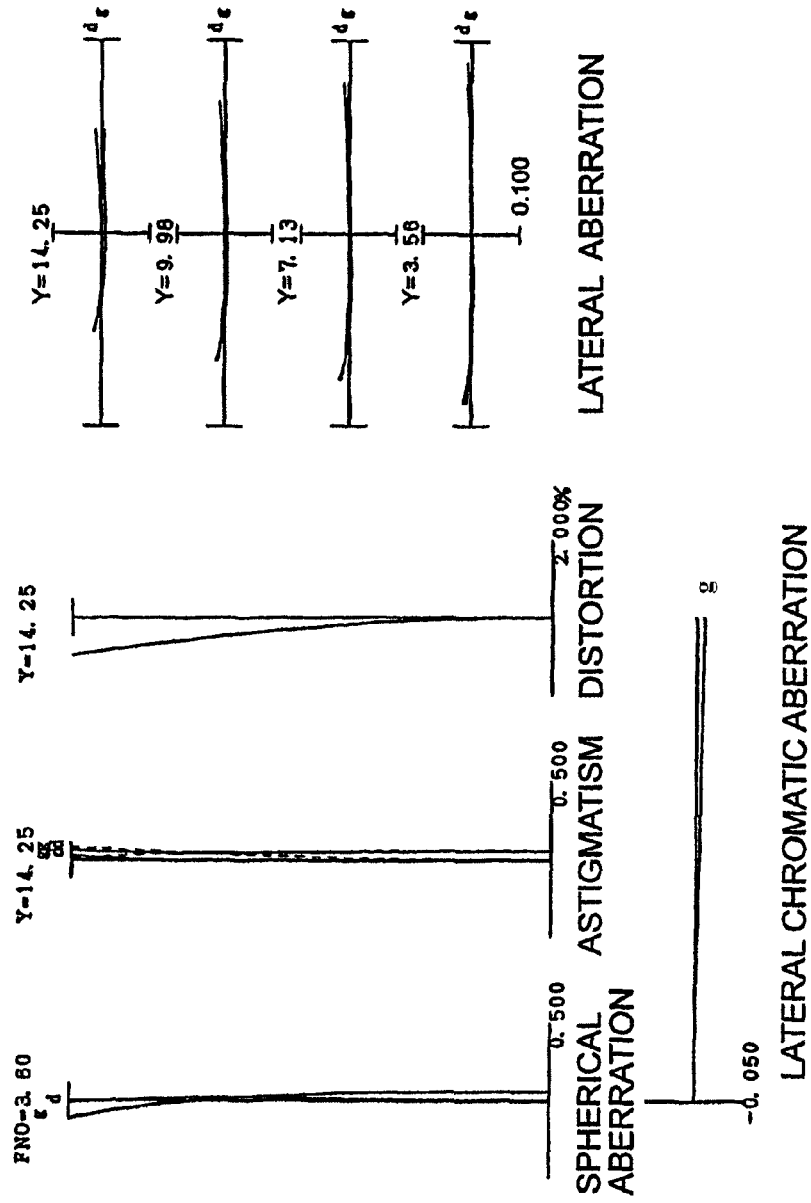

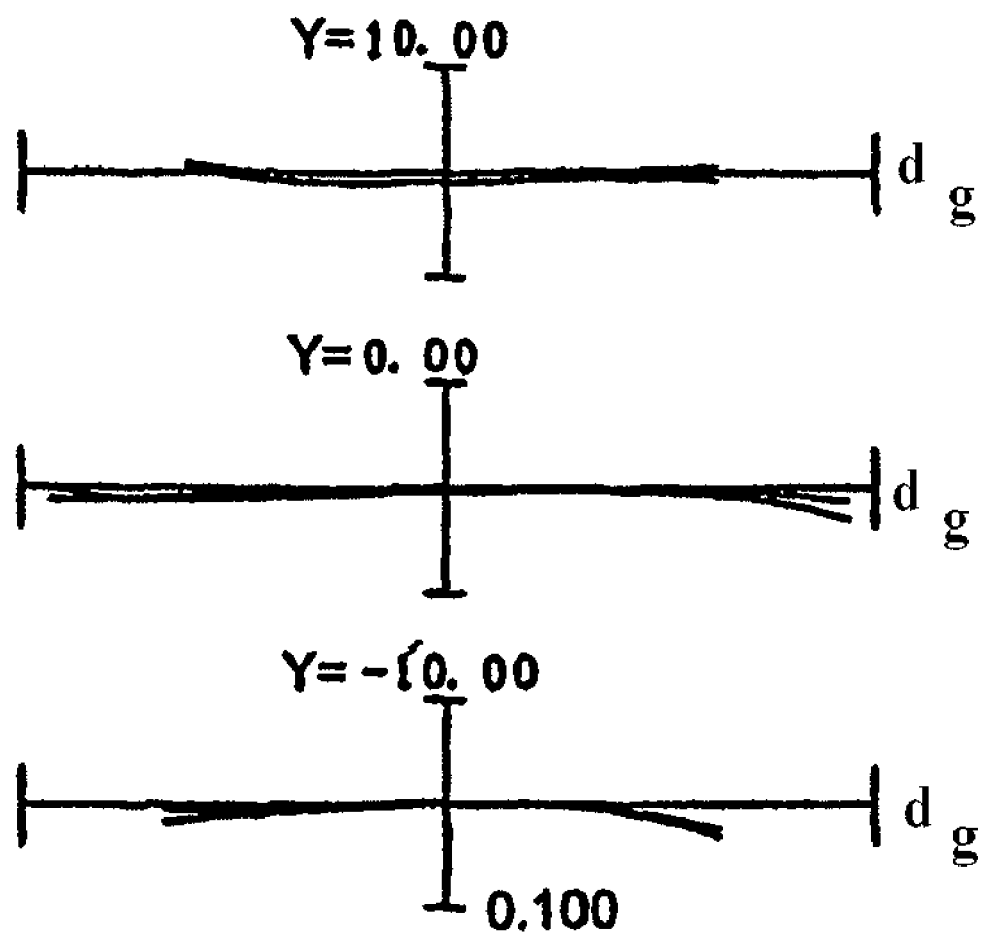

LATERAL ABERRATION

LATERAL ABERRATION

IMAGING LENS, OPTICAL DEVICE THEREOF, AND METHOD FOR MANUFACTURING IMAGING LENS

INCORPORATION BY REFERENCE

This invention claims the benefit of Japanese Patent Applications No. 2008-011078 and No. 2008-162705 which are hereby incorporated by reference.

FIELD OF THE INVENTION

The present invention relates to an imaging lens suitable for a digital single-lens reflex camera, film camera and video camera, an optical device in which this imaging lens is installed, and a method for manufacturing the imaging lens.

BACKGROUND OF THE INVENTION

An internal focus type macro lens having an image blur correction function has been proposed (e.g. Japanese Patent Application Laid-Open No. 2006-106112). The lens disclosed in Japanese Patent Application Laid-Open No. 2006-106112 has a first lens group having a positive refractive power, a second lens group having a negative refractive power, a third lens group having a positive refractive power, and a fourth lens group having a negative refractive power, which are disposed in order from an object, where the fourth lens group is comprised of a negative pre-group and a positive post-group, which are disposed in order from the object, and image blur is corrected when the optical system is vibrated, by shifting the pre-group in a direction substantially vertical to the optical axis in accordance with the vibration of the optical system (or the imaging lens).

Problems to be Solved by the Invention

However in the case of a conventional lens, the entire lens system is relatively large, and the lens group to be moved for image blur correction is also relatively large. The moving distance of the lens group for blur correction (which is referred as "vibration proof" hereinafter) for vibration proofing is also long, which increases the size of the entire lens (or the size of the entire lens system). It is also demanded that performance for correction aberrations is improved.

SUMMARY OF THE INVENTION

With the foregoing in view, it is an object of the present invention to provide an imaging lens which is compact and has high performance with less aberration fluctuations, an optical device in which this imaging lens is installed, and a manufacturing method for the imaging lens.

An imaging lens of the present invention comprises at least a positive lens group, a negative lens group that moves during focusing, a positive lens group that moves during focusing, a negative lens group that can move in a direction substantially vertical on an optical axis, and a positive lens group, which are disposed in order from an object, and satisfies a condition of a following expression $$2.0<(-f4)/d34<20.8$$

where f4 is a focal length of the negative lens group that can move in a direction substantially vertical to an optical axis, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above imaging lens, it is preferable that a condition of the following expression $$1.0<f5/d34<41.4$$

is satisfied, where f5 is a focal length of the positive lens group which is disposed to an image side of the negative lens group that can move in a direction substantially vertical to the optical axis, and d34 is an air distance on the optical axis upon focusing on infinity, between a lens surface disposed closest to an image side of a lens group which is disposed to an object side of the negative lens group that can move in a direction substantially vertical to the optical axis, and a lens surface disposed closest to the object side of the negative lens group that can move in a direction substantially vertical to the optical axis.

In the imaging lens, it is preferable that a condition of the following expression $$1.0<f3/d34<20.0$$

is satisfied, where f3 is a focal length of the positive lens group that moves during focusing, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above imaging lens, it is preferable that a condition of the following expression $$1.0<(-f2)/d34<17.0$$

is satisfied, where f2 is a focal length of the negative lens group that moves during focusing, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above imaging lens, it is preferable that a condition of the following expression $$1.0<f1/d34<23.0$$

is satisfied, where f1 is a focal length of the positive lens group that is disposed closest to the object, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above imaging lens, it is preferable that the negative lens group that moves during focusing comprises a negative lens and a cemented lens formed by a negative lens and a positive lens, which are disposed in order from the object.

In the above imaging lens, it is preferable that the negative lens group that moves during focusing comprises a single lens having a negative refractive power, and a cemented lens formed by a negative lens and a positive lens, which are disposed in order from the object, and a condition of the following expression $$-5.0 < (rb+ra)/(rb-ra) \leq -1.0$$

is satisfied, where ra is a radius of curvature of an object side surface of the single lens having the negative refractive power, and rb is a radius of curvature of an image side surface of the single lens having the negative refractive power.

In the above imaging lens, it is preferable that a condition of the following expression $$1.48 < N2nav < 1.65$$

is satisfied, where N2nav is an average refractive index with respect to the d-line of all the negative lenses included in the negative lens group that moves during focusing.

Another imaging lens according to the present invention comprises at least a positive lens group, a negative lens group that moves during focusing, a positive lens group that moves during focusing, a negative lens group that can move so as to have a movement component in a direction substantially vertical to an optical axis, and a positive lens group, which are disposed in order from an object, and satisfies a condition of the following expression $$1.21 < VR < 3.0$$

where VR is called a vibration proof coefficient, and the vibration proof coefficient is defined as $VR = |(1-Bvr) \times Br|$, Bvr is a lateral magnification of the negative lens group that can move so as to have a movement component in a direction substantially vertical to the optical axis, Br is a lateral magnification of an entire optical system which is disposed closer to the image than the negative lens group that can move so as to have a movement component in a direction substantially vertical to the optical axis.

In the above imaging lens, it is preferable that a condition of the following expression $$1.0 < (-f4)/d34 < 20.0$$

is satisfied, where f4 is a focal length of the negative lens group that can move so as to have a movement component in a direction substantially vertical to the optical axis, and d34 is an air distance on the optical axis upon focusing on infinity, between a lens surface disposed closest to the image side of a lens group which is disposed to the object side of the negative lens group that can move so as to have a movement component in a direction substantially vertical to the optical axis, and a lens surface disposed closest to the object side of the negative lens group that can move so as to have a movement component in a direction substantially vertical to the optical axis.

In the above imaging lens, it is preferable that the positive lens group disposed closest to the object comprises a positive lens subgroup G1a and a negative lens subgroup G1b, which are disposed in order from the object, and satisfies the following expression $$0.005 < Da/Fo < 0.09$$

where Da is an air distance on the optical axis between the positive lens subgroup G1a and the negative lens subgroup G1b, and Fo is a focal length of the entire optical system upon focusing on infinity.

In the above imaging lens, it is preferable that the negative lens group that moves during focusing comprises a negative lens sub group G2a and a negative lens subgroup G2b, which are disposed in order from the object, and satisfies the following expression, $$0.02 < Db/Fo < 0.08$$

where Db is an air distance on the optical axis between the negative lens subgroup G2a and the negative lens subgroup G2b, and Fo is a focal length of the entire optical system upon focusing on infinity.

A method for manufacturing an imaging lens comprises steps of: disposing a positive lens group, a negative lens group that moves during focusing, a positive lens group that moves during focusing, a negative lens group that can move in a direction method for vertical to an optical axis, and a positive lens group which are disposed in order from the object; moving the negative lens group that moves during focusing and the positive lens group that moves during focusing, in the optical axis direction upon focusing from a long distant object to a close distant object; and moving the negative lens group that can move in a direction substantially vertical to the optical axis, in a direction substantially vertical to the optical axis during motion blur correction, and satisfies a condition of the following expression $$2.0 < (-f4)/d34 < 20.8$$

where f4 is a focal length of the negative lens group that can move in a direction substantially vertical to the optical axis, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above method for manufacturing an imaging lens, it is preferable that a condition of the following expression $$1.0 < f5/d34 < 41.4$$

is satisfied, where f5 is a focal length of the positive lens group which is disposed to an image side of the negative lens group that can move in a direction substantially vertical to the optical axis, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above method for manufacturing an imaging lens, it is preferable that a condition of the following expression $$1.0 < f3/d34 < 20.0$$

is satisfied, where f3 is a focal length of the positive lens group that moves during focusing, and d34 is an air distance on the optical axis upon focusing on infinity focusing, between a lens surface disposed closest to an image side of a lens group which is disposed to an object side of the negative lens group that can move to a directly substantially vertical to the optical axis, and a lens surface disposed closest to the object side of the negative lens group that can move in a direction substantially vertical to the optical axis.

In the above method for manufacturing an imaging lens, it is preferable that a condition of the following expression $$1.0 < (-f2)/d34 < 17.0$$

is satisfied, where f2 is a focal length of the negative lens group that moves during focusing, and d34 is an air distance on the optical axis upon focusing on infinity focusing, between a lens surface disposed closest to an image side of a lens group which is disposed to an object side of the negative lens group that can move to a directly substantially vertical to the optical axis, and a lens surface disposed closest to the object side of the negative lens group that can move in a direction substantially vertical to the optical axis.

In the above method for manufacturing an imaging lens, it is preferable that a condition of the following expression $$1.0 < f1/d34 < 23.0$$

is satisfied, where f1 is a focal length of the positive lens group that is disposed closest to the object, and d34 is an air distance on the optical axis upon focusing on infinity, between a lens surface disposed closest to the image side of a lens group which is disposed to the object side of the negative lens group that can move in a direction substantially vertical to the optical axis, and a lens surface disposed closest to the object side of the negative lens group that can move in a direction substantially vertical to the optical axis.

In the above method for manufacturing an imaging lens, it is preferable that the negative lens group that moves during focusing comprises a negative lens and a cemented lens formed by a negative lens and a positive lens, which are disposed in order from the object.

In the above method for manufacturing an imaging lens, it is preferable that the negative lens group that moves during focusing comprises a single lens having a negative refractive power, and a cemented lens formed by a negative lens and a positive lens, which are disposed in order from the object, and satisfies a condition of the following expression $$-5.0 < (rb+ra)/(rb-ra) \leq -1.0$$

where ra is a radius of curvature of an object side surface of the single lens having the negative refractive power, and rb is a radius of curvature of an image side surface of the single lens having the negative refractive power.

In the above method for manufacturing an imaging lens, it is preferable that a condition of the following expression $$1.48 < N2nav < 1.65$$

is satisfied, where N2nav is an average refractive index with respect to the d-line of all the negative lenses included in the negative lens group that moves during focusing.

Another method for manufacturing an imaging lens according to the present invention comprises steps of: disposing a positive lens group, a negative lens group that moves during focusing, a positive lens group that moves during focusing, a negative lens group that can move so as to have a movement component in a direction substantially vertical to an optical axis, and a positive lens group which are disposed in order from an object; moving the negative lens group that moves during focusing and the positive lens group that moves during focusing, in the optical axis direction upon focusing from a long distant object to a close distant object; and moving the negative lens group that can move so as to have a moving component in a direction substantially vertical to the optical axis, in a direction substantially vertical to the optical axis, during motion blur correction, and satisfies a condition of the following expression $$1.21 < VR < 3.0$$

where VR is called a vibration proof coefficient, and the vibration proof coefficient is defined as $VR = |(1-Bvr) \times Br|$, Bvr is a lateral magnification of the negative lens group that can move so as to have a movement component in a direction substantially vertical to the optical axis, Br is a lateral magnification of an entire optical system which is disposed closer to the image than the negative lens group that can move so as to have a movement component in a direction substantially vertical to the optical axis.

In the above method for manufacturing an imaging lens, it is preferable that a condition of the following expression $$1.0 < (-f4)/d34 < 20.0$$

is satisfied, where f4 is a focal length of the negative lens group that can move so as to have a movement component in a direction substantially vertical to the optical axis, and d34 is an air distance on the optical axis upon focusing on infinity, between a lens surface disposed closest to the image side of a lens group which is disposed to the object side of the negative lens group that can move so as to have a movement component in a direction substantially vertical to the optical axis, and a lens surface disposed closest to the object side of the negative lens group that can move so as to have a movement component in a direction substantially vertical to the optical axis.

In the above method for manufacturing an imaging lens, it is preferable that the positive lens group disposed closest to the object side comprises a positive lens subgroup G1a and a negative lens subgroup G1b, which are disposed in order from the object, and satisfies a condition of the following expression $$0.005 < Da/Fo < 0.09$$

where Da is an air distance on the optical axis between the positive lens subgroup G1a and the negative lens subgroup G1b, and Fo is a focal length of the entire optical system upon focusing on infinity.

In the above method for manufacturing an imaging lens, it is preferable that the negative lens group that moves during focusing comprises a negative lens subgroup G2a and a negative lens subgroup G2b, which are disposed in order from the object, and satisfies a condition of the following expression $$0.02 < Db/Fo < 0.08$$

where Db is an air distance on the optical axis between the negative lens subgroup G2a and the negative lens subgroup G2b, and Fo is a focal length of the entire optical system upon focusing on infinity.

An optical apparatus according to the present invention is constructed by installing the above imaging lens.

Advantageous Effects of the Invention

According to the present invention, a high performance imaging lens which has a good vibration proof performance (or a good blur correction performance), is small in size and has less aberration fluctuation (particularly decentering coma aberration), an optical device in which this imaging lens is installed and a manufacturing method for the imaging lens can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 are cross-sectional views depicting a configuration of an imaging lens according to Example 1;

FIG. 6 are cross-sectional views depicting a configuration of an imaging lens according to Example 2;

FIG. 10 are cross-sectional views depicting a configuration of an imaging lens according to Example 3;

FIG. 23A are graphs showing various aberrations according to Example 6 upon focusing on infinity, and FIG. 23B are graphs showing lateral aberrations according to Example 6 when image blur correction is performed upon focusing on infinity;

DESCRIPTION OF THE FIRST GROUP OF PREFERRED EMBODIMENTS

Figure 1:
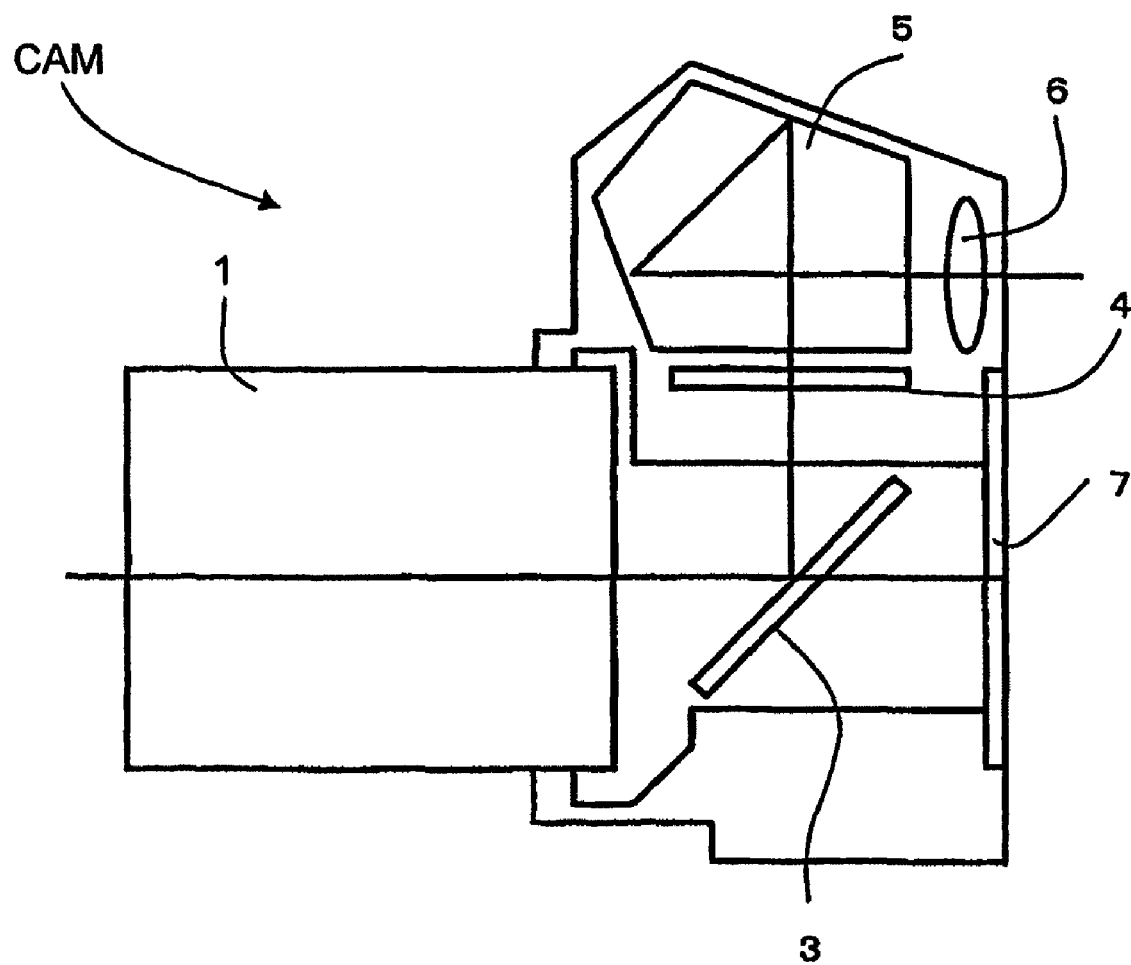
FIG. 1 is a cross-sectional view depicting a digital single-lens reflex camera in which an imaging lens of the present embodiment is installed.

Embodiments of a first group will be described with reference to the drawings. FIG. 1 is a cross-sectional view depicting a digital single-lens reflex camera CAM (optical device) having an imaging lens 1 according to the present embodiment. In the digital single-lens reflex camera CAM shown in FIG. 1, lights from an object, which are not illustrated, are collected by an imaging lens 1, and are imaged on a focal plate 4 via a quick return mirror 3. The lights imaged on the focal plate 4 are reflected in a penta prism 5 for a plurality of times, and guided to an ocular 6. Thereby the user can observe the object image as an erect image via the ocular 6.

If the user presses a release button, which is not illustrated, the quick return mirror 3 moves out of the optical path, and the lights of the object, which are not illustrated, collected by the imaging lens 1, form an object image on the image sensing element 7. Thereby the lights from the object are captured by the image sensing element 7, and are recorded in a memory, which is not illustrated, as the object image. Thus the user can photograph the object using this camera CAM. The camera CAM in FIG. 1 may be one which has a removable imaging lens 1, or one that is integrated with the imaging lens 1. The camera CAM may be a single-lens reflex camera, or a compact camera which does not have a quick return mirror.

The imaging lens 1 according to the embodiments of the first group comprises at least a positive lens group G1, a negative lens group G2 that moves during focusing, a positive lens group G3 that moves during focusing, a negative lens group G4 that can be moved in a direction substantially vertical to an optical axis, and a positive lens group G5, which are disposed in order from an object.

The positive lens group G1 has a biconvex lens, a positive meniscus lens having a convex surface facing the object, and a cemented lens, which is formed by a biconcave lens and a positive meniscus lens and has a negative refractive power, which are disposed in order from the object, and is fixed with respect to the image surface, upon focusing from infinity to the closest distance.

The negative lens group G2 has a negative lens, and a cemented lens, which is formed by a concave lens and a positive lens having a convex surface facing the object, and has a negative refractive power, which are disposed in order from the object, and moves in a direction from the object to the image, upon focusing from infinity to the closest distance.

The positive lens group G3 has a positive lens, and a cemented lens, which is formed by a negative lens and a positive lens, and has a positive refractive power, which are disposed in order from the object, and moves in a direction from the image to the object upon focusing from infinity to the closest distance.

The negative lens group G4 is a vibration proof group having a cemented lens, which is formed by a negative lens and a positive lens, and has a negative refractive power, and corrects image blur (vibration proof) generated by motion blur, by moving in a direction substantially vertical to the optical axis. By this configuration, the negative lens group G4 can suppress changes of coma aberration and curvature of field during vibration proof. It is preferable that the cemented lens of the negative lens group G4 is a meniscus shape having a convex surface facing the object as a whole, or biconcave shape, since changes of the coma aberration and curvature of field during vibration proof can be further suppressed.

The positive lens group G5 has a negative meniscus lens having a concave surface facing the object, and a biconvex lens, which are disposed in order from the object, and is fixed with respect to the image surface during focusing. By this configuration, the upper coma aberration can be well corrected while maintaining the spherical aberration in good condition.

According to the present embodiment, an aperture stop S is disposed between the negative lens group G2 and the positive lens group G3, and is fixed with respect to the image surface during focusing. By this configuration, the fluctuation of curvature of field during focusing is suppressed, and aberration fluctuation during vibration proofing can be minimized.

When a lens which can photograph an object in the close distance has a vibration proof function, as in the case of this imaging lens 1, it is preferable that the negative lens group, disposed behind the aperture stop S (the negative lens group G4 is the case of the present embodiment), is a vibration proof group, since the fluctuation of coma aberration and curvature of field during vibration proofing can be minimized during vibration proofing. It is also preferable to dispose a positive lens group behind the vibration proof group (the positive lens group G5 in the case of the present embodiment), then not only can the vibration proof coefficient be set to an optimum value, but also the coma aberration during vibration proofing can be improved.

Now a supplementary explanation on the vibration proof coefficient will be given. In the case of shifting (moving) the vibration proof group (lens group that can be moved in a direction substantially vertical to the optical axis for image blur correction) in a direction vertical to the optical axis, the image blur correction amount on the image surface can be determined by the following expression.

(Image blur correction amount)=(shift amount of vibration proof correction optical system)×(vibration proof coefficient)

The vibration coefficient is given by the following expression,

Vibration proof coefficient=$|(1-\beta vr)\times\beta\beta r|$ where $\beta vr$ is a magnification of the vibration proof correction optical system (vibration proof group) and $\beta r$ is a magnification of all lens groups disposed at the image side from the vibration proof correction optical system (vibration proof group), $\beta r=1$ if an optical element does not exist in the image surface side of the vibration proof correction optical system (vibration proof group).

Therefore if the vibration proof coefficient is 1, the image blur correction amount becomes the same as the vibration proof correction optical system shift amount. If the vibration proof coefficient is 1 or higher, a sufficient image blur correction amount for the image surface can be acquired with a small shift amount of the vibration proof group. However if the vibration proof coefficient is too high, aberration fluctuation during vibration proofing and sensitivity during assembly increase, which is not desirable. Hence in practical terms an optimum amount should be selected. In the present embodiment, it is preferable to determine a refractive power of each lens group so that the vibration proof coefficient becomes a 1.0 to 2.0 range. By satisfying this range, the changes of coma aberration and curvature of field during vibration proofing can be suppressed, without increasing the size of the optical system according to the present embodiment.

Now the imaging lens 1 according to the present embodiment in the first group will be described using each conditional expression.

In the imaging lens 1 with the above configuration, it is preferable that a condition of the following expression (1)

$$2.0<(-f4)/d34<20.8 \tag{1}$$

is satisfied, where f4 is a focal length of the negative lens group G4 that can move in a direction substantially vertical to the optical axis, and d34 is an air distance on an optical axis upon focusing on infinity, between a lens surface disposed closest to the image of a lens group (the positive lens group G3 that moves during focusing in this embodiment), which is disposed closest to the object side of the negative lens group G4 that can move in a direction substantially vertical to the optical axis, and a lens surface disposed closest to the object side of the negative lens group G4 that can move in a direction substantially vertical to the optical axis.

The above conditional expression (1) is a conditional expression in which the focal length f4 of the negative lens group G4 that can move in a direction substantially vertical to the optical axis, that is, the vibration proof group G4, is optimized, and the level of the refractive power is indicated by the value of the focal length of the vibration proof group G4. Changing the value of the focal length of the vibration proof group G4 means changing the magnification based on the expression of above mentioned vibration proof coefficient. As a result, the conditional expression (1) becomes an element to set the vibration proof coefficient to be an optimum value.

The reason conditional expression (1) is standardized by the air distance d34 between the lens surface disposed closest to the image of the lens group (positive lens group G3 in this embodiment) which is disposed to the object side of the vibration proof group G4, and the lens surface disposed closest to the object of the vibration proof group G4 upon focusing on infinity on the optical axis, is because the distance between the aperture stop S and the vibration proof group G4 is maintained to be an optimum value when the aperture stop S is disposed to the object side of the vibration proof group G4, for example. If the distance between the aperture stop S and the vibration proof group G4 is very short, the vibration proof mechanism and the stop mechanism cause mechanical interference. And if the distance is very long, the paraxial pupil beam passes through a peripheral area of the vibration proof group G4, which increases the fluctuation of curvature of field and an increase in the coma aberration, hence in any case, the result is not desirable. Therefore it is necessary to set the air distance d34 to an optimum value.

In the case of exceeding the upper limit value of the above conditional expression (1), in terms of the focal length f4 of the vibration proof group G4, the negative refractive power dramatically decreases and the vibration proof coefficient decreases as a result, and the shift amount of the vibration proof group G4 must be increased in order to obtain a predetermined image blur correction amount, which increases the size of the vibration proof mechanism, and is therefore not desirable. Also aberration fluctuation, particularly fluctuation of coma aberration, increases during vibration proofing, which is not desirable. In terms of the air distance d34 between the lens surface disposed closest to the image of the lens group (positive lens group G3), which is disposed to the object side of the vibration proof group G4, and the lens surface disposed closest to the object of the vibration proof group G4, exceeding the upper limit value of the conditional expression (1), means that the air distance d34 dramatically decreases, so the vibration proof mechanism and stop mechanism cause mechanical interference, and designing a configuration becomes difficult. It is preferable that the upper limit value of the conditional expression (1) is set to 20.5, since this causes a good effect on the correction of coma aberration and downsizing. The effect of the present embodiment can be expressed to the maximum if the upper limit value of the conditional expression (1) is set to 20.0, more preferably 19.5.

In the case of not reaching the lower limit value of the above conditional expression (1), in terms of the focal length f4 of the vibration proof group G4, the negative refractive power dramatically increases, and coma aberration during vibration proofing increases and performance deteriorates considerably, which is not desirable. In terms of the air distance d34 between the lens surface disposed closest to the object of the lens group (positive lens group G3), which is disposed to the object side of the vibration proof group G4, and the lens surface disposed closest to the image of the vibration proof group G4, not reaching the lower limit value of the conditional expression (1), means that the air distance d34 dramatically increases, so the paraxial pupil beam passes through the peripheral area of the vibration proof group G4, which causes fluctuation of the curvature of field, and increases the coma aberration, and is therefore not desirable. It is preferable that the lower limit value of the conditional expression (1) is set to 3.0, since optical performance during vibration proofing improves. The effect of the present invention can be expressed to the maximum if the lower limit value of the conditional expression (1) is set to 4.0, more preferably 5.0.

In the imaging lens 1 with the above configuration, if it is preferable that a condition of the following expression (2)

$$1.0 < f5/d34 < 41.4 \quad (2)$$

is satisfied, where f5 is a focal length of the positive lens group G5 which is disposed to an image side of the negative lens G4 (vibration proof group) that can move in a direction substantially vertical to the optical axis (positive lens group disposed closest to the object if a plurality of positive lens groups exist to the image side of the negative lens group G4), and d34 is an air distance on the optical axis up focusing on infinity, between a lens surface disposed closest to the image side of the lens group (positive lens group G3 in this embodiment) which is disposed to an object side of the negative lens group G4 that can move in a direction substantially vertical to the optical axis, and a lens surface disposed closest to the object side of the negative lens group G4 that can move in a direction substantially vertical to the optical axis.

The above conditional expression (2) is a conditional expression in which the focal length f5 of the positive lens group G5 which is disposed to the image side of the vibration proof group G4 is optimized. The positive lens group G5 relates to the correction of the upper coma aberration, curvature of field and lateral chromatic aberration in terms of aberration correction, and relates to a value of the vibration proof coefficient and fluctuation of the coma aberration during vibration proofing.

Exceeding the upper limit value of the conditional expression (2) means the focal length f5 of the positive lens group G5 increases, therefore the balance with the refractive power of the vibration proof group G4, having the negative refractive power, is lost, and as a result, the upper coma aberration and curvature of field deteriorate, which is not desirable. It is preferable that the upper limit value of the conditional expression (2) is set to 41.0, since the correction of the upper coma aberration improves. The effect of the present embodiment can be exhibited to the maximum if the upper limit value of the conditional expression (2) is set to 40.5, more preferably 40.0.

On the other hand, not reaching the lower limit value of the conditional expression (2) means that the focal length f5 of the positive lens group G5 decreases, that is, the refractive power of the positive lens group G5 increases dramatically. In this case, the correction of upper coma aberration and curvature of field becomes more difficult, and correction of the coma aberration during vibration proofing also becomes more difficult, which is not desirable. It is preferable that the lower limit value of the conditional expression (2) is set to 5.0, since this is effective for correction of coma aberration during vibration proofing. The effect of the present embodiment can be exhibited to the maximum if the lower limit value of the conditional expression (2) is set to 7.0, more preferably 10.0.

In the imaging lens 1 with the above configuration, it is preferable that a condition of the following expression (3)

$$1.0 < f3/d34 < 20.0 \quad (3)$$

is satisfied, where f3 is a focal length of the positive lens group G3 that moves during focusing, and d34 is an air distance on the optical axis up focusing on infinity, between a lens surface disposed closest to the image side of the lens group (positive lens group G3 in this embodiment) which is disposed to an object side of the negative lens group G4 (vibration proof group) that can move in a direction substantially vertical to the optical axis, and a lens surface disposed closest to the object side of the negative lens group G4 that can move in a direction substantially vertical to the optical axis.

The above conditional expression (3) is a conditional expression in which the focal length f3 of the positive lens group G3 that moves during focusing is optimized. In the case of the optical system having an ability to focus from infinity to the equal magnification of photographing distance, as in the case of this embodiment, the positive lens group G3 has a role to effectively suppress fluctuation of close distance aberration, particularly fluctuation of the curvature of field and fluctuation of spherical aberration, and this effect is implemented by the positive lens group G3 having a predetermined refractive power moving in a direction to the object upon focusing from an infinite object point to a close distance object point.

If the upper limit value of the conditional expression (3) is exceeded, the focal length of the positive lens group G3 increases, and the refractive power of the positive lens group G3 becomes much lower than the optimum value, causing an imbalance with the pre-positioned and post-positioned lens groups, and as a result, the spherical aberration is over-corrected and the curvature of field worsens, which are not desirable. It is preferable that the upper limit value of the conditional expression (3) is set to 17.8, since the correction of the spherical aberration improves. The effect of the present embodiment can be exhibited to the maximum if the upper limit value of the conditional expression (3) is set to 17.0, more preferably 16.5.

On the other hand, not reaching the lower limit value of the conditional expression (3) means that the focal length f3 of the positive lens group G3 decreases, and the refractive power thereof becomes much higher than the optimum value. In this case, an imbalance between the pre- and post-lens groups occurs, and as a result, the spherical aberration is insufficiently corrected, and aberration correction of the entire lens system becomes more difficult. It is preferable that the lower limit value of the conditional expression (3) is set to 2.0, since the correction of the spherical aberration improves. The effect of the present embodiment can be exhibited to the maximum if the lower limit value of the conditional expression (3) is set to 4.0, more preferably 7.0.

In the imaging lens 1 with the above configuration, it is preferable that a condition of the following expression (4)

$$1.0 < (-f2)/d34 < 17.0 \qquad (4)$$

is satisfied, where f2 is a focal length of the negative lens group G2 that moves during focusing, and d34 is an air distance on the optical axis up focusing on infinity, between a lens surface disposed closest to the image side of the lens group (positive lens group G3 in this embodiment) which is disposed to an object side of the negative lens group G4 (vibration proof group) that can move in a direction substantially vertical to the optical axis, and a lens surface disposed closest to the object side of the negative lens group G4 that can move in a direction substantially vertical to the optical axis.

The above conditional expression (4) is a conditional expression in which the focal length f2 of the negative lens group G2 that moves during focusing is optimized. In the case of the optical system having an ability to focus from infinity to the equal magnification of the photographing distance, as in the case of this embodiment, the negative lens group G2 has a role to effectively suppress fluctuation of close distance aberration, particularly fluctuation of the curvature of field and fluctuation of a spherical aberration, and this effect is implemented by the negative lens group G2 having a predetermined refractive power moving in a direction to the image upon focusing from an infinite object point to a close distant object point.

If the upper limit value of the conditional expression (4) is exceeded, the negative refractive power of the negative lens group G2 decreases. Then the correction of the spherical aberration becomes insufficient in the case of close distance, and as a result close distance fluctuation increases, which is not desirable. The back focus also decreases, which is also not desirable. It is preferable that the upper limit value of the conditional expression (4) is set to 16.0, since the correction of the spherical aberration improves. The effect of the present embodiment can be exhibited to the maximum if the upper limit value of the conditional expression (4) is set to 15.5, more preferably 15.0.

On the other hand, not reaching the lower limit value of the conditional expression (4) means that the negative refractive power of the negative lens group G2 increases, and the spherical aberration is over-corrected in the case of close distance, and the curvature of field fluctuates, and as a result, the close distance fluctuation increases, which is not desirable. Also the back focus increases dramatically, which increases the size of the entire lens system, and is therefore not desirable. It is preferable that the lower limit value of the conditional expression (4) is set to 2.0, since the correction of the spherical aberration and correction of the curvature of field improve. The effect of the present embodiment can be exhibited to the maximum if the lower limit value of the conditional expression (4) is set to 4.0, more preferably 5.0.

In the imaging lens 1 with the above configuration, it is preferable that a condition of the following expression (5)

$$1.0 < f1/d34 < 23.0 \qquad (5)$$

is satisfied, where f1 is a focal length of the positive lens group G1, that is disposed closest to the object side, and d34 is an air distance on the optical axis up focusing on infinity, between a lens surface disposed closest to the image side of the lens group (positive lens group G3 in this embodiment) which is disposed to an object side of the negative lens group G4 (vibration proof group) that can move in a direction substantially vertical to the optical axis, and a lens surface disposed closest to the object side of the negative lens group G4 that can move in a direction substantially vertical to the optical axis.

The above conditional expression (5) is a conditional expression in which the focal length f1 of the positive lens group G1 that is disposed closest to the object side is optimized. The positive lens group G1 is fixed during focusing, and has a role to effectively correct the spherical aberration and lower coma aberration throughout the entire area.

Exceeding the upper limit value of the conditional expression (5) means that the focal length f1 of the positive lens group G1 increases and the refractive power decreases, so the spherical aberration is over-corrected, which is not desirable. Also the back focus increases, which increases the outer diameter of the lens so as to obtain a predetermined F number, and as a result, the lens size increases, which is not desirable. It is preferable that the upper limit value of the conditional expression (5) is set to 21.5, since the correction of the spherical aberration improves. The effect of the present embodiment can be exhibited to the maximum if the upper limit value of the conditional expression (5) is set to 21.0, more preferably 20.5.

On the other hand, not reaching the lower limit value of the conditional expression (5) means that the focal length f1 of the positive lens group G1 decreases and the refractive power increases dramatically, so the correction of spherical aberration becomes insufficient and the curvature of field fluctuates, which is not desirable. Also the back focus decreases, which is also not desirable. It is preferable that the lower limit value of the conditional expression (5) is set to 2.0, since the correction of spherical aberration and correction of the curvature of field improve. The effect of the present embodiment can be exhibited to the maximum if the lower limit value of the conditional expression (5) is set to 4.0, more preferably 7.0.

In the imaging lens 1 with the above configuration, it is preferable that the negative lens group G2 that moves during focusing further comprises a single lens having a negative refractive power and a cemented lens formed by a negative lens and a positive lens, which are disposed in order from the object, and a condition of the following expression (6)

$$-5.0<(rb+ra)/(rb-ra)<-1.0 \qquad (6)$$

is satisfied, where ra is a radius of curvature of an object side surface of the single lens having the negative refractive power, and rb is a radius of curvature of an image side of the single lens having the negative refractive power.

The above conditional expression (6) is a conditional expression on a form factor (q factor) of a single lens having a negative refractive power in the negative lens group G2 that moves during focusing. It is preferable that the negative lens group G2 has a single lens having a negative refractive power and a cemented lens formed by a negative lens and a positive lens, since aberration fluctuations during focusing, particularly the fluctuations of spherical aberration, lower coma aberration and curvature of field, are effectively suppressed. The shape of the single lens having a negative refractive power, which is disposed closest to the object side of the negative lens group G2, is preferably a shape with which aberration is hardly generated with respect to the angle of view.

Exceeding the upper limit value of the conditional expression (6) means that the single lens having the negative refractive power, which should be a plane concave shape having a concave surface facing the object side, becomes a biconcave shape, in which the object side surface has a large angle of deviation with respect to the angle of view, so the close distance fluctuation of the lower coma aberration and curvature of field increase, which is not desirable. It is preferable that the upper limit value of the conditional expression (6) is set to −1.05, since the lower coma aberration can be well corrected. The effect of the present embodiment can be exhibited to the maximum if the upper limit value of the conditional expression (6) is set to −1.1, more preferably −1.2.

On the other hand, not reaching the lower limit value of the conditional expression (6) means that the shape becomes a strong meniscus shape having a convex surface facing the object, and the beams entering this lens surface have a large angle of deviation both in terms of the angle of view and in determining the F number, so the lower coma aberration and spherical aberration deteriorate, which is not desirable. It is preferable that the lower limit value of the conditional expression (6) is set to −4.5, since correction of the spherical aberration improves. The effect of the present embodiment can be exhibited to the maximum if the lower limit value of the conditional expression (6) is set to −4.0, more preferably −3.0.

In the imaging lens 1 with the above configuration, it is preferable that a condition of the following expression (7)

$$1.48<N2nav<1.65 \qquad (7)$$

is satisfied, where N2nav is an average refractive index with respect to the d-line of all the negative lenses included in the negative lens group that moves during focusing.

The above conditional expression (7) is a conditional expression for setting an average value of the refractive index with respect to the d-line of all the negative lenses included in the negative lens group G2 that moves during focusing. Exceeding the upper limit value of the conditional expression (7) increases dramatically the average value of the refractive indexes of all the negative lenses included in the negative lens group G2, and increases the Petzval sum, making it impossible to keep the curvature of field at an optimum value, which is not desirable. It is preferable that the upper limit value of the conditional expression (7) is set to 1.60, since the Petzval sum can be set to an appropriate value. The effect of the present embodiment can be exhibited to the maximum if the upper limit value of the conditional expression (7) is set to 1.58, more preferably 1.57.

On the other hand, not reaching the lower limit value of the conditional expression (7) dramatically decreases the average value of the refractive indexes of all the negative lenses included in the negative lens group G2, and decreases the Petzval sum, making it impossible to set the curvature of field to an optimum value, and also increases the radius of curvature of each surface making correction of a spherical aberration difficult, which is not desirable. It is preferable that the lower limit value of the conditional expression (7) is set to 1.49, since the correction of the spherical aberration improves. The effect of the present embodiment can be exhibited to the maximum if the lower limit value of the conditional expression (7) is set to 1.50.

EXAMPLES OF THE FIRST GROUP

Concrete examples of the imaging lens according to the embodiment of the first group will now be described with reference to the drawings.

Example 1

Example 1 will now be described with reference to FIG. 2 to FIG. 5, and Table 1. FIG. 2 shows the configuration of the imaging lens 1 according to Example 1. The imaging lens 1 according to Example 1 has a positive lens group G1, a negative lens group G2 that moves during focusing, an aperture stop S, a positive lens group G3 that moves during focusing, a negative lens group G4 that can move in a direction substantially vertical to the optical axis, and a positive lens group G5, which are disposed in order from an object. An image surface I is formed on an image sensing element, which is not illustrated, and the image sensing element is a CCD or CMOS, for example.

The positive lens group G1 is comprised of a biconvex positive lens L11, a positive meniscus lens L12 having a convex surface facing the object, and a cemented negative lens formed by a biconcave negative lens L13, and a positive meniscus lens L14 having a convex surface facing the object, which are disposed in order from the object, and this positive lens group G1 has a positive refractive power as a whole, and is fixed with respect to the image surface during focusing from an infinite object point to a close distant object point (hereafter referred to as "during focusing").

The negative lens group G2 is comprised of a negative meniscus lens L21 having a convex surface facing the object, and a cemented negative lens formed by a biconcave negative lens L22 and a positive meniscus lens L23 having a convex surface facing the object, which are disposed in order from the object, and this negative lens group G2 has a negative refractive power as a whole, and moves from the object to the image during focusing.

The aperture stop S determines the F number, and is fixed with respect to the image surface during focusing.

The positive lens group G3 is comprised of a biconvex positive lens L31, and a cemented positive lens formed by a negative meniscus lens L32 having a convex surface facing the object and a biconvex positive lens L33, which are disposed in order from the object, and this positive lens group G3 has a positive refractive power as a whole, and moves from the image to the object during focusing.

The negative lens group G4 is comprised of a cemented negative lens formed by a biconcave negative lens L41 and a positive meniscus lens L42 having a convex surface facing the object, which are disposed in order from the object, and has a negative refractive power as a whole, and this negative lens group G4 is vibration proof group, which corrects image blur by moving in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface during focusing.

Table 1 shows the parameters in Example 1. In Table 1, f is a focal length of the entire lens system, 2ω is an angle of view (covering angle), FNO is an F number, VR is a vibration proof coefficient, Bf is back focus, β is a photographing magnification, f1 is a focal length of the positive lens group G1, f2 is a focal length of the negative lens group G2, f3 is a focal length of the positive lens group G3, f4 is a focal length of the negative lens group G4, and f5 is a focal length of the positive lens group G5.

In the tables, the surface number is the sequence of the lens surface from the object, along the beam traveling direction, r is a radius of curvature of each lens surface, d is a surface distance, which is a distance from each optical surface to the next optical surface (or image surface) on the optical axis, nd is a refractive index with respect to the d-line (wavelength: 587.6 nm), and vd is an Abbe number based on the d-line. The surface numbers 1 to 25 in Table 1 correspond to the surfaces 1 to 25 in FIG. 2. In Table 1, d7 is an axial air distance between the positive lens group G1 and the negative lens group G2, d12 is an axial air distance between the negative lens group G2 and the aperture stop S, d13 is an axial air distance between the aperture stop S and the positive lens group G3, d18 (corresponds to d34 in conditional expression (1) upon focusing on infinity) is an axial air distance between the positive lens group G3 and the negative lens group G4, and d21 is an axial air distance between the negative lens group G4 and the positive lens group G5. In the tables, values corresponding to the above conditional expressions (1) to (7) are also shown.

In the tables, "mm" is normally used as the unit for focal length F, radius of curvature r, surface distance d and other lengths. However a similar optical performance can be acquired even if the optical system is proportionally expanded or reduced, so unit is not limited to "mm", but another appropriate unit can also be used. The above description on the tables is the same for other examples, for which this description is omitted.

TABLE 1

[All parameters]

f = 85 mm, 2ω = 19.1°, FNO = 3.6, VR = 1.159

[Lens parameters]

| Surface Number | r | d | nd | vd |
|---|---|---|---|---|
| 1 | 74.4986 | 4.8000 | 1.772499 | 49.60 |
| 2 | −117.9415 | 0.1000 | 1.000000 | |
| 3 | 44.3101 | 3.0000 | 1.696797 | 55.53 |
| 4 | 118.4110 | 1.3000 | 1.000000 | |
| 5 | −190.2091 | 1.3000 | 1.717362 | 29.52 |
| 6 | 26.8256 | 4.5000 | 1.699998 | 48.08 |

TABLE 1-continued

| 7 | 558.6033 | d7 | 1.000000 | |
|---|---|---|---|---|
| 8 | 179.5945 | 1.3000 | 1.516800 | 64.12 |
| 9 | 21.5350 | 3.2000 | 1.000000 | |
| 10 | −39.8733 | 1.3000 | 1.516800 | 64.12 |
| 11 | 37.9197 | 1.8000 | 1.846660 | 23.78 |
| 12 | 122.1720 | d12 | 1.000000 | |
| 13 | Aperture stop S | d13 | 1.000000 | |
| 14 | 55.4457 | 3.0000 | 1.516800 | 64.12 |
| 15 | −57.4772 | 0.1000 | 1.000000 | |
| 16 | 42.8755 | 1.3000 | 1.755199 | 27.51 |
| 17 | 21.4944 | 4.4000 | 1.497820 | 82.56 |
| 18 | −142.0701 | d18 | 1.000000 | |
| 19 | −133.7831 | 1.3000 | 1.834000 | 37.16 |
| 20 | 20.9234 | 2.8000 | 1.846660 | 23.78 |
| 21 | 44.2606 | d21 | 1.000000 | |
| 22 | −23.2425 | 1.5000 | 1.518229 | 58.90 |
| 23 | −31.2679 | 0.1000 | 1.000000 | |
| 24 | 88.0814 | 3.5000 | 1.785896 | 44.20 |
| 25 | −83.7255 | Bf | 1.000000 | |

[Variable distance during focusing]

| | Infinite distance | | Close distance |
|---|---|---|---|
| f, β | 85.00000 | −0.50000 | −1.00000 |
| D0 | 0.0000 | 206.1164 | 133.0597 |
| d7 | 2.49595 | 10.52739 | 17.78094 |
| d12 | 17.38925 | 9.35781 | 2.10426 |
| d13 | 16.18097 | 9.51488 | 3.18873 |
| d18 | 4.99729 | 11.66338 | 17.98953 |
| d21 | 7.49950 | 7.49950 | 7.49950 |
| Bf | 41.97225 | 41.97225 | 41.97225 |

[Camera lens group data]

| Group No. | First surface of group | Focal length of group |
|---|---|---|
| G1 | 1 | 46.000 (=f1) |
| G2 | 8 | −30.213 (=f2) |
| G3 | 14 | 36.927 (=f3) |
| G4 | 19 | −39.995 (=f4) |
| G5 | 22 | 75.215 (=f5) |

[Conditional expressions]

d34 = 4.997
Conditional expression (1) (−f4)/d34 = 8.005
Conditional expression (2) f5/d34 = 15.052
Conditional expression (3) f3/d34 = 7.390
Conditional expression (4) (−f2)/d34 = 6.046
Conditional expression (5) f1/d34 = 9.206
Conditional expression (6) (rb + ra)/(rb − ra) = −1.272
Conditional expression (7) N2nav = 1.5168

As the parameters in Table 1 show, the imaging lens 1 according to the present example satisfies all the above conditional expressions (1) to (7).

Figure 3A:
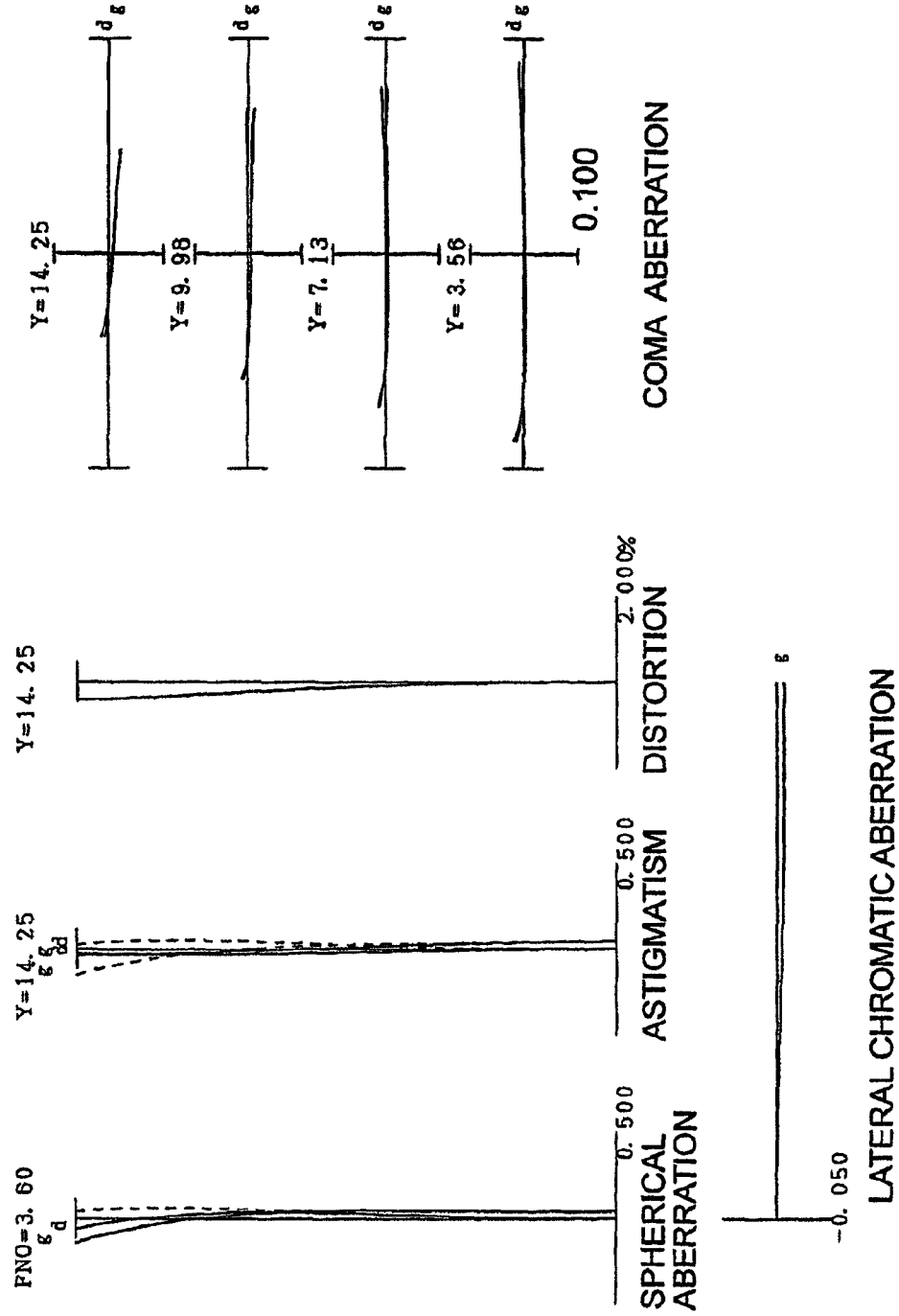
FIG. 3A are graphs showing various aberrations according to Example 1 upon focusing on infinity, and FIG. 3B are graphs showing coma aberrations according to Example 1 when image blur correction is performed upon focusing on infinity.
Figure 3B:
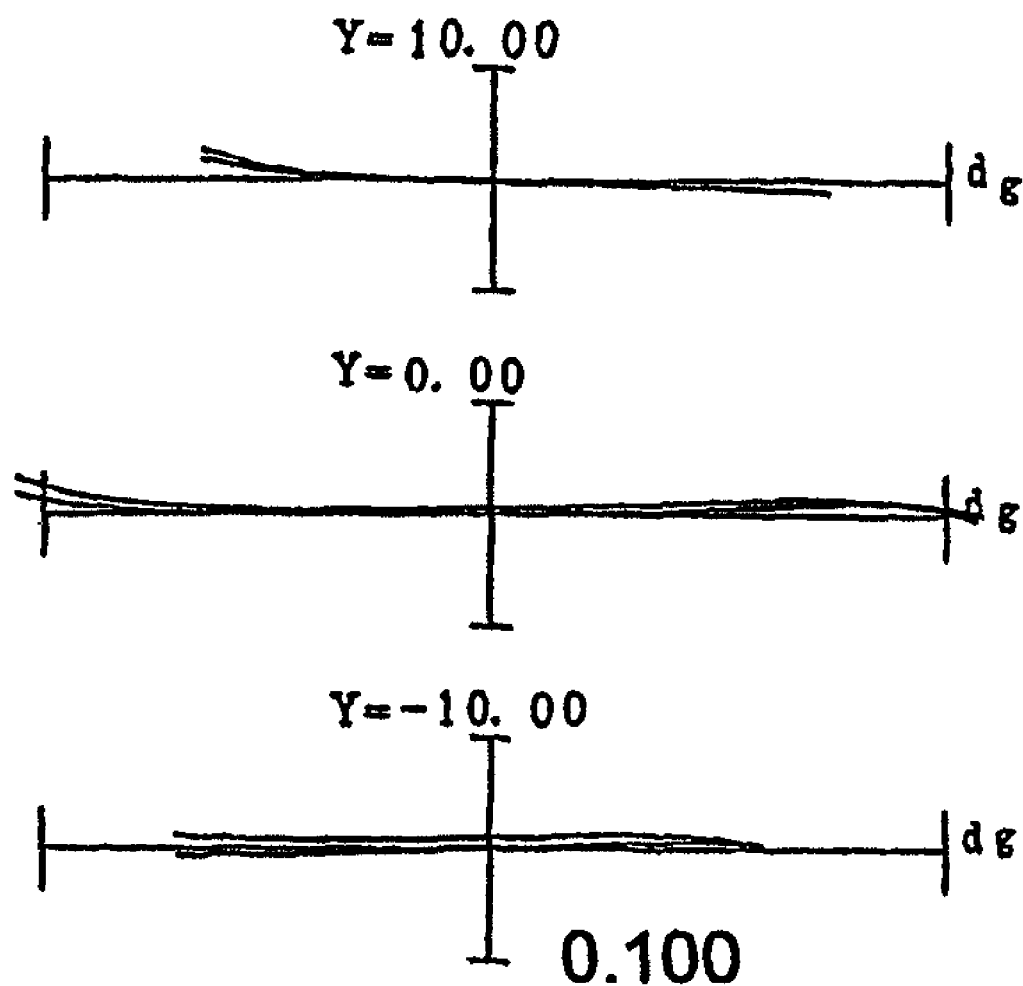
Figure 4B:
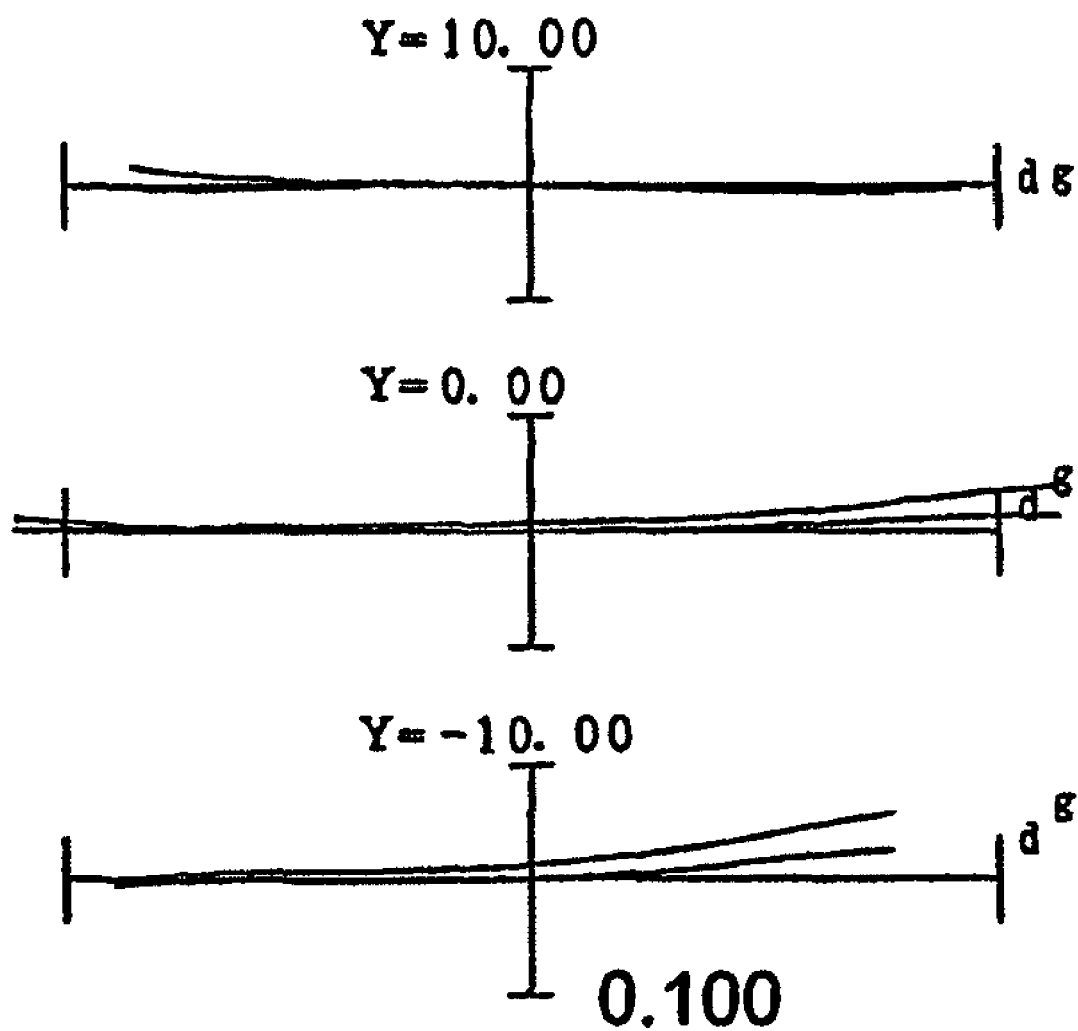
FIG. 4A are graphs showing various aberrations according to Example 1 upon focusing on close distance (photographing magnification −0.5 times), and FIG. 4B are graphs showing coma aberrations according to Example 1 when image blur correction is performed upon focusing on close distance.
Figure 5A:
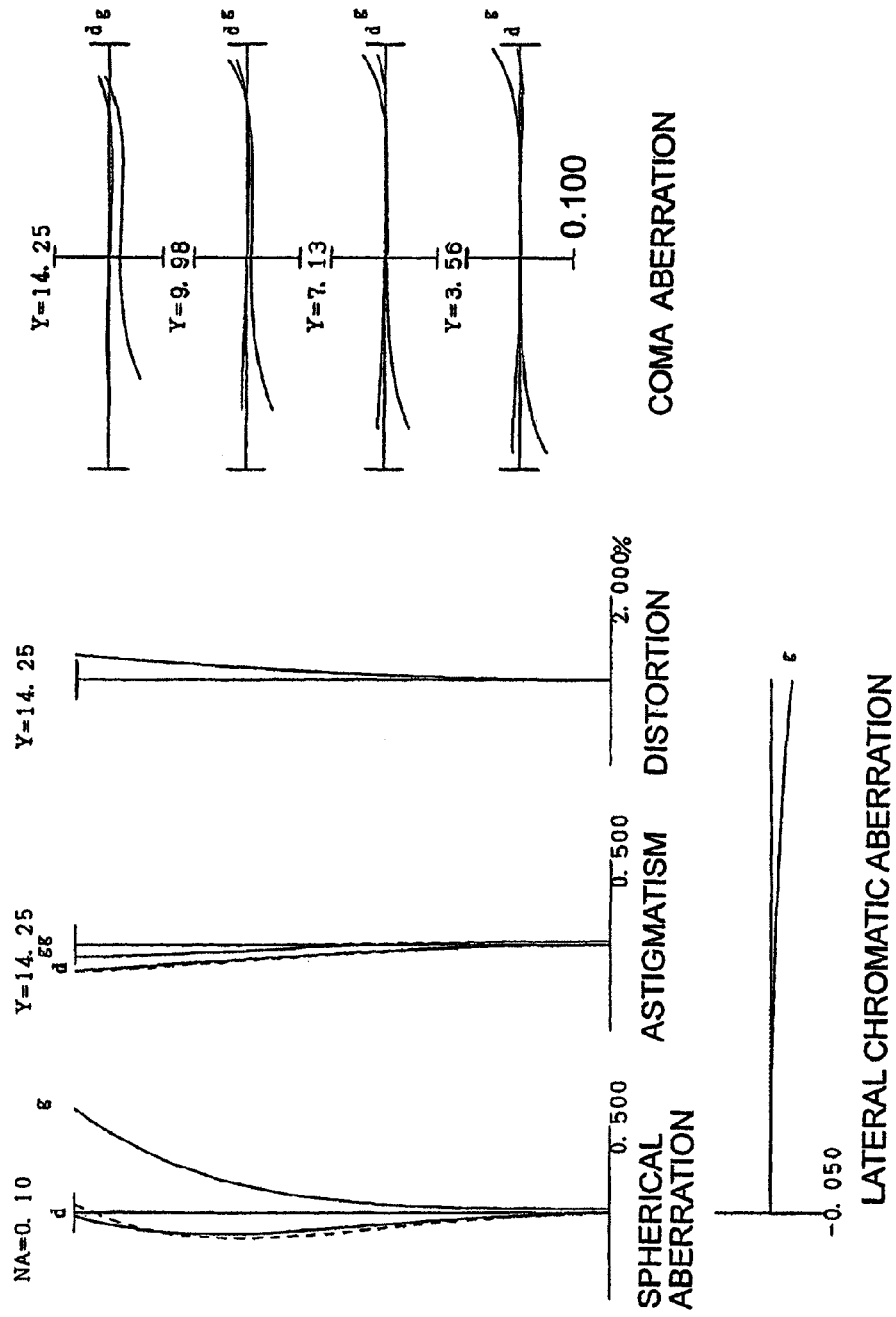
FIG. 5A are graphs showing various aberrations according to Example 1 upon focusing on close distance (photographing magnification −1.0 times), and FIG. 5B are graphs showing coma aberrations according to Example 1 when image blur correction is performed upon focusing on close distance.
Figure 5B:
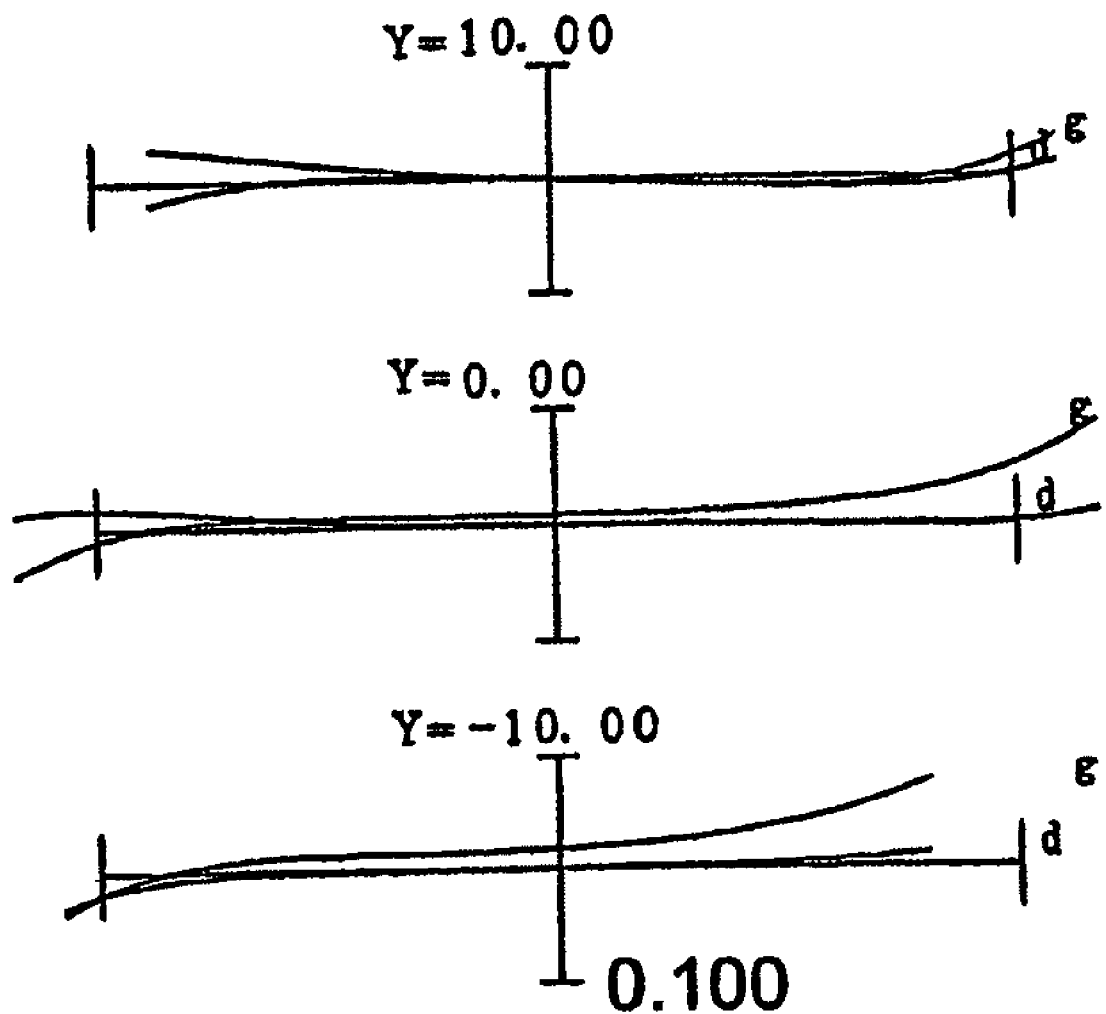

FIG. 3A are graphs showing various aberrations upon focusing on infinity according to Example 1, and FIG. 3B are graphs showing coma aberrations when image blur correction (shift amount of vibration proof group G4=−0.423) is performed upon focusing on infinity according to Example 1. FIG. 4A are graphs showing various aberrations upon focusing on close distance (magnification −0.5 times) according to Example 1, and FIG. 4B are graphs showing coma aberrations when image blur correction (shift amount of vibration proof group G4=0.598) is performed upon focusing on close distance according to Example 1. FIG. 5A are graphs showing various aberrations upon focusing on close distance (magnification 1.0 times) according to Example 1, and FIG. 5B are graphs showing coma aberrations when image blur correction (shift amount of vibration proof group G4=−0.748) is performed upon focusing on close distance according to Example 1.

In each of the graphs showing aberrations, FNO is an F number, Y is an image height, d is a d-line (wavelength: 587.6 nm) and g is a g-line (wavelength: 435.6 nm). In the graph showing astigmatism, the solid line indicates a sagittal image surface, and the broken line indicates a meridional image surface. The above description of the graphs showing aberrations is the same for other examples, where this description is omitted.

As each of the graphs showing aberrations clarifies, in the imaging lens 1 according to Example 1, various aberrations are well corrected, and excellent image formation performance is implemented. Therefore by installing the imaging lens 1 of Example 1, excellent optical performance can be insured for a digital single-lens reflex camera CAM (optical device, see FIG. 1).

Example 2

Example 2 will now be described with reference to FIG. 6 to FIG. 9, and Table 2. FIG. 6 shows the configuration of the imaging lens 1 according to Example 2. The imaging lens 1 according to Example 2 has a positive lens group G1, a negative lens group G2 that moves during focusing, an aperture stop S, a positive lens group G3 that moves during focusing, a negative lens group G4 that can move in a direction substantially vertical to the optical axis, and a positive lens group G5, which are disposed in order from the object. An image surface I is formed on an image sensing element, which is not illustrated, and the image sensing element is a CCD or CMOS, for example.

The positive lens group G1 is comprised of a biconvex positive lens L11, a positive meniscus lens L12 having a convex surface facing the object, and a cemented negative lens formed by a biconcave negative lens L13 and a positive meniscus lens L14 having a convex surface facing the object, which are disposed in order from the object, and this positive lens group G1 has a positive refractive power as a whole, and is fixed with respect to the image surface during focusing from an infinite object point to a close distant object point (hereafter referred to as "during focusing").

The negative lens group G2 is comprised of a negative meniscus lens L21 having a convex surface facing the object, and a cemented negative lens formed by a biconcave negative lens L22 and a positive meniscus lens L23 having a convex surface facing the object, and this negative lens group G2 has a negative refractive power as a whole, and moves from the object to the image during focusing.

The aperture stop S determines the F number, and is fixed with respect to the image surface during focusing.

The positive lens group G3 is comprised of a biconvex positive lens L31, and a cemented positive lens formed by a negative meniscus lens L32 having a convex surface facing the object and a biconvex positive lens L33, which are disposed in order from the object, and this positive lens group G3 has a positive refractive power as a whole, and moves from the image to the object during focusing.

The negative lens group G4 is comprised of a cemented negative lens formed by a negative meniscus lens L41 having a convex surface facing the object, and a positive meniscus lens L42 having a convex surface facing the object, which are disposed in order from the object, and has a negative refractive power as a whole, and this negative lens group G4 is a vibration proof group which performs image blur correction by moving in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface during focusing.

Table 2 shows the parameters in Example 2. The surface numbers 1 to 25 in Table 2 correspond to the surfaces 1 to 25 in FIG. 6. In Table 2, d7 is an axial air distance between the positive lens group G1 and the negative lens group G2, d12 is an axial air distance between the negative lens group G2 and the aperture stop S, d13 is an axial air distance between the aperture stop S and the positive lens group G3, d18 (corresponds to d34 in conditional expression (1) upon focusing on infinity) is an axial air distance between the positive lens group G3 and the negative lens group G4, and d21 is an axial air distance between the negative lens group G4 and the positive lens group G5. In the tables, the values corresponding to the above conditional expressions (1) to (7) are also shown.

TABLE 2

[All parameters]

$f = 85$ mm, $2\omega = 19.1°$, FNO = 3.6, VR = 1.148

[Lens parameters]

| Surface Number | r | d | nd | νd |
|---|---|---|---|---|
| 1 | 79.1564 | 4.6000 | 1.772499 | 49.60 |
| 2 | −107.5311 | 0.1000 | 1.000000 | |
| 3 | 44.4069 | 2.8000 | 1.696797 | 55.53 |
| 4 | 101.7357 | 1.8000 | 1.000000 | |
| 5 | −163.8943 | 1.3000 | 1.717362 | 29.52 |
| 6 | 29.6733 | 4.6000 | 1.699998 | 48.08 |
| 7 | 4531.9544 | d7 | 1.000000 | |
| 8 | 68.2073 | 1.3000 | 1.516800 | 64.12 |
| 9 | 20.8575 | 3.5000 | 1.000000 | |
| 10 | −33.4396 | 1.3000 | 1.516800 | 64.12 |
| 11 | 39.2010 | 1.8000 | 1.846660 | 23.78 |
| 12 | 109.6710 | d12 | 1.000000 | |
| 13 | Aperture stop S | d13 | 1.000000 | |
| 14 | 54.3134 | 2.5000 | 1.603000 | 65.47 |
| 15 | −223.5388 | 0.1000 | 1.000000 | |
| 16 | 44.5666 | 1.0000 | 1.755199 | 27.51 |
| 17 | 21.2675 | 4.5000 | 1.497820 | 82.56 |
| 18 | −54.3706 | d18 | 1.000000 | |
| 19 | 124.1263 | 1.3000 | 1.834000 | 37.16 |
| 20 | 16.9347 | 2.5000 | 1.846660 | 23.78 |
| 21 | 28.3020 | d21 | 1.000000 | |
| 22 | −20.5409 | 1.5000 | 1.518229 | 58.90 |
| 23 | −38.6290 | 0.1000 | 1.000000 | |
| 24 | 73.3691 | 3.5000 | 1.785896 | 44.20 |
| 25 | −69.0662 | Bf | 1.000000 | |

[Variable distance during focusing]

| | Infinite distance | | Close distance |
|---|---|---|---|
| f, β | 85.00000 | −0.50000 | −1.00000 |
| D0 | 0.0000 | 211.2253 | 135.7765 |
| d7 | 1.51894 | 10.75400 | 18.04311 |
| d12 | 17.78437 | 8.54931 | 1.26020 |
| d13 | 15.72457 | 10.36824 | 3.82717 |
| d18 | 2.33805 | 7.69438 | 14.23545 |
| d21 | 7.49902 | 7.49902 | 7.49902 |
| Bf | 48.78537 | 48.78537 | 48.78537 |

[Camera lens group data]

| Group No. | First surface of group | Focal length of group |
|---|---|---|
| G1 | 1 | 47.000 (=f1) |
| G2 | 8 | −30.537 (=f2) |
| G3 | 14 | 37.000 (=f3) |
| G4 | 19 | −45.439 (=f4) |
| G5 | 22 | 89.301 (=f5) |

[Conditional expressions]

d34 = 2.338
Conditional expression (1) (−f4)/d34 = 19.435
Conditional expression (2) f5/d34 = 38.195
Conditional expression (3) f3/d34 = 15.825

TABLE 2-continued

Conditional expression (4) (−f2)/d34 = 13.061
Conditional expression (5) f1/d34 = 20.103
Conditional expression (6) (rb + ra)/(rb − ra) = −1.881
Conditional expression (7) N2nav = 1.5168

As the parameters in Table 2 show, the imaging lens 1 according to the present example satisfies all the above conditional expressions (1) to (7).

Figure 7A:
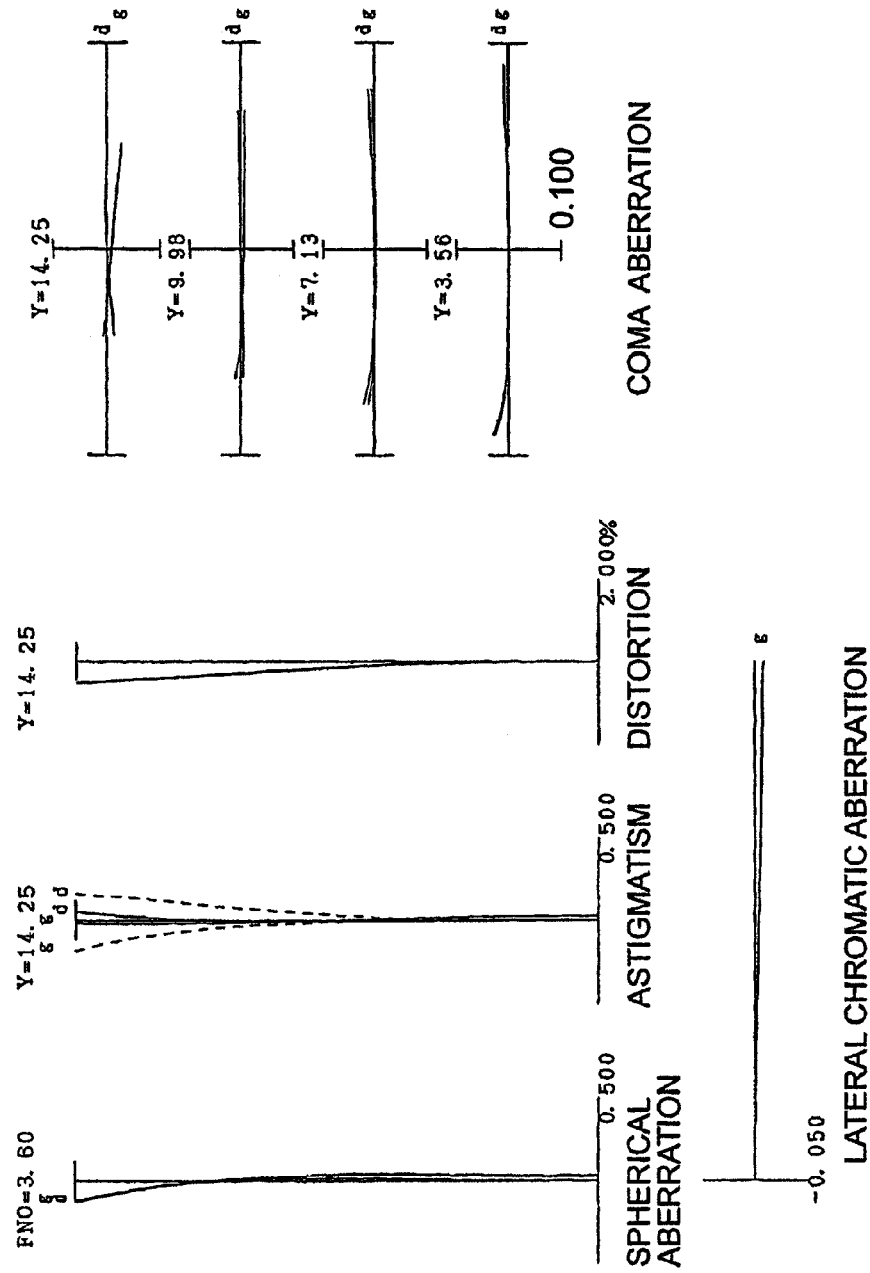
FIG. 7A are graphs showing various aberrations according to Example 2 upon focusing on infinity, and FIG. 7B are graphs showing coma aberrations according to Example 2 when image blur correction is performed upon focusing on infinity.
Figure 7B:
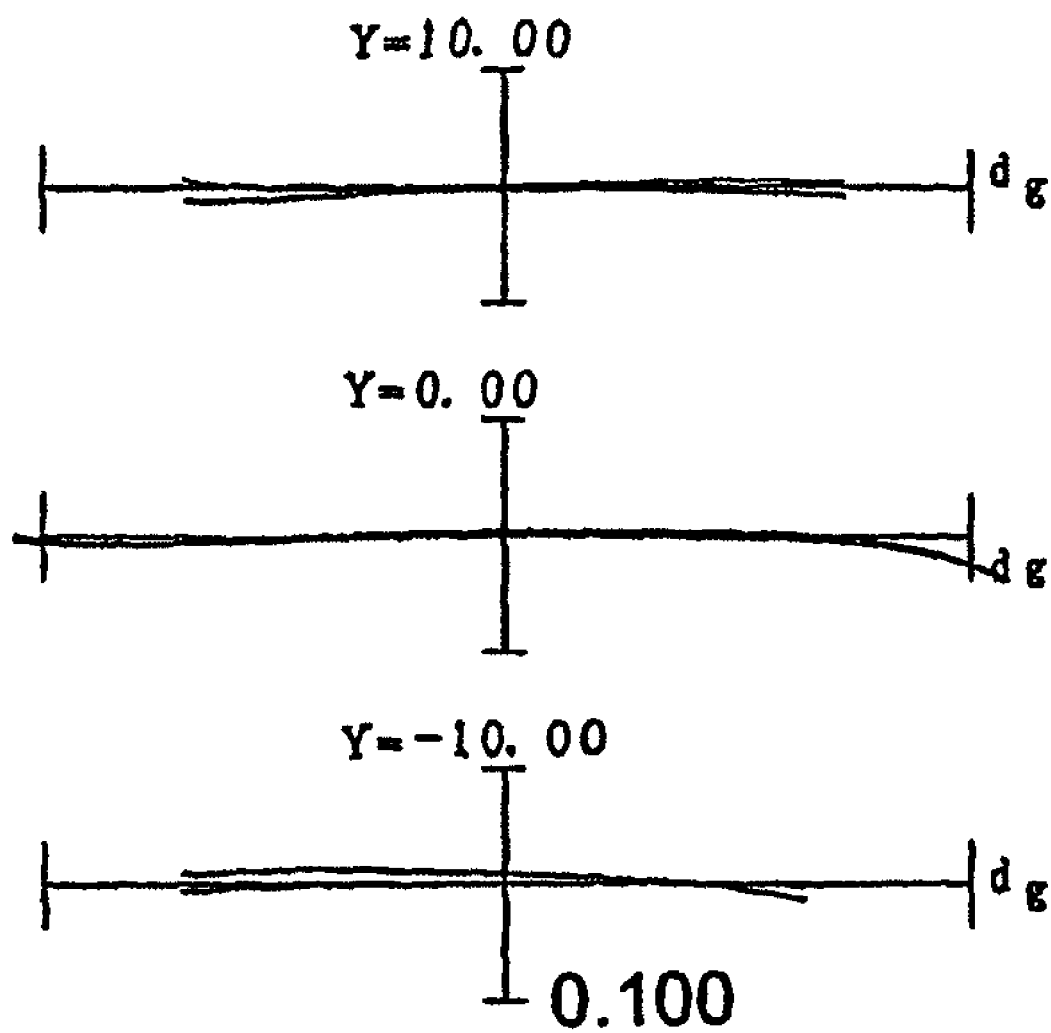
Figure 8A:
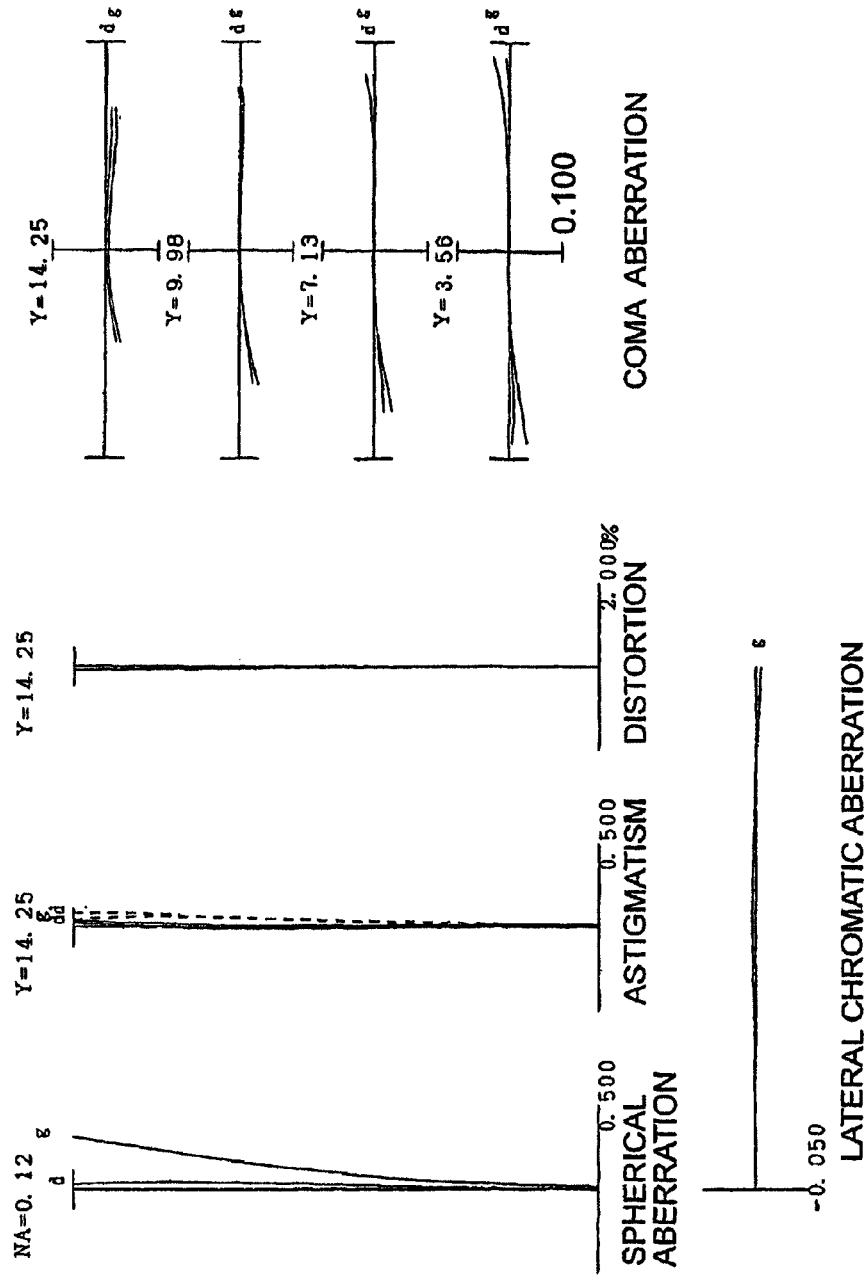
FIG. 8A are graphs showing various aberrations according to Example 2 upon focusing on close distance (photographing magnification −0.5 times), and FIG. 8B are graphs showing coma aberrations according to Example 2 when image blur correction is performed upon focusing on close distance.
Figure 8B:
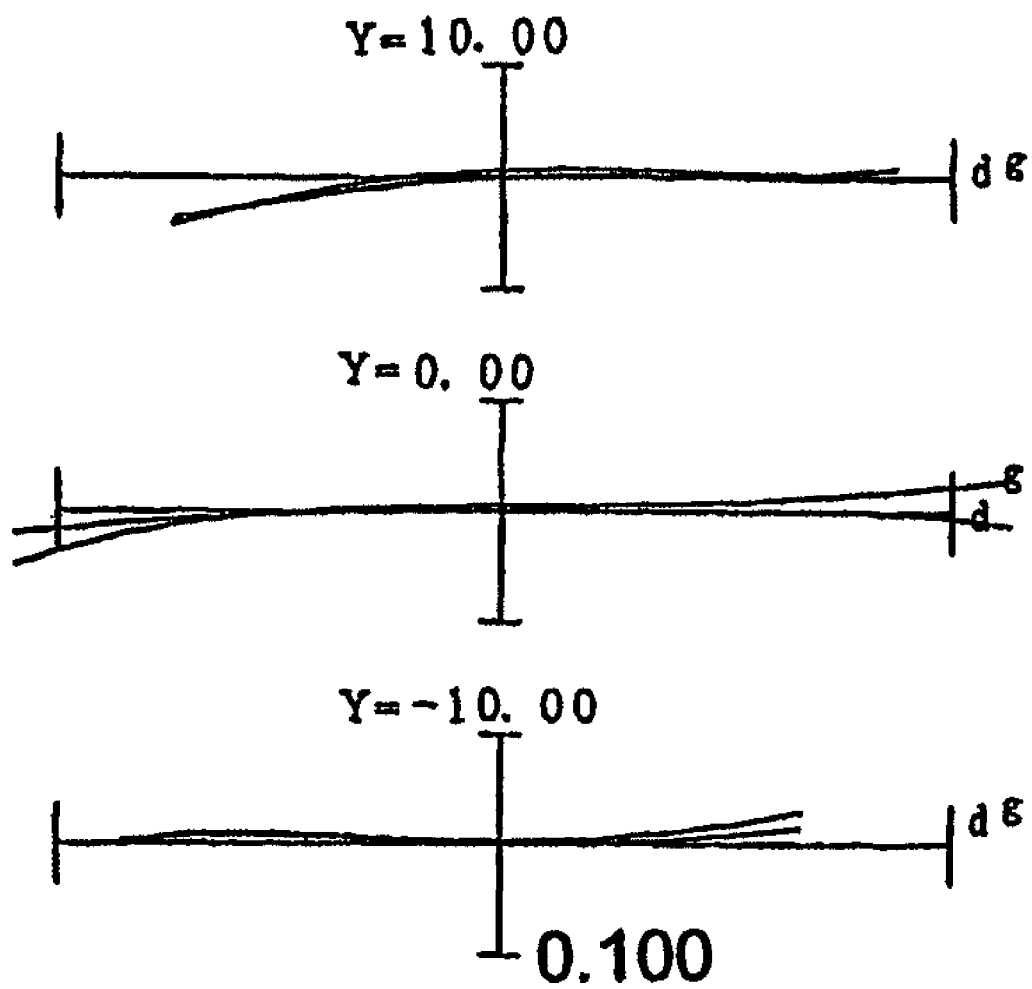
Figure 9A:
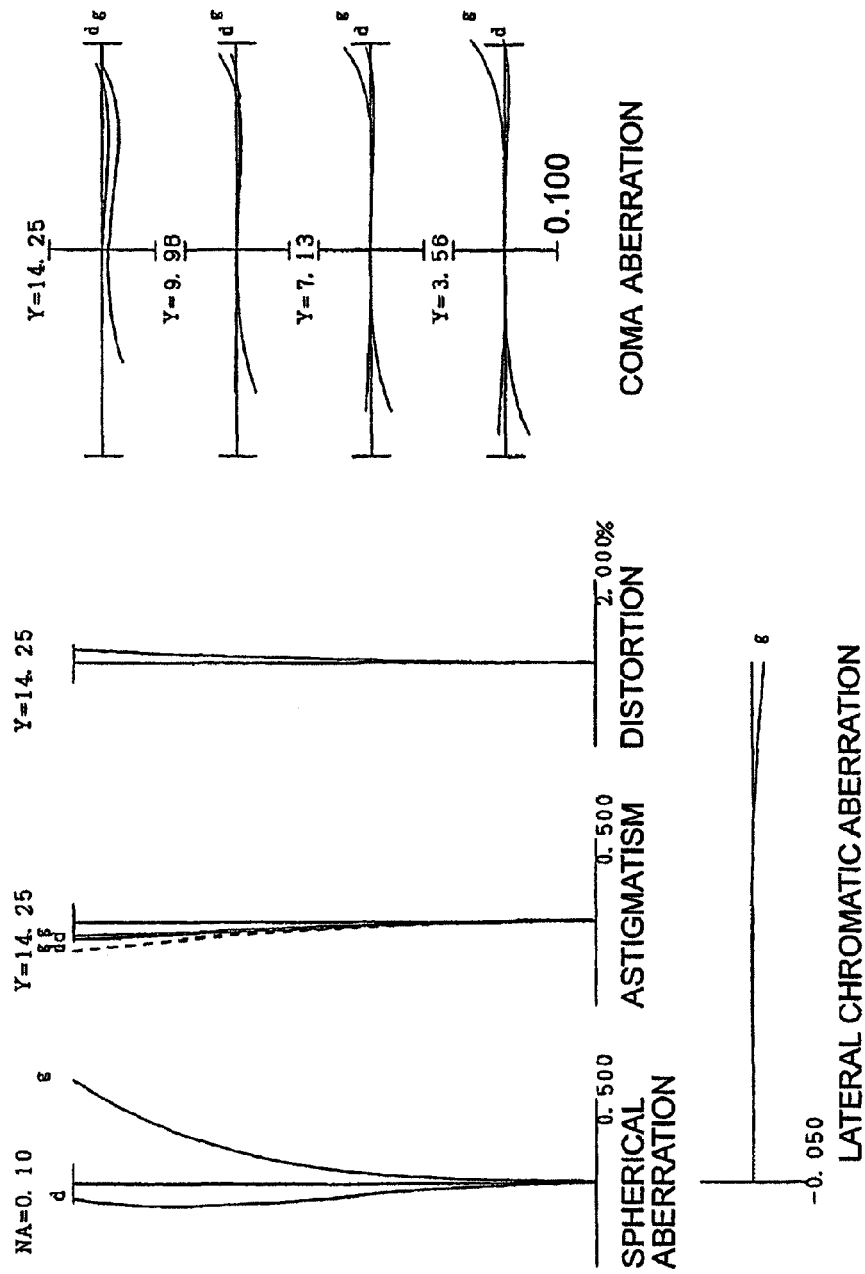
FIG. 9A are graphs showing various aberrations according to Example 2 upon focusing on close distance (photographing magnification −1.0 times), and FIG. 9B are graphs showing coma aberrations according to Example 2 when image blur correction is performed upon focusing on close distance.
Figure 9B:
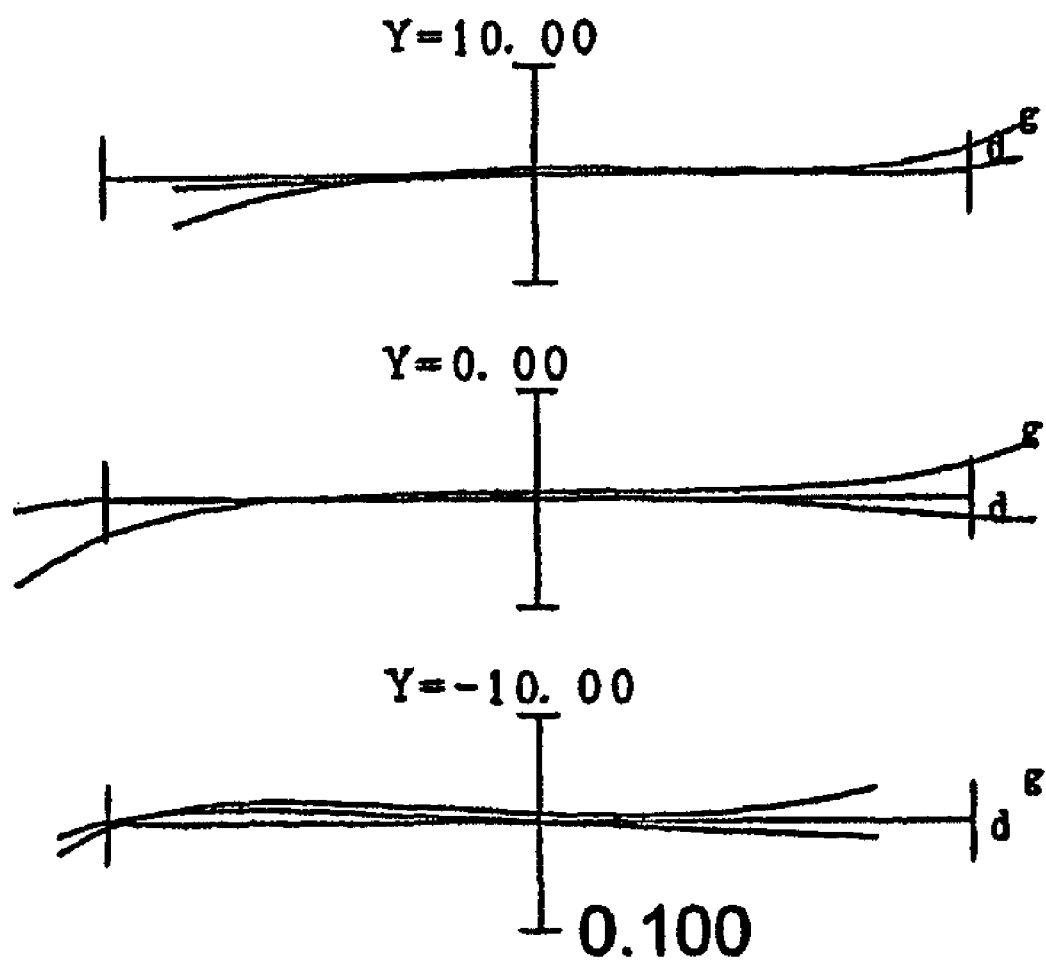

FIG. 7A are graphs showing various aberrations upon focusing on infinity according to Example 2, and FIG. 7B are graphs showing coma aberrations when image blur correction (shift amount of vibration proof group G4=−0.443) is performed upon focusing on infinity according to Example 2. FIG. 8A are graphs showing various aberrations upon focusing on close distance (magnification −0.5 times) according to Example 2, and FIG. 8B are graphs showing coma aberrations when image blur correction (shift amount of vibration proof group G4=0.629) is performed upon focusing on close distance according to Example 2. FIG. 9A are graphs showing various aberrations upon focusing on close distance (magnification 1.0 times) according to Example 2, and FIG. 9B are graphs showing coma aberrations when image blur correction (shift amount of vibration proof group G4=−0.790) is performed upon focusing on close distance (magnification 1.0 times) according to Example 2.

As each of the graphs showing aberrations clarifies, in the imaging lens 1 according to Example 2, various aberrations are well corrected, and excellent image formation performance is implemented. Therefore by installing the imaging lens 1 of Example 2, excellent optical performance can be insured for a digital single-lens reflex camera CAM (optical device, see FIG. 1).

Example 3

Example 3 will now be described with reference to FIG. 10 to FIG. 13, and Table 3. FIG. 10 shows the configuration of the imaging lens 1 according to Example 3. The imaging lens 1 according to Example 3 has a positive lens group G1, a negative lens group G2 that moves during focusing, an aperture stop S, a positive lens group G3 that moves during focusing, a negative lens group G4 that can move in a direction substantially vertical to the optical axis, and a positive lens group G5, which are disposed in order from the object. An image surface I is formed on an image sensing element, which is not illustrated, and the image sensing element is a CCD or CMOS, for example.

The positive lens group G1 is comprised of a biconvex positive lens L11, a positive meniscus lens L12 having a convex surface facing the object, and a cemented negative lens formed by a biconcave negative lens L13 and a positive meniscus lens L14 having a convex surface facing the object, which are disposed in order from the object, and this positive lens group G1 has a positive refractive power as a whole, and is fixed with respect to the image surface during focusing from an infinite object point to a close distant object point (hereafter referred to as "during focusing").

The negative lens group G2 is comprised of a negative meniscus lens L21 having a convex surface facing the object, and a cemented negative lens formed by a biconcave negative lens L22 and a positive meniscus lens L23 having a convex surface facing the object, and this negative lens group G2 has a negative refractive power as a whole, and moves from the object to the image during focusing.

The aperture stop S determines the F number, and is fixed with respect to the image surface during focusing.

The positive lens group G3 is comprised of a positive meniscus lens L31 having a convex surface facing the image, and a cemented positive lens formed by a negative meniscus lens L32 having a convex surface facing the object and a biconvex positive lens L33, which are disposed in order from the object, and this positive lens group G3 has a positive refractive power as a whole, and moves from the image to the object during focusing.

The negative lens group G4 is comprised of a cemented negative lens formed by a negative meniscus lens L41 having a convex surface facing the object, and a positive meniscus lens L42 having a convex surface facing the object, which are disposed in order from the object, and has a negative refractive power as a whole, and this negative lens group G4 is a vibration proof group which performs image blur correction by moving in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface during focusing.

Table 3 shows the parameters in Example 3. The surface numbers 1 to 25 in Table 3 correspond to the surfaces 1 to 25 in FIG. 10. In Table 3, d7 is an axial air distance between the positive lens group G1 and the negative lens group G2, d12 is an axial air distance between the negative lens group G2 and the aperture stop S, d13 is an axial air distance between the aperture stop S and the positive lens group G3, d18 (corresponds to d34 in conditional expression (1) upon focusing on infinity) is an axial air distance between the positive lens group G3 and the negative lens group G4, and d21 is an axial air distance between the negative lens group G4 and the positive lens group G5. In the tables, the values corresponding to the above conditional expressions (1) to (7) are also shown.

TABLE 3

[All parameters]

f = 85 mm, 2ω = 19.1°, FNO = 3.6, VR = 1.230

[Lens parameters]

| Surface Number | r | d | nd | νd |
| --- | --- | --- | --- | --- |
| 1 | 177.9071 | 4.0000 | 1.772499 | 49.60 |
| 2 | −88.1986 | 0.1000 | 1.000000 | |
| 3 | 34.3871 | 3.5000 | 1.696797 | 55.53 |
| 4 | 195.2454 | 0.8000 | 1.000000 | |
| 5 | −907.9437 | 1.3000 | 1.717362 | 29.52 |
| 6 | 25.2336 | 3.5000 | 1.699998 | 48.08 |
| 7 | 85.0628 | d7 | 1.000000 | |
| 8 | 48.0719 | 1.3000 | 1.516800 | 64.12 |
| 9 | 19.6778 | 4.0000 | 1.000000 | |
| 10 | −37.5286 | 1.3000 | 1.603601 | 65.44 |
| 11 | 37.5748 | 1.7000 | 1.846660 | 23.78 |
| 12 | 117.7570 | d12 | 1.000000 | |
| 13 | Aperture stop S | d13 | 1.000000 | |
| 14 | −111.5117 | 2.0000 | 1.516800 | 64.12 |
| 15 | −45.4736 | 0.1000 | 1.000000 | |
| 16 | 26.2609 | 1.3000 | 1.755199 | 27.51 |
| 17 | 16.6581 | 5.0000 | 1.497820 | 82.56 |
| 18 | −52.8564 | d18 | 1.000000 | |
| 19 | 184.5741 | 1.3000 | 1.834000 | 37.16 |
| 20 | 17.2160 | 2.5000 | 1.846660 | 23.78 |
| 21 | 27.6961 | d21 | 1.000000 | |
| 22 | −20.5324 | 1.5000 | 1.518229 | 58.90 |
| 23 | −38.3532 | 0.1000 | 1.000000 | |

TABLE 3-continued

| 24 | 64.5640 | 3.5000 | 1.785896 | 44.20 |
| 25 | −79.6807 | Bf | 1.000000 | |

[Variable distance during focusing]

| | Infinite distance | | Close distance |
| --- | --- | --- | --- |
| f, β | 85.00000 | −0.50000 | −1.00000 |
| D0 | 0.0000 | 199.0569 | 129.1437 |
| d7 | 1.94742 | 9.01607 | 16.49110 |
| d12 | 16.94427 | 9.87562 | 2.40059 |
| d13 | 16.16481 | 9.09616 | 3.36637 |
| d18 | 2.95141 | 10.02006 | 15.74985 |
| d21 | 7.49440 | 7.49440 | 7.49440 |
| Bf | 45.07133 | 45.07133 | 45.07133 |

[Camera lens group data]

| Group No. | First surface of group | Focal length of group |
| --- | --- | --- |
| G1 | 1 | 46.000 (=f1) |
| G2 | 8 | −30.213 (=f2) |
| G3 | 14 | 34.293 (=f3) |
| G4 | 19 | −39.995 (=f4) |
| G5 | 22 | 89.301 (=f5) |

[Conditional expressions]

d34 = 2.951
Conditional expression (1) (−f4)/d34 = 13.553
Conditional expression (2) f5/d34 = 30.261
Conditional expression (3) f3/d34 = 11.621
Conditional expression (4) (−f2)/d34 = 10.238
Conditional expression (5) f1/d34 = 15.588
Conditional expression (6) (rb + ra)/(rb − ra) = −2.386
Conditional expression (7) N2nav = 1.5599

As the parameters in Table 3 show, the imaging lens 1 according to the present example satisfies all the above conditional expressions (1) to (7).

Figure 11A:
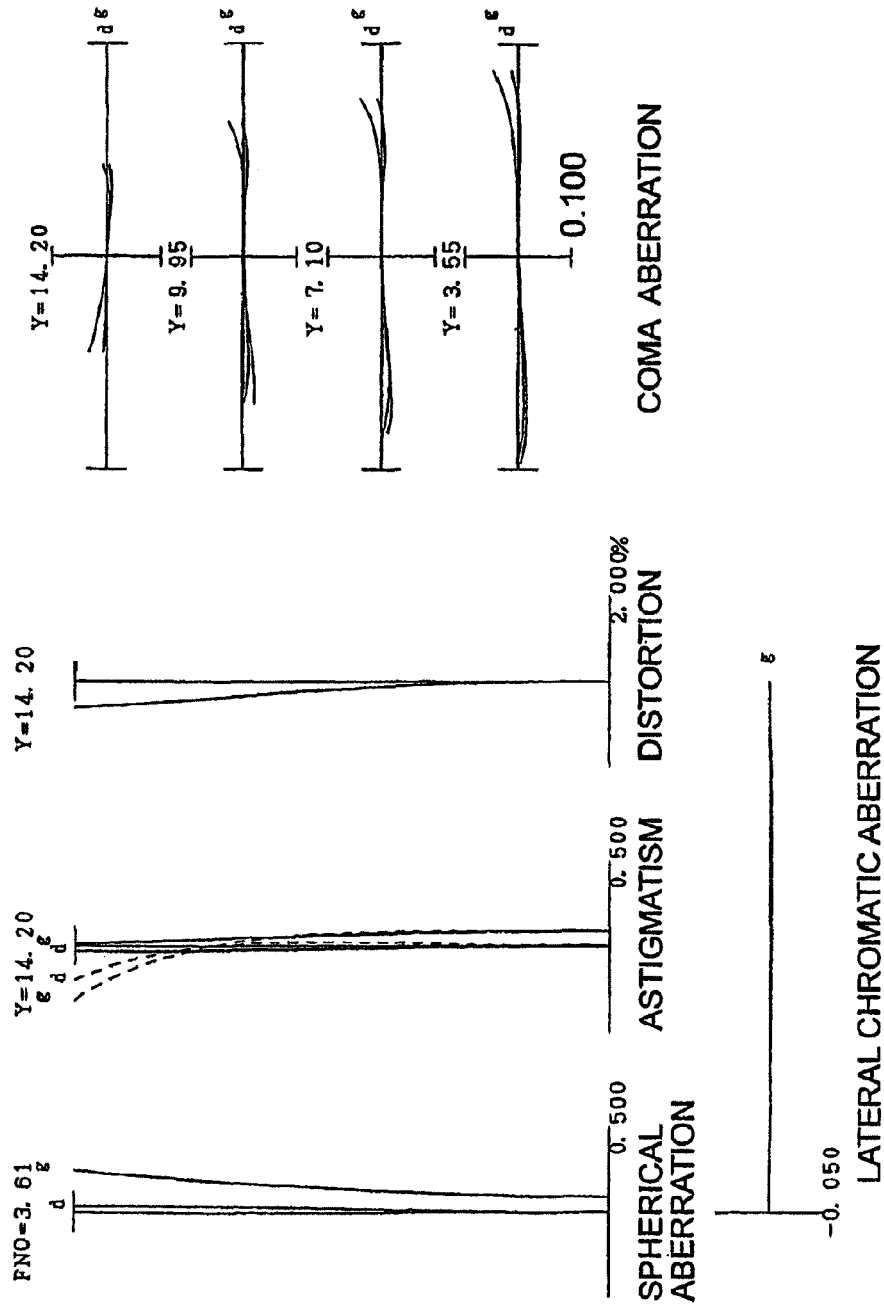
FIG. 11A are graphs showing various aberrations according to Example 3 upon focusing on infinity, and FIG. 11B are graphs showing coma aberrations according to Example 3 when image blur correction is performed upon focusing on infinity.
Figure 11B:
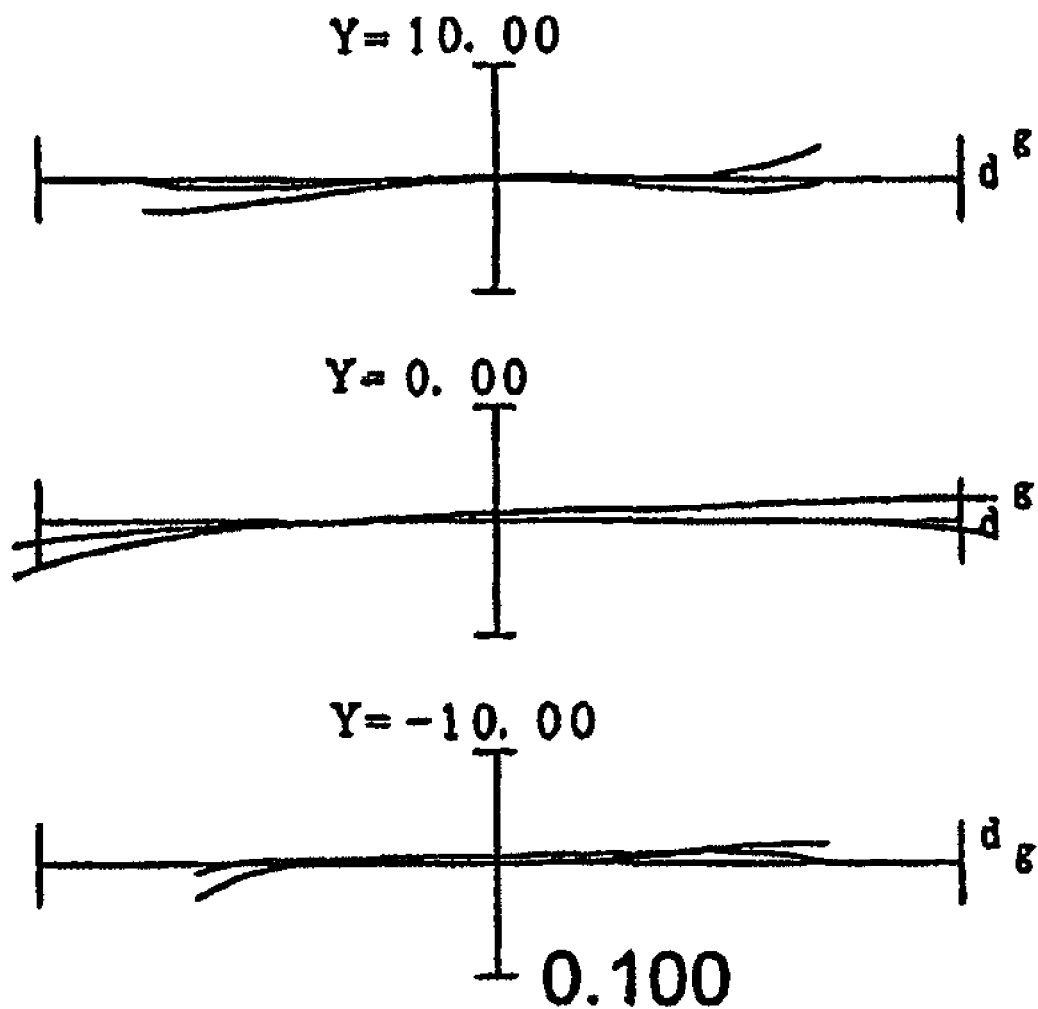
Figure 12A:
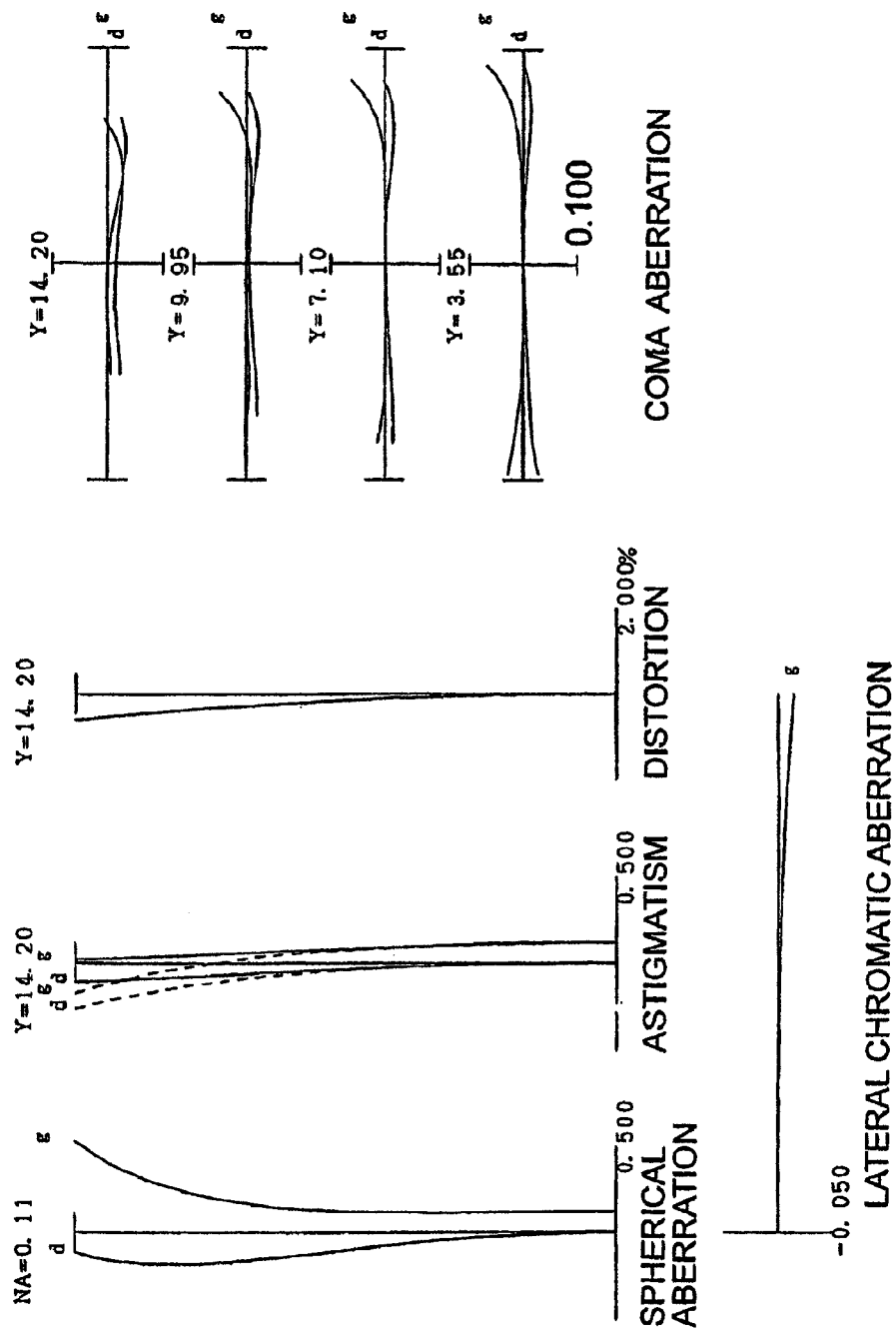
FIG. 12A are graphs showing various aberrations according to Example 3 upon focusing on close distance (photographing magnification −0.5 times), and FIG. 12B are graphs showing coma aberrations according to Example 3 when image blur correction is performed upon focusing on close distance.
Figure 12B:
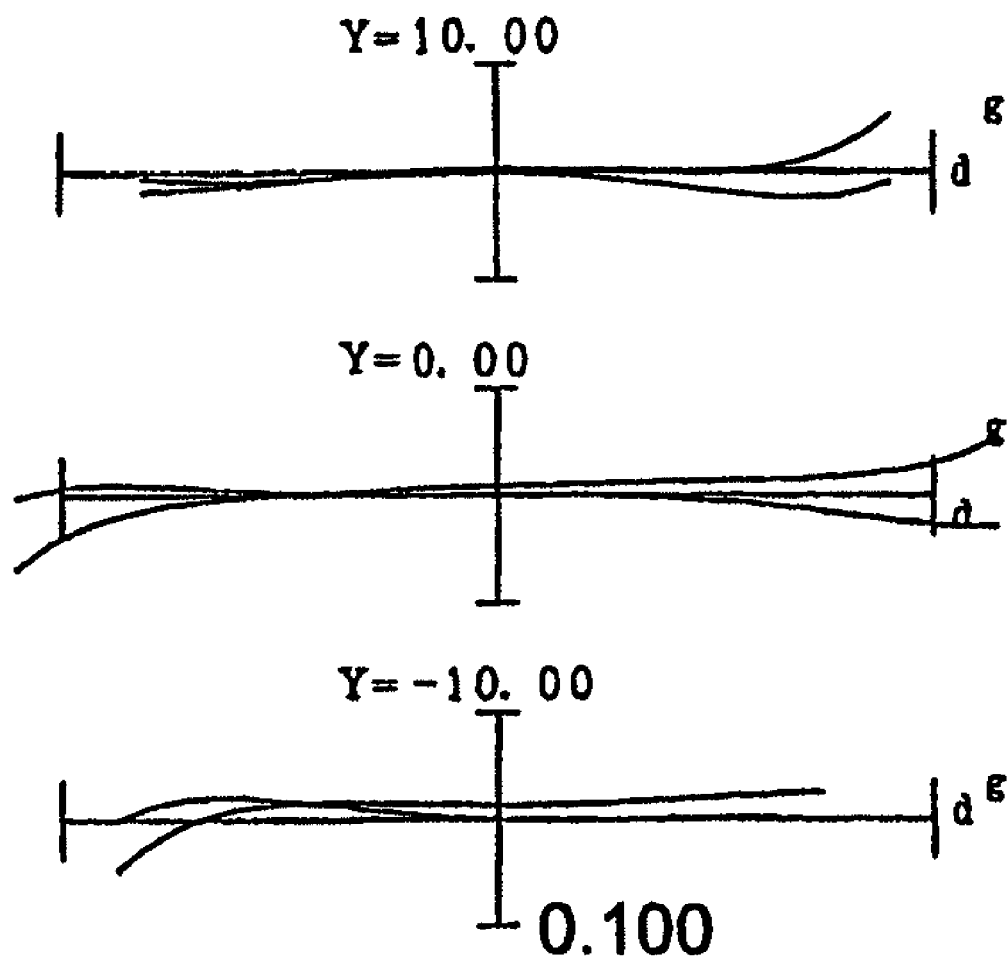
Figure 13A:
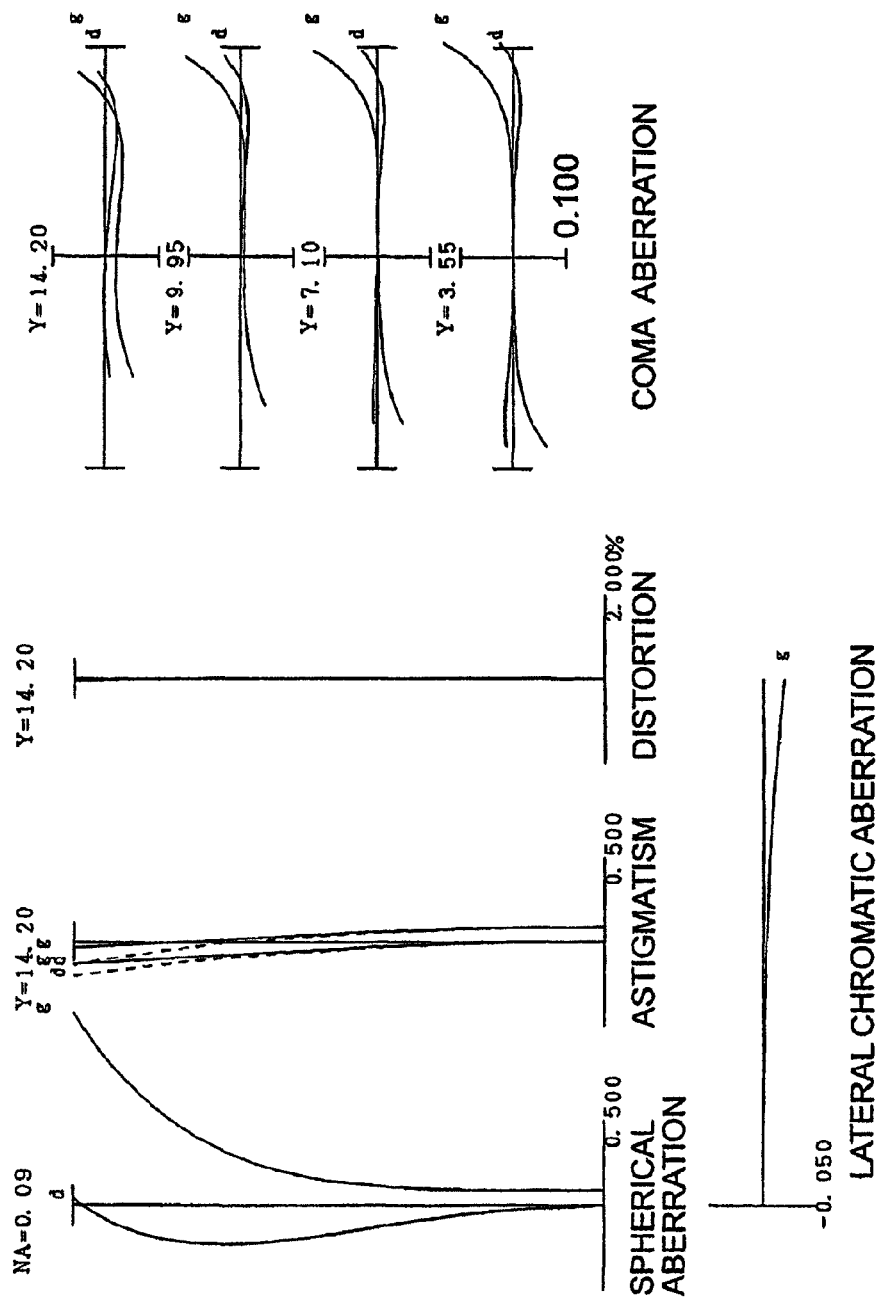
FIG. 13A are graphs showing various aberrations according to Example 3 upon focusing on close distance (photographing magnification −1.0 times), and FIG. 13B are graphs showing coma aberrations according to Example 3 when image blur correction is performed upon focusing on close distance.
Figure 13B:
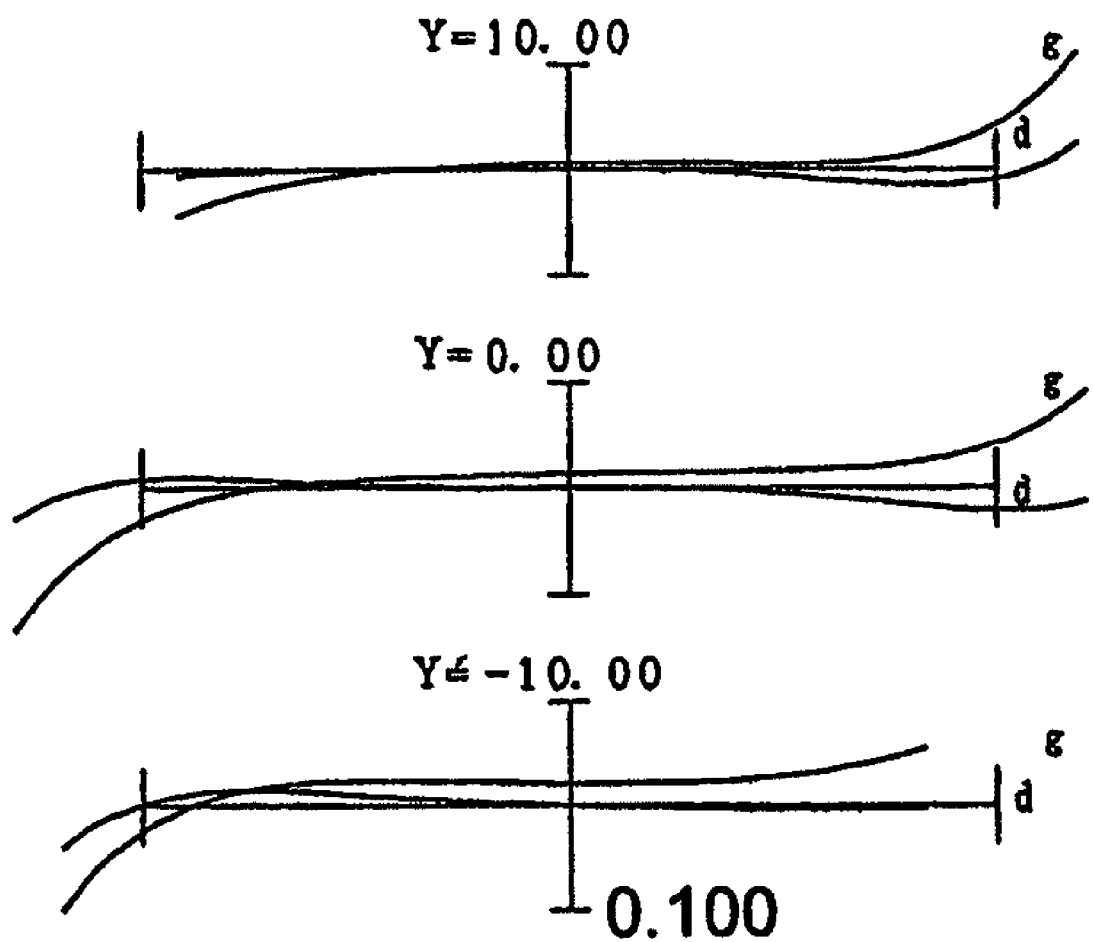

FIG. 11A are graphs showing various aberrations upon focusing on infinity according to Example 3, and FIG. 11B are graphs showing coma aberrations when image blur correction (shift amount of vibration proof group G4=−0.430) is performed upon focusing on infinity according to Example 3. FIG. 12A are graphs showing various aberrations upon focusing on close distance (magnification −0.5 times) according to Example 3, and FIG. 12B are graphs showing coma aberrations when image blur correction (shift amount of vibration proof group G4=0.590) is performed upon focusing on close distance according to Example 3. FIG. 13A are graphs showing various aberrations upon focusing on close distance (magnification 1.0 times) according to Example 3, and FIG. 13B are graphs showing coma aberrations when image blur correction (shift amount of vibration proof group G4=−0.890) is performed upon focusing on close distance (magnification 1.0 times) according to Example 3.

As each of the graphs showing aberrations clarifies, in the imaging lens 1 according to Example 3, various aberrations are well corrected, and excellent image formation performance is implemented. Therefore by installing the imaging lens 1 of Example 3, excellent optical performance can be insured for a digital single-lens reflex camera CAM (optical device, see FIG. 1).

Example 4

Figure 14:
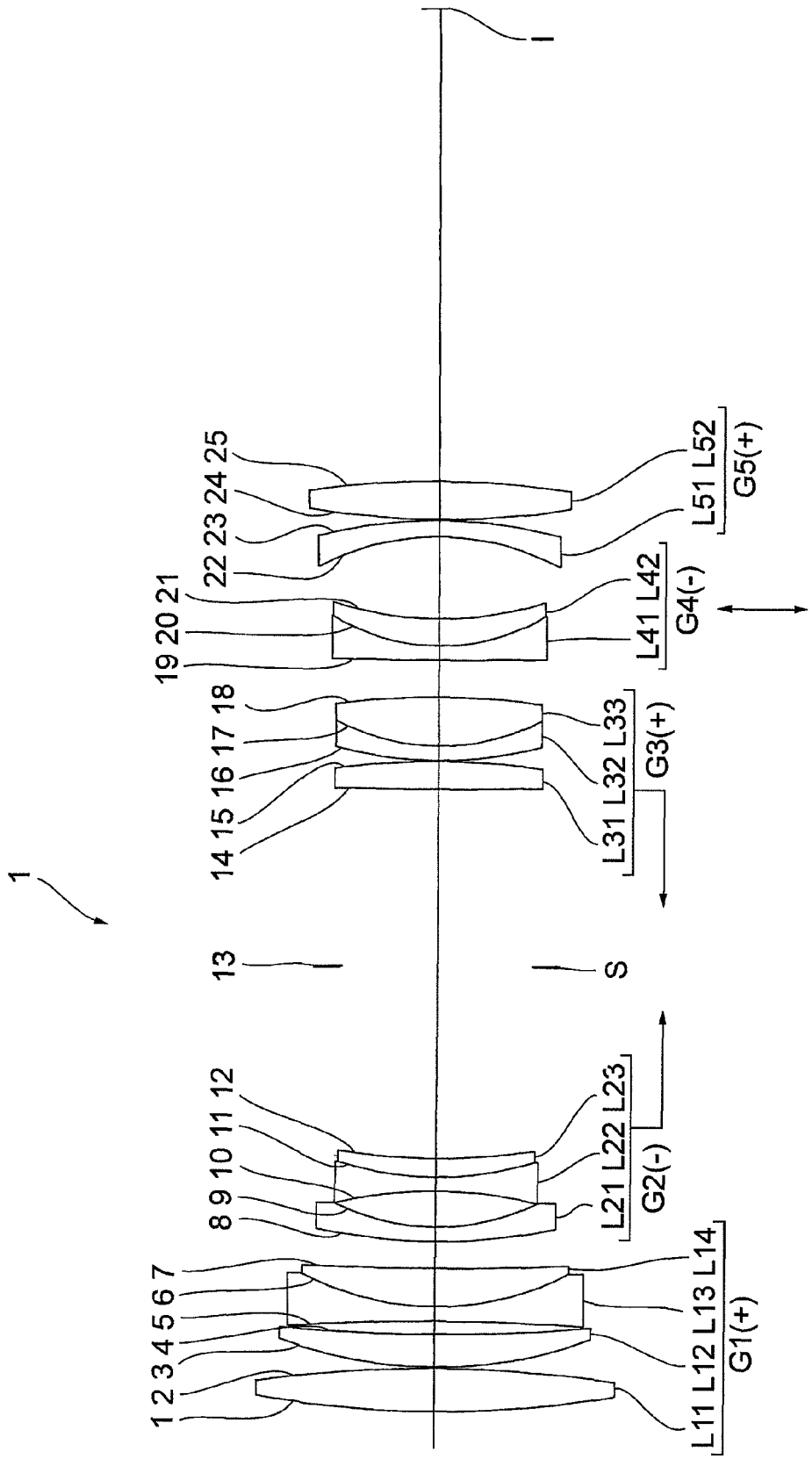
FIG. 14 are cross-sectional views depicting a configuration of an imaging lens according to Example 4.

Example 4 will now be described with reference to FIG. 14 to FIG. 17, and Table 4. FIG. 14 shows the configuration of the imaging lens 1 according to Example 4. The imaging lens 1 according to Example 4 has a positive lens group G1, a negative lens group G2 that moves during focusing, an aperture stop S, a positive lens group G3 that moves during focusing, a negative lens group G4 that can move in a direction substantially vertical to the optical axis, and a positive lens group G5, which are disposed in order from the object. An image surface I is formed on an image sensing element, which is not illustrated, and the image sensing element is a CCD or CMOS, for example.

The positive lens group G1 is comprised of a biconvex positive lens L11, a positive meniscus lens L12 having a convex surface facing the object, and a cemented negative lens formed by a biconcave negative lens L13 and a positive meniscus lens L14 having a convex surface facing the object, which are disposed in order from the object, and this positive lens group G1 has a positive refractive power as a whole, and is fixed with respect to the image surface during focusing from an infinite object point to a close distant object point (hereafter referred to as "during focusing").

The negative lens group G2 is comprised of a negative meniscus lens L21 having a convex surface facing the object, and a cemented negative lens formed by a biconcave negative lens L22 and a positive meniscus lens L23 having a convex surface facing the object, and this negative lens group G2 has a negative refractive power as a whole, and moves from the object to the image during focusing.

The aperture stop S determines the F number, and is fixed with respect to the image surface during focusing.

The positive lens group G3 is comprised of a biconvex positive lens L31, and a cemented positive lens formed by a negative meniscus lens L32 having a convex surface facing the object and a biconvex positive lens L33, which are disposed in order from the object, and this positive lens group G3 has a positive refractive power as a whole, and moves from the image to the object during focusing.

The negative lens group G4 is comprised of a cemented negative lens formed by a negative meniscus lens L41 having a convex surface facing the object, and a positive meniscus lens L42 having a convex surface facing the object, which are disposed in order from the object, and has a negative refractive power as a whole, and this negative lens group G4 is a vibration proof group which performs image blur correction by moving in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface during focusing.

Table 4 shows the parameters in Example 4. The surface numbers 1 to 25 in Table 4 correspond to the surfaces 1 to 25 in FIG. 14. In Table 4, d7 is an axial air distance between the positive lens group G1 and the negative lens group G2, d12 is an axial air distance between the negative lens group G2 and the aperture stop S, d13 is an axial air distance between the aperture stop S and the positive lens group G3, d18 (corresponds to d34 in conditional expression (1) upon focusing on infinity) is an axial air distance between the positive lens group G3 and the negative lens group G4, and d21 is an axial air distance between the negative lens group G4 and the positive lens group G5. In the tables, the values corresponding to the above conditional expressions (1) to (7) are also shown.

TABLE 4

[All parameters]

f = 85 mm, 2ω = 19.1°, FNO = 3.6, VR = 1.198

[Lens parameters]

| Surface Number | r | d | nd | νd |
|---|---|---|---|---|
| 1 | 94.5503 | 4.0000 | 1.772499 | 49.60 |
| 2 | −102.5923 | 0.1000 | 1.000000 | |
| 3 | 40.3226 | 3.0000 | 1.603112 | 60.64 |
| 4 | 161.8931 | 1.2000 | 1.000000 | |
| 5 | −198.2614 | 1.3000 | 1.717362 | 29.52 |
| 6 | 25.8028 | 3.5000 | 1.743997 | 44.78 |
| 7 | 260.6120 | d7 | 1.000000 | |
| 8 | 51.7013 | 1.3000 | 1.516800 | 64.12 |
| 9 | 20.5649 | 3.3000 | 1.000000 | |
| 10 | −38.0996 | 1.3000 | 1.516800 | 64.12 |
| 11 | 29.0031 | 1.7000 | 1.846660 | 23.78 |
| 12 | 55.4855 | d12 | 1.000000 | |
| 13 | Aperture stop S | d13 | 1.000000 | |
| 14 | 396.7224 | 2.5000 | 1.497820 | 82.56 |
| 15 | −69.1295 | 0.1000 | 1.000000 | |
| 16 | 34.9897 | 1.3000 | 1.846660 | 23.78 |
| 17 | 19.9040 | 4.5000 | 1.607379 | 56.81 |
| 18 | −66.9784 | d18 | 1.000000 | |
| 19 | 477.6668 | 1.3000 | 1.834000 | 37.16 |
| 20 | 18.0165 | 2.5000 | 1.846660 | 23.78 |
| 21 | 30.7025 | d21 | 1.000000 | |
| 22 | −23.0290 | 1.5000 | 1.518229 | 58.90 |
| 23 | −42.6798 | 0.1000 | 1.000000 | |
| 24 | 70.7338 | 3.5000 | 1.785896 | 44.20 |
| 25 | −80.8632 | Bf | 1.000000 | |

[Variable distance during focusing]

| | Infinite distance | Close distance | |
|---|---|---|---|
| f, β | 85.00000 | −0.50000 | −1.00000 |
| D0 | 0.0000 | 198.4024 | 126.9853 |
| d7 | 2.48182 | 9.76336 | 16.85967 |
| d12 | 17.57212 | 10.29058 | 3.19427 |
| d13 | 16.21060 | 9.59583 | 3.55809 |
| d18 | 3.38562 | 10.00039 | 16.03813 |
| d21 | 7.52193 | 7.52193 | 7.52193 |
| Bf | 43.26878 | 43.26878 | 43.26878 |

[Camera lens group data]

| Group No. | First surface of group | Focal length of group |
|---|---|---|
| G1 | 1 | 45.244 (=f1) |
| G2 | 8 | −29.928 (=f2) |
| G3 | 14 | 34.293 (=f3) |
| G4 | 19 | −39.995 (=f4) |
| G5 | 22 | 89.301 (=f5) |

[Conditional expressions]

d34 = 3.359
Conditional expression (1) (−f4)/d34 = 11.907
Conditional expression (2) f5/d34 = 26.586
Conditional expression (3) f3/d34 = 10.209
Conditional expression (4) (−f2)/d34 = 8.910
Conditional expression (5) f1/d34 = 13.469
Conditional expression (6) (rb + ra)/(rb − ra) = −2.321
Conditional expression (7) N2nav = 1.5168

As the parameters in Table 4 show, the imaging lens 1 according to the present example satisfies all the above conditional expressions (1) to (7).

Figure 15A:
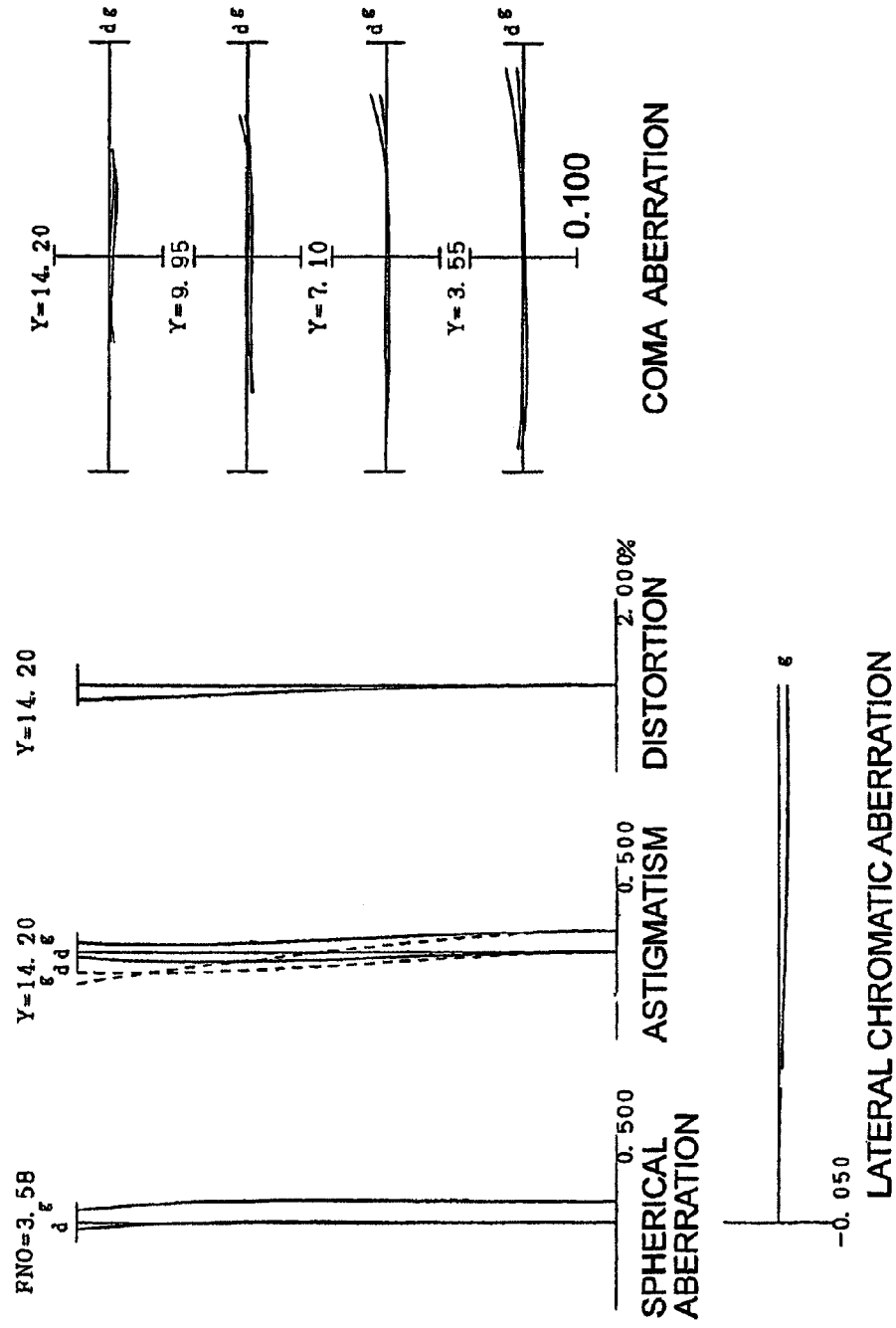
FIG. 15A are graphs showing various aberrations according to Example 4 upon focusing on infinity, and FIG. 15B are graphs showing coma aberrations according to Example 4 when image blur correction is performed upon focusing on infinity.
Figure 16A:
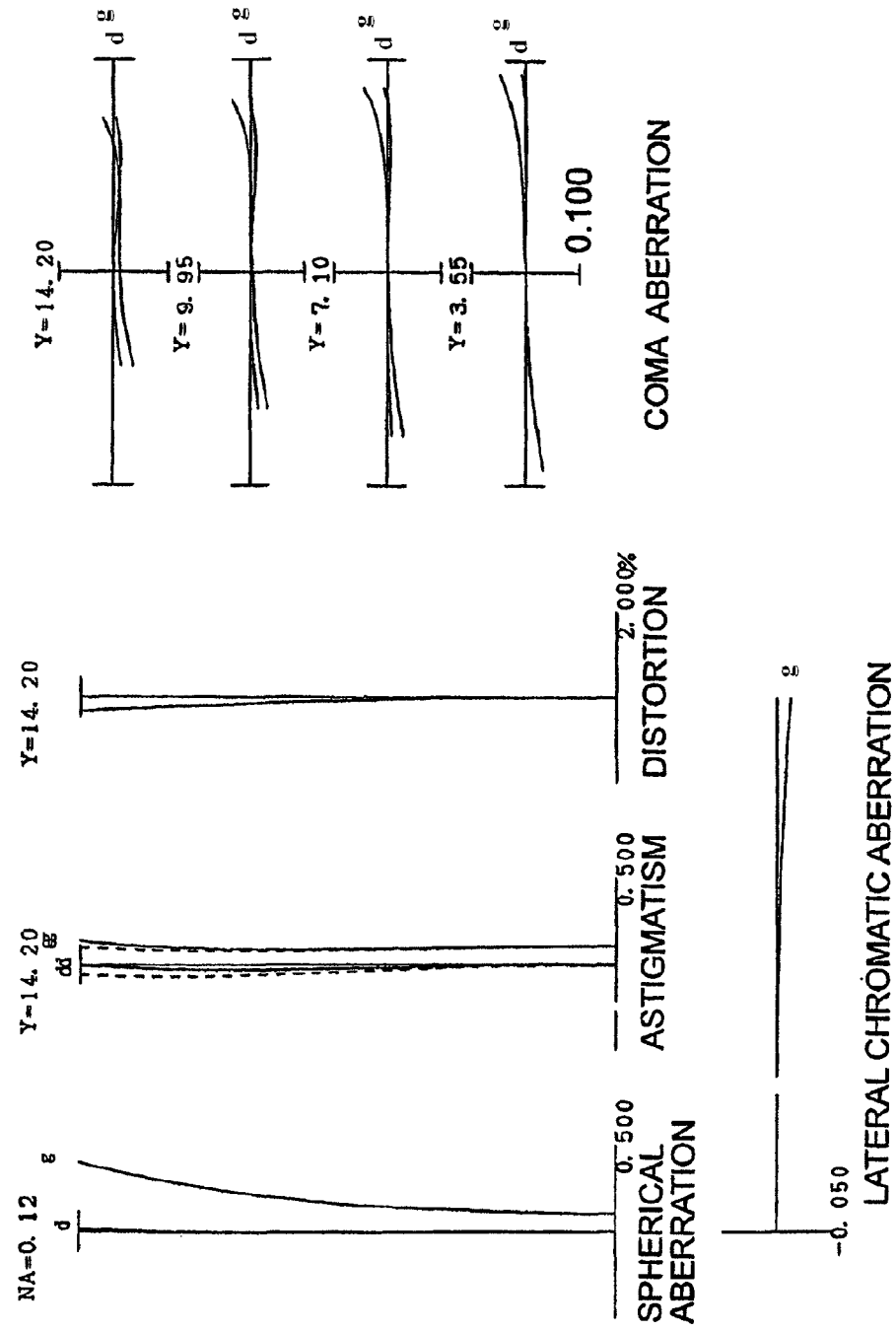
FIG. 16A are graphs showing various aberrations according to Example 4 upon focusing on close distance (photographing magnification −0.5 times), and FIG. 16B are graphs showing coma aberrations according to Example 4 when image blur correction is performed upon focusing on close distance.
Figure 16B:
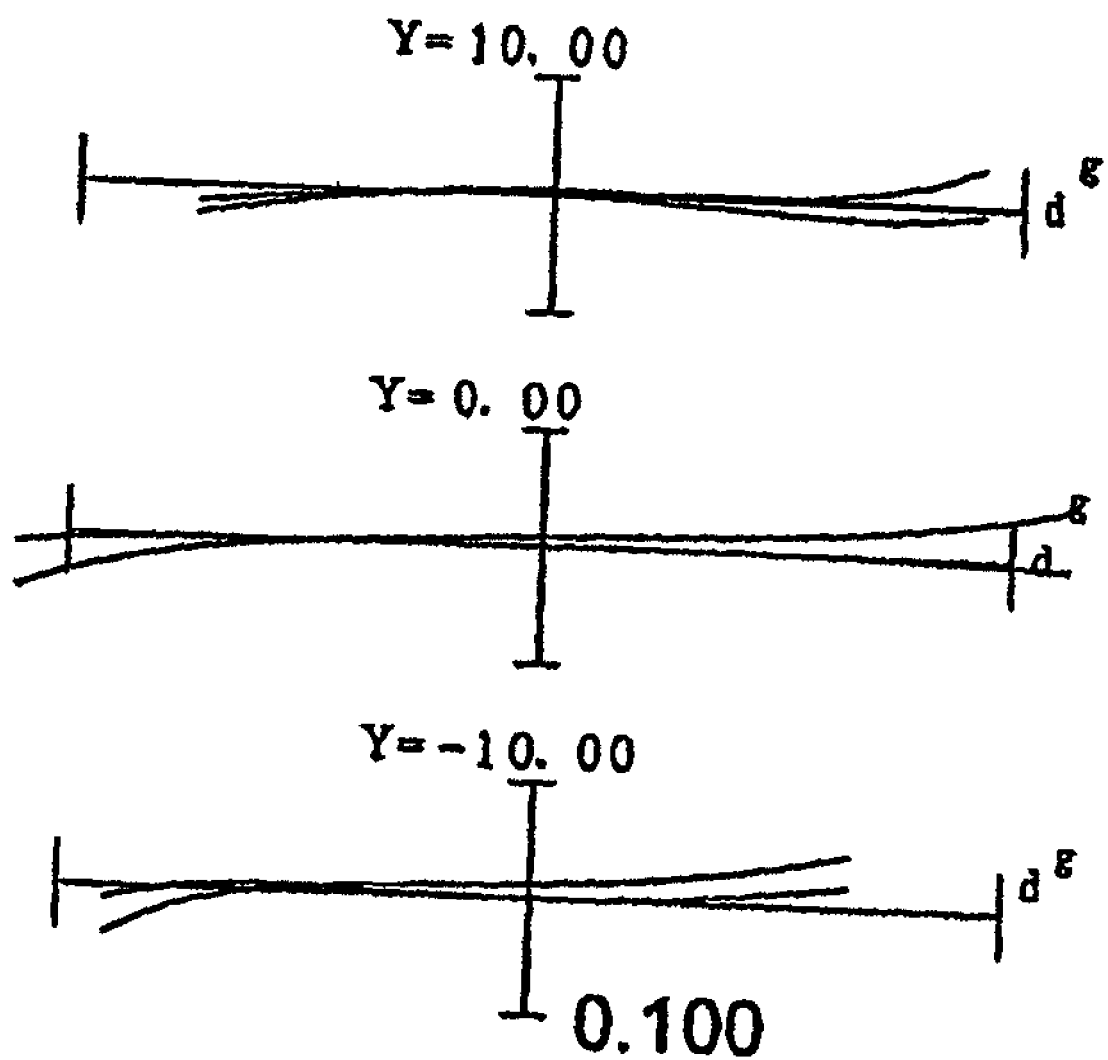
Figure 17A:
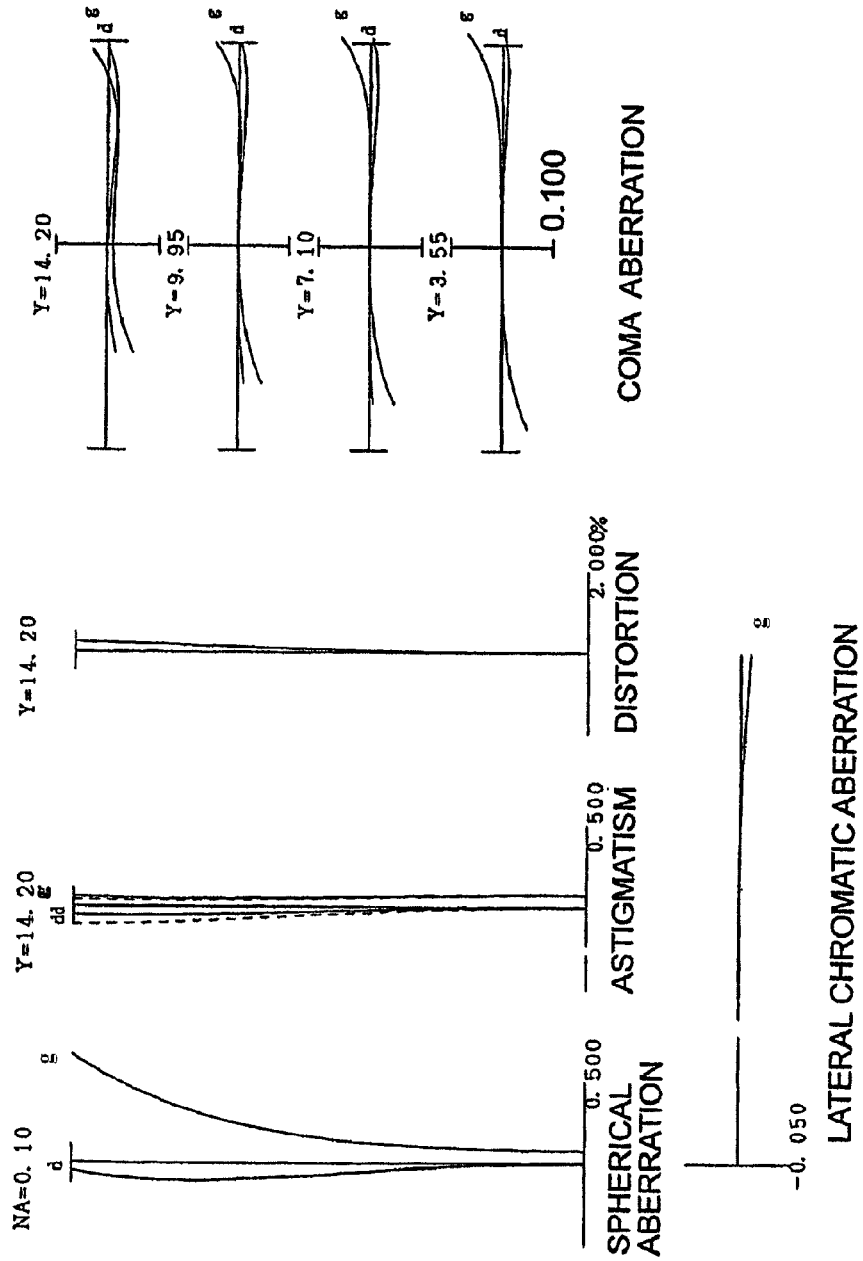
FIG. 17A are graphs showing various aberrations according to Example 4 upon focusing on close distance (photographing magnification −1.0 times), and FIG. 17B are graphs showing coma aberrations according to Example 4 when image blur correction is performed upon focusing on close distance.
Figure 17B:
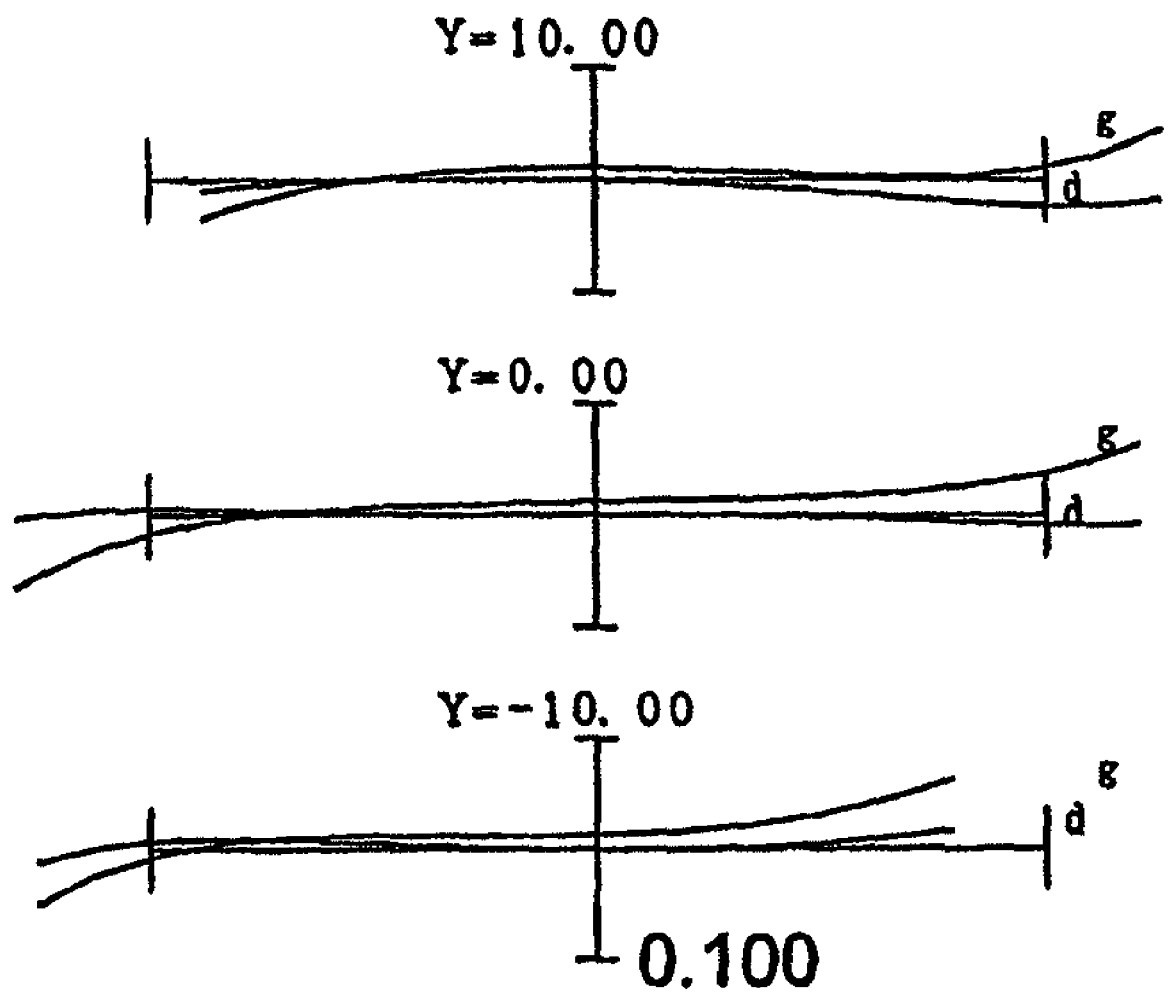

FIG. 15A are graphs showing various aberrations upon focusing on infinity according to Example 4, and FIG. 15B are graphs showing coma aberrations when image blur correction (shift amount of vibration proof group G4=−0.430) is performed upon focusing on infinity according to Example 4. FIG. 16A are graphs showing various aberrations upon focusing on close distance (magnification −0.5 times) according to Example 4, and FIG. 16B are graphs showing coma aberrations when image blur correction (shift amount of vibration proof group G4=−0.590) is performed upon focusing on close distance according to Example 4. FIG. 17A are graphs showing various aberrations upon focusing on close distance (magnification 1.0 times) according to Example 4, and FIG. 17B are graphs showing coma aberrations when image blur correction (shift amount of vibration proof group G4=−0.890) is performed upon focusing on close distance (magnification 1.0 times) according to Example 4.

As each of the graphs showing aberrations clarifies, in the imaging lens 1 according to Example 4, various aberrations are well corrected, and excellent image formation performance is implemented. Therefore by installing the imaging lens 1 of Example 4, excellent optical performance can be insured for a digital single-lens reflex camera CAM (optical device, see FIG. 1).

In the above embodiment, the following content can be used within a scope that does not diminish the optical performance.

In each of the examples, a five-group configuration is used, but other group configurations, such as sixth group and seventh group, can be used. In concrete terms, a configuration where a positive or negative lens group is added on the side closest to the object, a configuration where a positive or negative lens group is added on the side closest to the image, or a configuration where a positive or negative lens group is added between the third group and fourth group, can be used. In this case, d34 is a minimum value of the distance between the lens surface closest to the image in the lens group disposed closest to the object among the four groups and the lens surface closest to the object of the four groups. A negative lens group may be added between the fourth group and fifth group to improve the vibration proof performance.

In the imaging lens according to the present embodiment, a single or a plurality of lens group(s) or a part of a lens group may be a focusing lens group which moves the lenses in the optical axis direction so as to perform focusing from an infinite object to a close distant object. This focusing lens group can be applied to auto focus, and is suitable for a motor drive (by an ultrasonic motor, for example) for auto focus.

In the imaging lens according to the present embodiment, the lens surface may be aspherical. The aspherical surface may be an aspherical surface created by grinding processing, a glass mold aspherical surface created by forming glass to be an aspherical shape using a die, or a composite aspherical surface created by forming resin in an aspherical shape on the surface of glass. The lens surface may be a diffraction surface, and the lens may be a refractive index distributed lens (GRIN lens) or plastic lens.

In the imaging lens of the present embodiment, it is preferable that the aperture stop S is fixed between the second group and third group, with respect to the image surface during focusing, but the aperture stop may not be disposed, but be replaced by a lens frame.

An anti-reflection film having high transmittance in a wide wavelength range may be formed on each lens surface so that flares and ghosts are decreased, and good optical performance with high contrast is implemented.

In the imaging lens of the present embodiment, the focal length, converted to 35 mm film size, is about 100 to 135 mm.

In the imaging lens of the present embodiment, it is preferable that the first group (positive lens group G1) has two positive lens components and one negative lens component. It is also preferable that the first group has the lens components in order of positive, positive and negative from the object, which are disposed with air distance therebetween. It is even more preferable to use a cemented lens for the negative lens components.

In the imaging lens of the present embodiment, it is preferable that the third group (positive lens group G3) has two positive lens components. It is also preferable that the third group has the lens components in order of positive and positive from the object, which are disposed with air distance therebetween. It is even more preferable to use a cemented lens for the second positive lens component.

In the imaging lens of the present embodiment, it is preferable that the fifth group (positive lens G5) has one positive lens component and one negative lens component. It is preferable that the fifth group has the lens components in order of negative and positive from the object, which are disposed with air distance therebetween.

In the imaging lens of the present embodiment, it is preferable that the fourth group (negative lens group G4) is comprised of one lens component. It is even more preferable to use a cemented lens for this lens component.

Description of the Second Group of Preferred Embodiments

Figure 18:
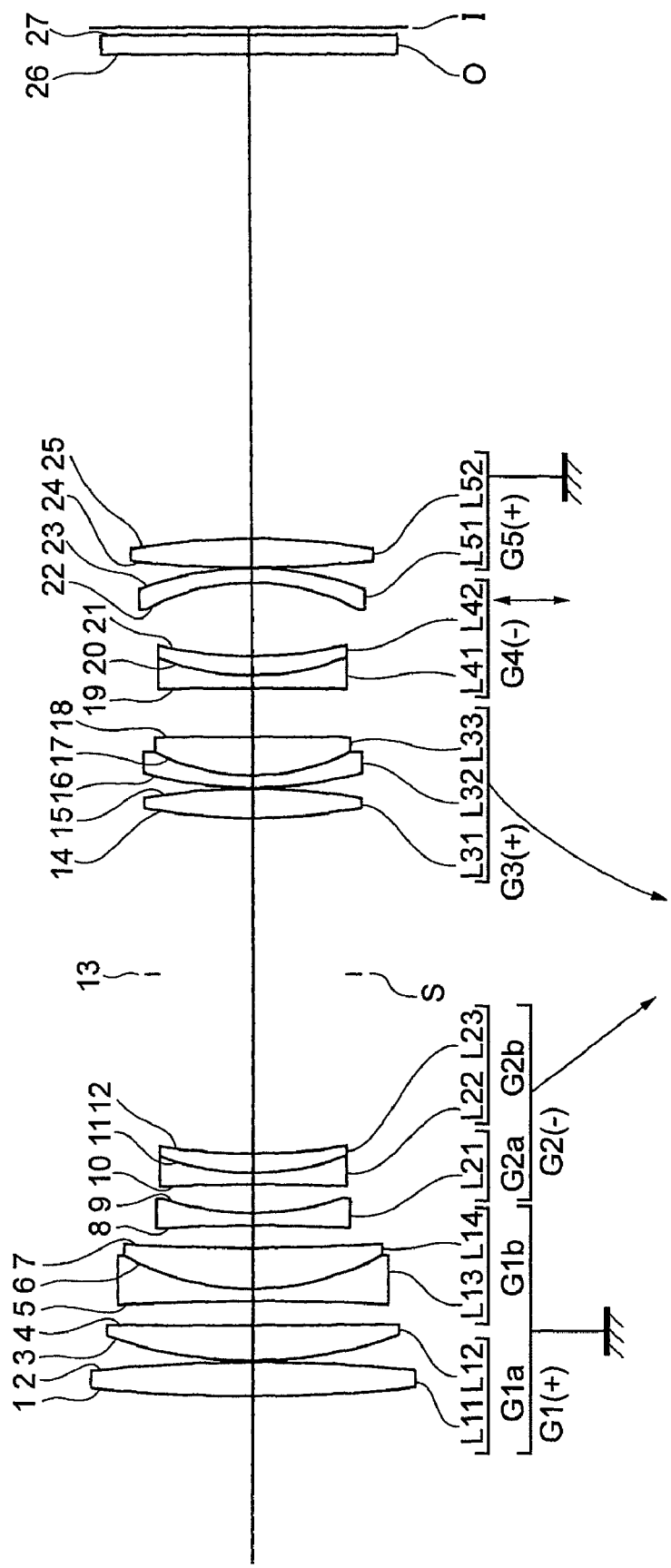
FIG. 18 are cross-sectional views depicting a configuration of an imaging lens according to Example 5.

Embodiments of a second group will be described next with reference to the drawings. The imaging lens 1 according to the present embodiment is used for the camera CAM shown in FIG. 1, just like the case of the above mentioned embodiments of the first group, and since the configuration of the camera CAM is the same as described above, the description thereof is omitted. As FIG. 18 shows, this imaging lens 1 comprises at least a positive lens group G1, a negative lens group G2 that moves during focusing, a positive lens group G3 that moves during focusing, a negative lens group G4 that can be moved so as to have a movement component in a direction substantially vertical to an optical axis, and a positive lens group G5, which are disposed in order from an object.

The positive lens group G1 has a biconvex lens, a positive meniscus lens having a convex surface facing the object, and a cemented lens, which is formed by a biconcave lens and a positive meniscus lens, and has a negative refractive power, which are disposed in order from the object, and is fixed with respect to the image surface, upon focusing from infinity to a closest distance.

The negative lens group G2 has a biconcave lens and a cemented lens, which is formed by a biconcave lens and a positive lens having a convex surface facing the object, and has a negative refractive power, which are disposed in order from the object, and moves in a direction from the object to the image, upon focusing from infinity to the closest distance.

The positive lens group G3 has a positive lens, and a cemented lens, which is formed by a negative lens and a positive lens, and has a positive refractive power, which are disposed in order from the object, and moves in a direction from the image to the object upon focusing from infinity to the closest distance.

The negative lens group G4 is a vibration proof group having a cemented lens, which is formed by a negative lens and a positive lens, and has a negative refractive power, and corrects image blur (vibration proof) generated by motion blur, by moving so as to have a movement component in a direction substantially vertical to the optical axis. By this configuration, the negative lens group G4 can suppress changes of decentering coma aberration, curvature of field and chromatic aberration during vibration proof. It is preferable that the cemented lens of the negative lens group G4 has a biconcave shape as a whole, since changes of the decentering coma aberration and curvature of field during vibration proofing can be further suppressed.

The positive lens group G5 has a negative meniscus lens having a concave surface facing the object, and a biconvex lens, which are disposed in order from the object, and is fixed with respect to the image surface during focusing from infinity to the closest distance. By this configuration, the upper coma aberration can be well corrected while maintaining the spherical aberration in good condition.

According to the present embodiment, an aperture stop S is disposed between the negative lens group G2 and the positive lens group G3, and is fixed with respect to the image surface upon focusing from infinity to the closest distance. By this configuration, the fluctuation of curvature of field during focusing is suppressed, and aberration fluctuation during vibration proofing can be minimized.

When a lens which can photograph an object in a close distance has a vibration proof function, as in the case of this imaging lens 1, it is preferable that the negative lens group, disposed behind the aperture stop S (the negative lens group G4 in the case of the present embodiment), is a vibration proof group, since the fluctuation of decentering coma aberration and curvature of field during vibration proofing can be minimized. It is also preferable to dispose a positive lens group behind the vibration proof group (the positive lens group G5 in the case of the present embodiment), then not only can the vibration proof coefficient be set to an optimum value, but also the decentering coma aberration during vibration proofing can be improved.

The vibration proof coefficient is as described above, and if the vibration proof coefficient is 1, the image blur correction amount becomes the same as the vibration proof correction optical system shift amount, and if the vibration proof coefficient is 1 or higher, a sufficient image blur correction amount for the image surface can be acquired with a small shift amount of the vibration proof group. However, if the vibration proof coefficient is too high, aberration fluctuation during vibration proofing and sensitivity during assembly increase, which is not desirable. Hence in practical terms, an optimum amount should be selected. In the present embodiment, it is preferable to determine a refractive power of each lens group so that the vibration proof coefficient satisfies the range of the following conditional expression (8). By satisfying this range, the changes of decentering coma aberration and curvature of field during vibration proofing can be suppressed, without increasing the size of the optical system.

Now the imaging lens 1 according to the present embodiment in the second group will be described using each conditional expression.

Based on the above configuration, the imaging lens 1 satisfies the following expression (8)

$$1.21 < VR < 3.0 \qquad (8)$$

where Bvr is a lateral magnification of the negative lens group that can move so as to have a movement component in a direction substantially vertical to the optical axis, Br is a lateral magnification of an entire optical system which is disposed closer to the image than the negative lens group that can move so as to have a movement component in a direction substantially vertical to the optical axis, VR is a vibration proof coefficient, and the vibration proof coefficient is defined as $VR = |(1-Bvr) \times Br|$.

The above conditional expression (8) is a conditional expression to optimize the vibration proof coefficient VR. The value of the vibration proof coefficient VR is closely related a good correction of various aberrations generated during vibration proofing, such as decentering coma aberration and curvature of field, the size of the vibration proof group, and an increase in the size of the vibration proof mechanism, so it is desirable to set the conditional expression (8) to be an optimum value in order to provide a compact and good performing imaging lens with a vibration proof function.

In the case of exceeding the upper limit value of the conditional expression (8), if a predetermined image blur correction amount is secured, the vibration coefficient VR becomes too large, and the vibration proof correction optical system shift amount for image blur correction becomes a very small value. This affects the vibration proof control accuracy and makes accurate control difficult. As a result, the vibration proof group and other lens groups have strong refractive power, and the fluctuation of decentering coma aberration and curvature of field during vibration proofing increases, which is not desirable. It is preferable to set the upper limit value of the conditional expression (8) to 2.5, since a good effect is implemented by correction of the decentering coma aberration and curvature of field. The effect of the present embodiment can be exhibited to the maximum if the upper limit value of the conditional expression (8) is set to 2.0, more preferably 1.8.

On the other hand, not reaching the lower limit value of the conditional expression (8) means that the vibration proof coefficient VR decreases, so if a predetermined image blur correction amount is secured, the vibration proof correction optical system shift amount increases dramatically. Then the size of the vibration proof group increases, and the size of the vibration proof mechanism and size of the entire lens barrel increase as a result, which is not desirable. In the aberration correction, the balance of refractive powers of the positive lens group and the negative lens group is lost, the correction of spherical aberration worsens as a result, and the difference of the spherical aberration due to wavelength tends to increases, which is not desirable. Also if a predetermined image blur correction is secured, moving distance during vibration proofing increases, thereby the fluctuation of the decentering coma aberration and curvature of field may worsen, which is not desirable. It is preferable that the lower limit value of the conditional expression (8) is set to 1.24, more preferably 1.27, since optical performance during vibration proofing, particularly the correction of decentering coma aberration, improves. The effect of the present embodiment can be exhibited to the maximum if the lower limit value of the conditional expression (8) is set to 1.29, more preferably 1.31.

In the present embodiment, it is preferable that a condition of the following expression (9)

$$1.0<(-f4)/d34<20.0 \quad (9)$$

is satisfied, where f4 is a focal length of the negative lens group G4, that can move so as to have a movement component in a direction substantially vertical to the optical axis, and d34 is an air distance on the optical axis up focusing on infinity, between a lens surface disposed closest to the image side of the lens group (positive lens group G3 in this embodiment) which is disposed to an object side of the negative lens group G4 that can move so as to have a movement component in a direction substantially vertical to the optical axis, and a lens surface disposed closest to the object side of the negative lens group G4 that can move so as to have a movement component in a direction substantially vertical to the optical axis.

The above conditional expression (9) is a conditional expression in which the focal length f4 of the negative lens group G4, that can move so as to have a movement component in a direction substantially vertical to the optical axis, that is, the vibration proof group G4, is optimized, and the level of the refractive power is indicated by the value of the focal length of the vibration proof group G4. Changing the value of the focal length f4 of the vibration proof group G4 means changing the magnification based on the expression of the above mentioned vibration proof coefficient VR. As a result, the conditional expression (9) becomes an element to set the vibration proof coefficient VR to be an optimum value.

The reason conditional expression (9) is standardized by the air distance d34 between the lens surface disposed closest to the image of the lens group (positive lens group G3), which is disposed to the object side of the vibration proof group G4, and the lens surface disposed closest to the object of the vibration proof group G4 upon focusing on infinity on the optical axis, is because the distance between the aperture stop S and the vibration proof group G4 is maintained to be an optimum value when the aperture stop S is disposed to the object side of the vibration proof group G4, for example. If the distance between the aperture stop S and the vibration proof group G4 is very short, the vibration proof mechanism and the stop mechanism cause a mechanical interference, and if the distance is very long, the paraxial pupil beam passes through a peripheral area of the vibration proof group G4, which increases the fluctuation of curvature of field and causes an increase in the decentering coma aberration during vibration proofing, so in any case, the result is not desirable. Therefore it is necessary to set the air distance d34 to an optimum value.

In the case of exceeding the upper limit value of the above conditional expression (9), in terms of the focal length f4 of the vibration proof group G4, the negative refractive power dramatically decreases and the vibration proof coefficient decreases as a result, and the shift amount of the vibration proof group G4 must be increased in order to obtain a predetermined image blur correction amount, which increases the size of the vibration proof mechanism, and is therefore not desirable. Also aberration fluctuation, particularly fluctuation of decentering coma aberration, increases during vibration proofing, which is not desirable. In terms of the air distance d34 on the optical surface upon focusing on infinity, between the lens surface disposed closest to the image of the lens group (positive lens group G3), which is disposed to the object side of the vibration proof group G4, and then lens surface disposed closest to the object of the vibration proof group G4, if the upper limit value of the conditional expression (9) is exceeded, which means that the air distance d34 dramatically decreases, so the vibration proof mechanism and stop mechanism cause a mechanical interference, and designing a configuration becomes difficult. It is preferable that the upper limit value of the conditional expression (9) is set to 17.0, since this has a good effect on the correction of coma aberration and downsizing. The effect of the present embodiment can be expressed to the maximum if the upper limit value of the conditional expression (9) is set to 15.0, more preferably 10.0.

In the case of not reaching the lower limit value of the above mentioned conditional expression (9), in terms of the focal length f4 of the vibration proof group G4, the negative refractive power dramatically increases, and performance deteriorates considerably, with the increase in decentering coma aberration during vibration proofing and fluctuation of curvature of field, which is not desirable. In terms of the air distance d34 on the optical axis upon focusing on infinity, between the lens surface disposed closest to the image of the lens group (positive lens group G3), which is disposed to the object side of the vibration proof group G4, and the lens surface disposed closest to the object of the vibration proof group G4, not reaching the lower limit value of the conditional expression (9) means that the air distance d34 dramatically increases, so the paraxial pupil beam passes through the peripheral area of the vibration proof group G4, which causes fluctuation of the curvature of field, and increases the decentering coma aberration during vibration proofing, and is therefore not desirable. It is preferable that the lower limit value of the conditional expression (9) is set to 2.0, since optical performance, particularly correction of coma aberration, during vibration proofing improves. The effect of the present invention can be expressed to the maximum if the lower limit value of the conditional expression (9) is set to 4.0, more preferably 5.0.

In the present embodiment, it is preferable that a condition of the following expression (10)

$$1.0 < f5/d34 < 40.0 \quad (10)$$

is satisfied, where f5 is a focal length of the positive lens group G5 which is disposed to an image side of the negative lens group G4 (vibration proof group) that can move so as to have a movement component in a direction substantially vertical to the optical axis (positive lens group disposed closest to the object if a plurality of positive lens groups exist to the image side of the negative lens group G4), and d34 is an air distance on the optical axis up focusing on infinity, between a lens surface disposed closest to the image side of the lens group (positive lens group G3 in this embodiment) which is disposed to an object side of the negative lens group G4 that can move so as to have a movement component in a direction substantially vertical to the optical axis, and a lens surface disposed closest to the object side of the negative lens group G4 that can move so as to have a movement component in a direction substantially vertical to the optical axis.

The above conditional expression (10) is a conditional expression in which the focal length f5 of the positive lens group G5, disposed to the image side of the vibration proof group G4, is optimized. The positive lens group G5 relates to the correction of the upper coma aberration, curvature of field and lateral chromatic aberrations in terms of aberration correction, and relates to a value of the vibration proof coefficient and fluctuation of the decentering coma aberration and fluctuation of curvature of field during vibration proofing.

Exceeding the upper limit value of the conditional expression (10) means the focal length f5 of the positive lens group G5 increases, therefore the balance with the refractive power of the vibration proof group G4, having negative refractive power, is lost, and as a result the upper coma aberration and curvature of field worsen, which is not desirable. It is preferable that the upper limit value of the conditional expression (10) is set to 35.0, since the correction of the upper coma aberration improves. The effect of the present embodiment can be exhibited to the maximum if the upper limit value of the conditional expression (10) is set to 29.0, more preferably 26.0.

On the other hand, not reaching the lower limit value of the conditional expression (10) means that the focal length f5 of the positive lens group G5 decreases, that is, the refractive power of the positive lens group G5 increases dramatically. In this case, the correction of upper coma aberration and curvature of field becomes more difficult, and fluctuation of the decentering coma aberration and curvature of field during vibration proofing also worsens, which is not desirable. It is preferable that the lower limit value of the conditional expression (10) is set to 5.0, since this is effective for correction of coma aberration during vibration proofing. The effect of the present embodiment can be exhibited to the maximum if the lower limit value of the conditional expression (10) is set to 7.0, more preferably 10.0.

In the present embodiment, it is preferable that a condition of the following expression (10)

$$1.0 < f3/d34 < 18.0 \quad (11)$$

is satisfied, where f3 is a focal length of the positive lens group G3 that moves during focusing, and d34 is an air distance on the optical axis up focusing on infinity, between a lens surface disposed closest to the image side of the lens group (positive lens group G3 in this embodiment) which is disposed to an object side of the negative lens group G4 that can move so as to have a movement component in a direction substantially vertical to the optical axis, and a lens surface disposed closest to the object side of the negative lens group G4 that can move so as to have a movement component in a direction substantially vertical to the optical axis.

The above conditional expression (11) is a conditional expression in which the focal length f3 of the positive lens group G3, that moves during focusing, is optimized. In the case of the optical system having an ability to focus from infinity to the equal magnification of photographing distance, as in the case of this embodiment, the positive lens group G3 has a role to effectively suppress fluctuation of curvature of field and fluctuation of spherical aberration, and this effect is implemented by the positive lens group G3 having a predetermined refractive power moving in a direction to the object upon focusing from an infinite object point to a close distant object point.

If the upper limit value of the conditional expression (11) is exceeded, the focal length f3 of the positive lens group G3 increases, and the refractive power becomes much lower than the optimum value, causing an imbalance between the pre- and post-lens groups, and as a result, the spherical aberration is over-corrected, and the curvature of field worsens, which is not desirable. It is preferable that the upper limit value of the conditional expression (11) is set to 13.7, since the correction of the spherical aberration improves. The effect of the present embodiment can be exhibited to the maximum if the upper limit value of the conditional expression (11) is set to 13.0, more preferably 12.0.

On the other hand, not reaching the lower limit value of the conditional expression (11) means that the focal length f3 of the positive lens group G3 decreases, and the refractive power thereof becomes much higher than the optimum value. In this case, an imbalance between the pre- and post-lens groups occurs, and as a result, the spherical aberration is insufficiently corrected, and aberration correction of the entire lens system becomes more difficult. It is preferable that the lower limit value of the conditional expression (11) is set to 2.0, since the correction of the spherical aberration improves. The effect of the present embodiment can be exhibited to the maximum if the lower limit value of the conditional expression (11) is set to 4.0, more preferably 7.0.

In the present embodiment, it is preferable that a condition of the following expression (12)

$$1.0 < (-f2)/d34 < 17.0 \quad (12)$$

is satisfied, where f2 is a focal length of the negative lens group G2 that moves during focusing, and d34 is an air distance on the optical axis up focusing on infinity, between a lens surface disposed closest to the image side of the lens group (positive lens group G3 in this embodiment) which is disposed to an object side of the negative lens group G4 that can move so as to have a movement component in a direction substantially vertical to the optical axis, and a lens surface disposed closest to the object side of the negative lens group G4 that can move so as to have a movement component in a direction substantially vertical to the optical axis.

The above conditional expression (12) is a conditional expression in which the focal length f2 of the negative lens group G2, that moves during focusing, is optimized. In the case of the optical system having an ability to focus from infinity to the equal magnification of the photographing distance, as in the case of this embodiment, the negative lens group G2 has a role to effectively suppress fluctuation of close distance aberration, particularly fluctuation of the curvature of field and fluctuation of a spherical aberration, and this effect is implemented by the negative lens group G2 having a predetermined refractive power moving in a direction to the image upon focusing from an infinite object point to a close distant object point.

If the upper limit value of the conditional expression (12) is exceeded, the negative refractive power of the negative group G2 decreases. Then the correction of the spherical aberration becomes insufficient in the case of close distance, and as a result, close distance fluctuation increases, which is not desirable. The back focus also decreases, which is also not desirable. It is preferable that the upper limit value of the conditional expression (12) is set to 16.0, since the correction of the spherical aberration improves. The effect of the present embodiment can be exhibited to the maximum if the upper limit value of the conditional expression (12) is set to 15.5, more preferably 15.0.

On the other hand, not reaching the lower limit value of the conditional expression (12) means that the negative refractive power of the negative lens group G2 increases, and the spherical aberration is over-corrected in the case of close distance, and fluctuation of the curvature of field fluctuates, and as a result, the close distance fluctuation increases, which is not desirable. Also the back focus increases dramatically, which increases the size of the entire lens system, and is therefore not desirable. It is preferable that the lower limit value of the conditional expression (12) is set to 2.0, since the correction of the spherical aberration and correction of the curvature of field improve. The effect of the present embodiment can be exhibited to the maximum if the lower limit value of conditional expression (12) is set to 4.0, more preferably 5.0.

In the present embodiment, it is preferable that a condition of the following expression (13)

$$1.0 < f1/d34 < 20.0 \qquad (13)$$

is satisfied, where f1 is a focal length of the positive lens group G1, that is disposed closest to the object side, and d34 is an air distance on the optical axis up focusing on infinity, between a lens surface disposed closest to the image side of the lens group (positive lens group G3 in this embodiment) which is disposed to an object side of the negative lens group G4 that can move so as to have a movement component in a direction substantially vertical to the optical axis, and a lens surface disposed closest to the object side of the negative lens group G4 that can move so as to have a movement component in a direction substantially vertical to the optical axis.

The above conditional expression (13) is a conditional expression in which the focal length f1 of the positive lens group G1, that is disposed closest to the object side, is optimized. The positive lens group G1 is fixed during focusing, and has a role to effectively correct the spherical aberration and lower coma aberration throughout the entire system.

Exceeding the upper limit value of the conditional expression (13) means that the focal length f1 of the positive lens group G1 increases and the refractive power decreases, so the spherical aberration is over-corrected, which is not desirable. Also the back focus increases, which increases the outer diameter of the lens so as to obtain a predetermined F number, and as a result, the lens size increases, which is not desirable. It is preferable that the upper limit value of the conditional expression (13) is set to 16.5, since the correction of the spherical aberration improves. The effect of the present embodiment can be exhibited to the maximum if the upper limit value of the conditional expression (13) is set to 16.0, more preferably 13.0.

On the other hand, not reaching the lower limit value of the conditional expression (13) means that the focal length f1 of the position lens group G1 decreases and the refractive power increases dramatically, so the correction of spherical aberration becomes insufficient and the curvature of field fluctuates, which is not desirable. Also the back focus decreases, which is also not desirable. It is preferable that the lower limit value of the conditional expression (13) is set to 2.0, since the correction of the spherical aberration and correction of the curvature of field improve. The effect of the present embodiment can be exhibited to the maximum if the lower limit value of the conditional expression (13) is set to 4.0, more preferably 7.0.

In the present embodiment, it is preferable that the negative lens group G2, that moves during focusing, further comprises a negative lens L21 and a cemented lens formed by a negative lens L22 and positive lens L23, which are disposed in order from the object, and a condition of the following expression (14)

$$-1.0 < (rb+ra)/(rb-ra) \leq 0 \qquad (14)$$

is satisfied, where ra is a radius of curvature of an object side surface of the negative lens L21, and rb is a radius of curvature of an image side surface of this negative lens L21.

The above conditional expression (14) is a conditional expression on a form factor (q factor) of a negative lens L21 of the negative lens group G2 that moves during focusing. It is preferable that the negative lens group G2 has a negative lens L21 and a cemented lens formed by a negative lens L22 and positive lens L23, which are disposed in order from the object. Since aberration fluctuates during focusing, in particular the fluctuations of spherical aberration, lower coma aberration and curvature of field, are effectively suppressed. The shape of the negative lens (negative lens L21 in this embodiment), disposed closest to the object side of the negative lens group G2, is preferably a shape with which spherical aberration is effectively corrected.

Exceeding the upper limit value of the conditional expression (14) means that the value of the form factor (q factor) becomes positive, and the negative lens L21 becomes a shape of a plano concave lens or meniscus concave lens having a convex surface instead of a surface facing the image side, and the object side surface has a large angle of deviation with respect to the angle of view, so the close distance fluctuation of the lower coma aberration and curvature of field increase, which is not desirable. It is preferable that the upper limit value of the conditional expression (14) is set to −0.05, since the lower coma aberration can be well corrected. The effect of the present embodiment can be exhibited to the maximum if the upper limit value of the conditional expression (13) is set to −0.1, more preferably −0.2.

On the other hand, not reaching the lower limit value of the conditional expression (14) means that the shape becomes a meniscus shape having a convex surface facing the object. Therefore the angle of deviation with respect to the beam to determine the F number dramatically changes, which worsens spherical aberrations, and is therefore not desirable. It is preferable that the lower limit value of the conditional expression (14) is set to −0.95, since the correction of the spherical aberration improves. The effect of the present embodiment can be exhibited to the maximum if the lower limit value of the conditional expression (14) is set to −0.9, more preferably to −0.85.

In the present embodiment, it is preferable that the positive lens group (positive lens group G1 in this embodiment), disposed closest to the object side, has a positive lens subgroup G1a and a negative lens subgroup G1b, which are disposed in order from the object, and a condition of the following expression (15)

$$0.005 < Da/Fo < 0.09 \quad (15)$$

is satisfied, where Da is an air distance on the optical axis between the positive lens subgroup G1a and the negative lens subgroup G1b, and Fo is a focal length of the entire optical system upon focusing on infinity.

The above conditional expression (15) is a conditional expression for setting the air distance Da between the positive lens subgroup G1a and the negative lens subgroup G1b in the positive lens group G1 that is fixed at a position closest to the object side, to an optimum value.

Exceeding the upper limit value of the conditional expression (15) dramatically increases the air distance between the positive lens subgroup G1a and the negative lens subgroup G1b, that is, the dead space with the focusing lens group G2 disappears, which makes focusing difficult. As a result, the size of the lens system increases, which is not desirable. If downsizing is forcibly attempted, the other lens groups have a strong refractive power, which worsens the spherical aberration and coma aberration as a result, and is therefore not desirable. It is desirable that the upper limit value of the conditional expression (15) is set to 0.08, since the correction of the spherical aberration improves. The effect of the present invention can be exhibited to the maximum if the upper limit value of the conditional expression (15) is set to 0.06, more preferably 0.04.

On the other hand, not reaching the lower limit value of the conditional expression (15) dramatically decreases the air distance between the positive lens subgroup G1a and the negative lens subgroup G1b, and if lens contact (contacting the edges of lenses for support) is attempted, the radius of curvature of the lens surfaces facing each other is restricted for both the positive lens subgroup G1a and the negative lens subgroup G1b. As a result, this restriction makes it difficult to accurately correct the spherical aberration and lower coma aberration. The correction of the axial chromatic aberration is also negatively influenced, which is not desirable. It is preferable that the lower limit value of the conditional expression (15) is set to 0.008, since the correction of the spherical aberration improves. The effect of the present embodiment can be exhibited to the maximum if the lower limit value of the conditional expression (15) is set to 0.01, more preferably 0.015.

In the present embodiment, it is preferable that the negative lens group (negative lens group G2 in this embodiment) that moves during focusing has a negative subgroup G2a and a negative lens subgroup G2b, which are disposed in order from the object, and a condition of the following expression (16)

$$0.02 < Db/Fo < 0.08 \quad (16)$$

is satisfied, where Db is an air distance on the optical axis between the negative lens subgroup G2a and the negative lens subgroup G2b, and Fo is a focal length of the entire optical system upon focusing on infinity.

The above conditional expression (16) is a conditional expression for setting the air distance Db between the negative lens subgroup G2a and the negative lens subgroup G2b in the negative lens group G2 that moves during focusing.

Exceeding the upper limit value of the conditional expression (16) dramatically increases the air distance between the negative lens subgroup G2a and the negative lens subgroup G2b, that is, the overall length of the negative lens group G2 dramatically increases, and the dead space for moving during focusing disappears, and as a result, the size of the lens system increases, which is not desirable. If downsizing is forcibly attempted, the other lens groups have a strong refractive power, which worsens the spherical aberration and coma aberration as a result, and is therefore not desirable. It is preferable that the upper limit value of the conditional expression (16) is set to 0.07, since the correction of the spherical aberration improves. The effect of the present invention can be exhibited to the maximum if the upper limit value of the conditional expression (16) is set to 0.06, more preferably 0.05.

On the other hand, not reaching the lower limit value of the conditional expression (16) dramatically decreases the air distance between the negative lens subgroup G2a and the negative lens subgroup G2b, and if lens contact is attempted, the radius of curvature of the lens surfaces facing each other is restricted, for both the negative lens subgroup G2a and the negative lens subgroup G2b, so restriction is generated in the radius of curvature of the lens surface closest to the image side of the negative lens subgroup G2a and the lens surface closest to the object side of the negative lens subgroup G2b. As a result, this restriction makes it difficult to accurately correct the spherical aberration and coma aberration in close distance fluctuation. It is preferable that the lower limit value of the conditional expression (16) is set to 0.025, since the correction of the spherical aberration improves. The effect of the present embodiment can be exhibited to the maximum if the lower limit value of the conditional expression (16) is set to 0.028, more preferably 0.03.

EXAMPLES OF THE SECOND GROUP

Concrete examples of the imaging lens according to the embodiments of the second group will now be described with reference to the drawings.

Example 5

Example 5 will now be described with reference to FIG. 18 to FIG. 21, and Table 5. FIG. 18 shows the configuration of the imaging lens 1 according to Example 5. The imaging lens 1 according to Example 5 has a positive lens group G1, a negative lens group G2 that moves during focusing, an aperture stop S, a positive lens group G3 that moves during focusing, a negative lens group G4 that can move so as to have a movement component in a direction substantially vertical to the optical axis, a positive lens group G5, and an optical low pass filter O, which are disposed in order from an object. An image surface I is formed on an image sensing element 7 in the camera CAM in FIG. 1, and the image sensing element is a CCD or CMOS, for example. In the present example, the optical low pass filter O is disposed just before the image surface I, but actually is constructed with the image sensing element 7 in FIG. 1 as a set.

The positive lens group G1 is comprised of a positive lens subgroup G1a and a negative lens subgroup G1b, which are disposed in order from an object. The positive lens subgroup G1a has a biconvex positive lens L11 and a positive meniscus lens L12 having a convex surface facing the object, which are disposed in order from the object. The negative lens subgroup G1b has a biconcave negative lens L13 and a positive meniscus lens L14 having a convex surface facing the object, which are disposed in order from the object. This positive lens group G1 has a positive refractive power as a whole, and is fixed with respect to the image surface I during focusing from an infinite object point to a close distant object point (hereafter referred to as "during focusing").

The negative lens group G2 is comprised of a negative lens subgroup G2a and a negative lens subgroup G2b, which are disposed in order from the object. The negative lens subgroup G2a has a biconcave lens L21, disposed in order from the object. The negative lens subgroup G2b has a cemented lens formed by a biconcave negative lens L22 and positive meniscus lens L23 having a convex surface facing the object, which are disposed in order from the object. This negative lens group G2 has a negative refractive power as a whole, and moves from the object side to the image side during focusing.

The aperture stop S determines the F number, and is fixed with respect to the image surface I during focusing.

The positive lens group G3 is comprised of a biconvex positive lens L31, and a cemented positive lens formed by a negative meniscus lens L32 having a convex surface facing the object and a biconvex positive lens L33, which are disposed in order from the object, and this positive lens group G3 has a positive refractive power as a whole, and moves from the image to the object during focusing.

The negative lens group G4 is comprised of a cemented negative lens formed by a biconcave negative lens L41 and a positive meniscus lens L42 having a convex surface facing the object, which are disposed in order from the object, and has a negative refractive power as a whole, and this negative lens group G4 is a vibration proof group, which corrects image blur by moving in a direction so as to have a movement component in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface I during focusing.

Table 5 shows the parameters in Example 5. In Table 5, f is a focal length of the entire lens system, $2\omega$ is an angle of view (covering angle), FNO is an F number, BF is back focus, $\beta$ is a photographing magnification, f1 is a focal length of the positive lens group G1, f2 is a focal length of the negative lens group G2, f3 is a focal length of the positive lens group G3, f4 is a focal length of the negative lens group G4, and f5 is a focal length of the positive lens group G5.

In the tables, the surface number is the sequence of the lens surface from the object side, along the beam traveling direction, r is a radius of curvature of each lens surface, d is a surface distance, which is a distance from each optical surface to the next optical surface (or image surface) on the optical axis, vd is an Abbe number based on the d-line, and nd is a refractive index with respect to the d-line (wavelength: 587.6 nm). The surface numbers 1 to 27 in Table 5 correspond to the surfaces 1 to 27 in FIG. 18. In Table 5, d0 is an axial air distance between the object surface (not illustrated) and the positive lens group G1, d7 is an axial air distance between the positive lens group G1 and the negative lens group G2, d12 is an axial air distance between the negative lens group G2 and the aperture stop S, d13 is an axial air distance between the aperture stop S and the positive lens group G3, d18 (corresponds to d34 in conditional expression (8) upon focusing on infinity) is an axial air distance between the positive lens group G3 and the negative lens group G4, d21 is an axial air distance between the negative lens group G4 and the positive lens group G5, and d25 is an axial air distance between the positive lens group G5 and the optical low pass filter O. In the tables, values corresponding to the above conditional expressions (8) to (16) are also shown.

In the tables, "mm" is normally used as the unit for focal length f, radius of curvature r, surface distance d and other lengths. However, a similar optical performance can be acquired even if the optical system is proportionally expanded or reduced, so the unit is not limited to "mm", but another appropriate unit can also be used. The above description on the tables is the same for the other examples, for which this description is omitted.

TABLE 5

[All parameters]

f = 85.04 mm, $2\omega$ = 19.2°, FNO = 3.6

[Lens parameters]

| Surface Number | r | d | nd | vd |
|---|---|---|---|---|
| 1 | 153.8926 | 3.5000 | 49.60 | 1.772499 |
| 2 | −154.5706 | 0.1000 | | |
| 3 | 42.5523 | 3.7000 | 55.53 | 1.696797 |
| 4 | 1245.9823 | 2.4500 | | |
| 5 | −320.8002 | 1.3000 | 29.52 | 1.717362 |
| 6 | 26.6125 | 4.2000 | 48.08 | 1.699998 |
| 7 | 212.0823 | d7 | | |
| 8 | −167.4791 | 1.3000 | 55.52 | 1.696800 |
| 9 | 28.3094 | 2.9500 | | |
| 10 | −216.2226 | 1.2000 | 64.12 | 1.516800 |
| 11 | 26.8641 | 2.0000 | 23.78 | 1.846660 |
| 12 | 61.2228 | d12 | | |
| 13 | Aperture stop S | d13 | | |
| 14 | 56.9717 | 3.0000 | 65.47 | 1.603000 |
| 15 | −66.1004 | 0.1000 | | |
| 16 | 40.1755 | 1.3000 | 27.51 | 1.755199 |
| 17 | 21.4606 | 4.0000 | 82.56 | 1.497820 |
| 18 | −780.3046 | d18 | | |
| 19 | −364.6586 | 1.3000 | 40.77 | 1.883000 |
| 20 | 25.5565 | 2.0000 | 23.78 | 1.846660 |
| 21 | 40.2512 | d21 | | |
| 22 | −22.6638 | 1.5000 | 38.00 | 1.603420 |
| 23 | −31.5953 | 0.1000 | | |
| 24 | 115.8240 | 3.0000 | 40.77 | 1.883000 |
| 25 | −70.6649 | d25 | | |
| 26 | ∞ | 2.0000 | 64.12 | 1.516800 |
| 27 | ∞ | BF | | |

[Variable distance during focusing]

| | Infinite distance | | Close distance |
|---|---|---|---|
| f, $\beta$ | 85.04034 | −0.50000 | −1.00000 |
| d0 | 0.0000 | 218.1695 | 145.3622 |
| d7 | 2.30155 | 11.45995 | 18.06206 |
| d12 | 18.53991 | 9.38151 | 2.77940 |
| d13 | 16.15212 | 9.92441 | 2.28287 |
| d18 | 5.01212 | 11.23983 | 18.88137 |
| d21 | 7.58025 | 7.58025 | 7.58025 |
| d25 | 50.08457 | 50.08457 | 50.08457 |
| BF | 0.68142 | 0.68142 | 0.68142 |

[Camera lens group data]

| Group No. | First surface of group | Focal length of group |
|---|---|---|
| G1 | 1 | 48.7258 (=f1) |
| G2 | 8 | −29.8989 (=f2) |
| G3 | 14 | 36.9275 (=f3) |
| G4 | 19 | −39.9953 (=f4) |
| G5 | 22 | 73.7000 (=f5) |

TABLE 5-continued

[Conditional expressions]

Conditional expression (8) VR = 1.353
Conditional expression (9) (−f4)/d34 = 7.98 (d34 = 5.01)
Conditional expression (10) f5/d34 = 14.70
Conditional expression (11) f3/d34 = 7.37
Conditional expression (12) (−f2)/d34 = 5.97
Conditional expression (13) f1/d34 = 9.72
Conditional expression (14) (rb + ra)/(rb − ra) = −0.7108
Conditional expression (15) Da/Fo = 0.0288
Conditional expression (16) Da/Fo = 0.0347

As the parameters in Table 5 show, the imaging lens 1 according to the present example satisfies all the above conditional expressions (8) to (16).

Figure 19A:
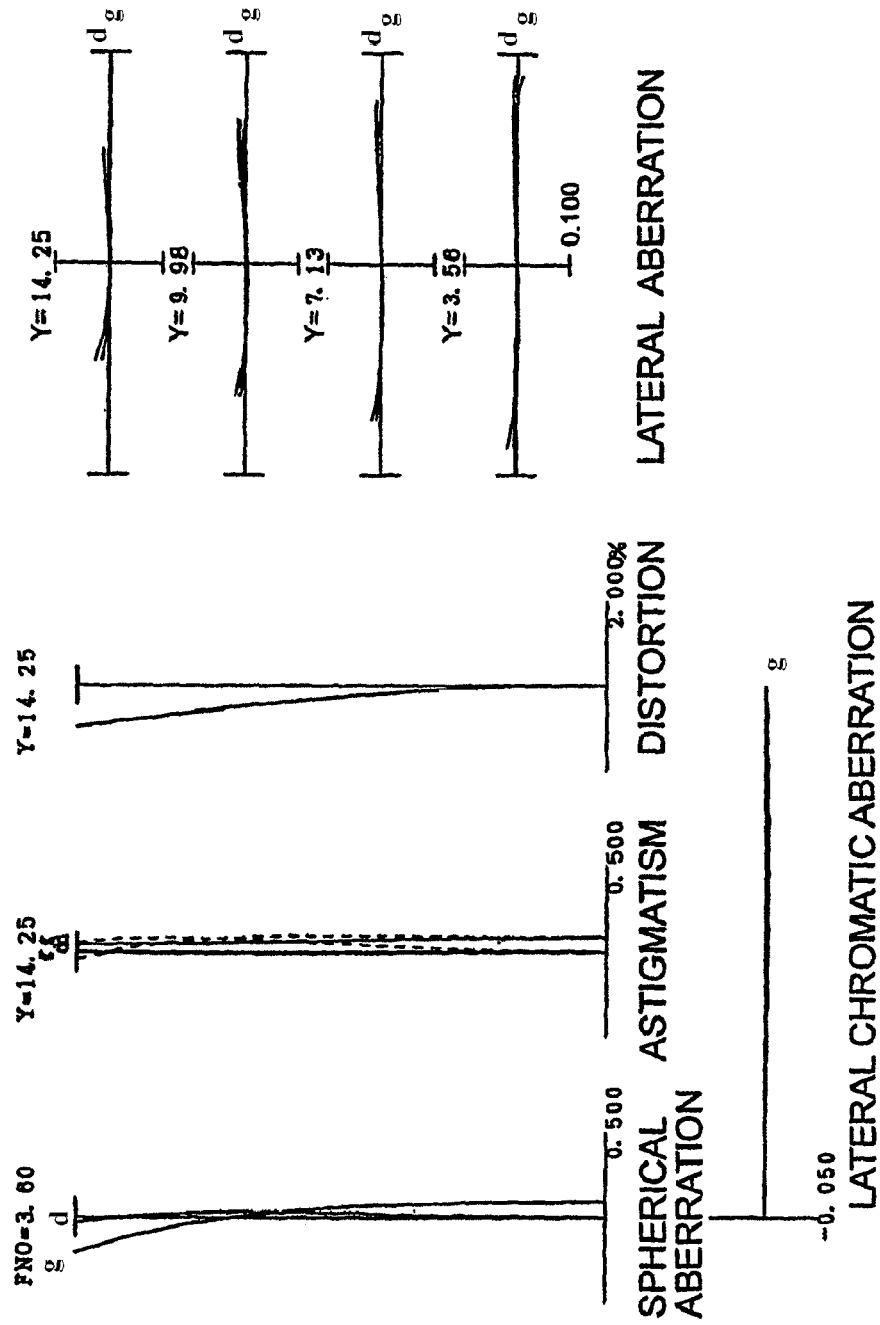
FIG. 19A are graphs showing various aberrations according to Example 5 upon focusing on infinity, and FIG. 19B are graphs showing lateral aberrations according to Example 5 when image blur correction is performed upon focusing on infinity.
Figure 19B:
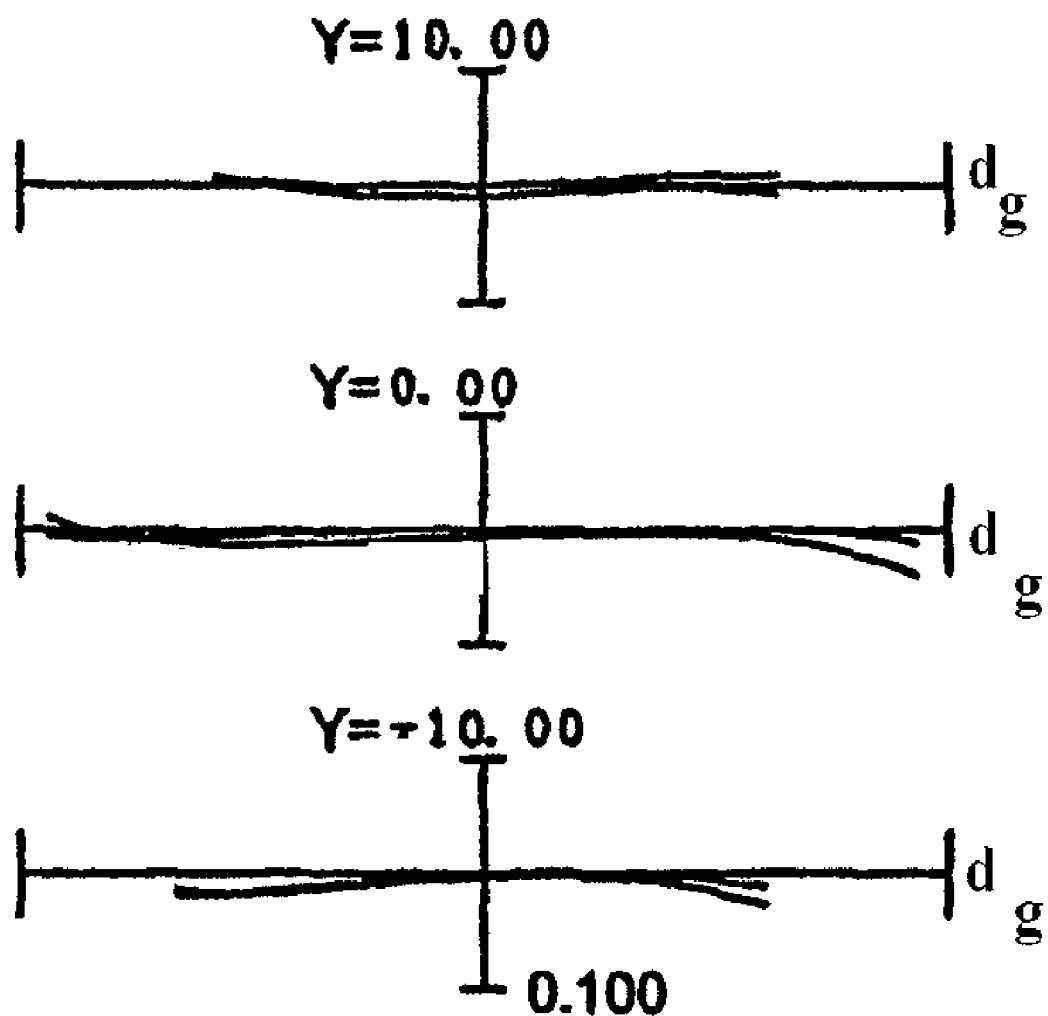
Figure 20A:
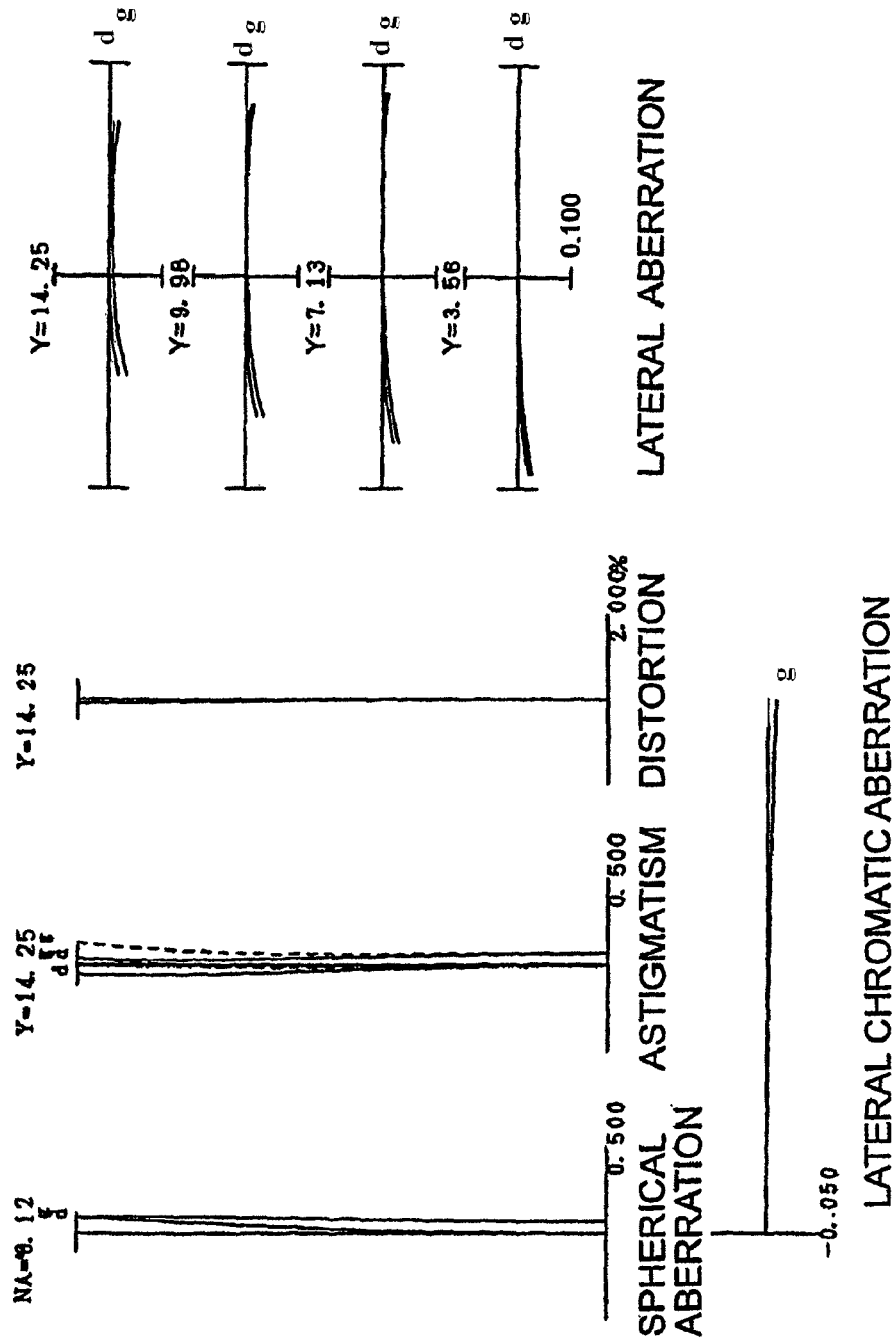
FIG. 20A are graphs showing various aberrations according to Example 5 upon focusing on close distance (photographing magnification −0.5 times), and FIG. 20B are graphs showing lateral aberrations according to Example 5 when image blur correction is performed upon focusing on close distance.
Figure 21B:
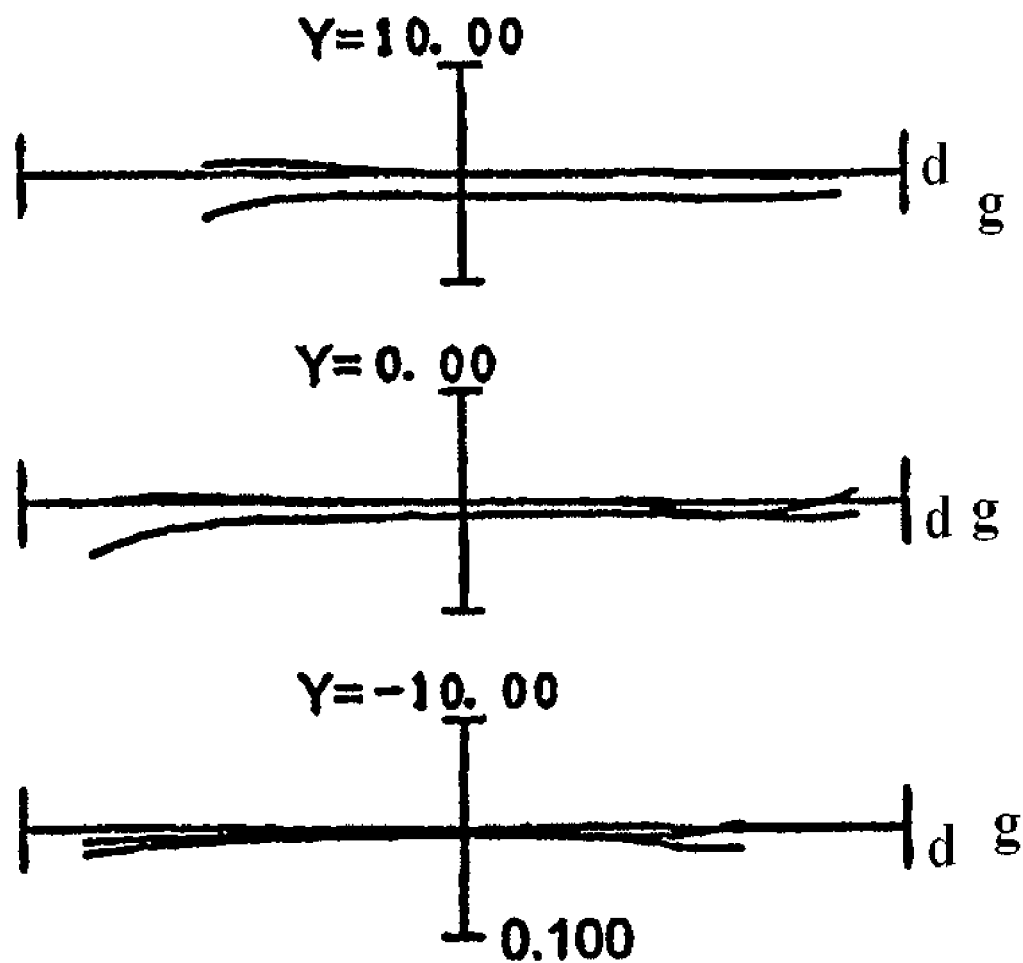
FIG. 21A are graphs showing various aberrations according to Example 5 upon focusing on close distance (photographing magnification −1.0 times), and FIG. 21B are graphs showing lateral aberrations according to Example 5 when image blur correction is performed upon focusing on close distance.

FIG. 19A are graphs showing various aberrations upon focusing on infinity according to Example 5, and FIG. 19B are graphs showing coma aberrations when image blur correction (shift amount of vibration proof group G4=−0.376) is performed upon focusing on infinity according to Example 1. FIG. 20A are graphs showing various aberrations upon focusing on close distance (magnification −0.5 times) according to Example 5, and FIG. 20B are graphs showing lateral aberrations when image blur correction (shift amount of vibration proof group G4=−0.546) is performed upon focusing on close distance according to Example 5. FIG. 21A are graphs showing various aberrations upon focusing on close distance (magnification 1.0 times) according to Example 5, and FIG. 21B are graphs showing lateral aberrations when image blur correction (shift amount of vibration proof group G4=−0.689) is performed upon focusing on close distance (magnification 1.0 times) according to Example 5.

In each of the graphs showing aberrations, FNO is an F number, Y is an image height, d is a d-line (wavelength: 587.6 nm) and g is a g-line (wavelength: 435.6 nm). In the graph showing astigmatism, the solid line indicates a sagittal image surface, and the broken line indicates a meridional image surface. The above description of the graphs showing aberrations is the same for other examples, where this description is omitted.

As each of the graphs showing aberrations clarifies, in the imaging lens 1 according to Example 5, various aberrations are well corrected, and excellent image formation performance is implemented. Therefore by installing the imaging lens 1 of Example 5, excellent optical performance can be insured for a digital single-lens reflex camera CAM (optical device, see FIG. 1).

Example 6

Figure 22:
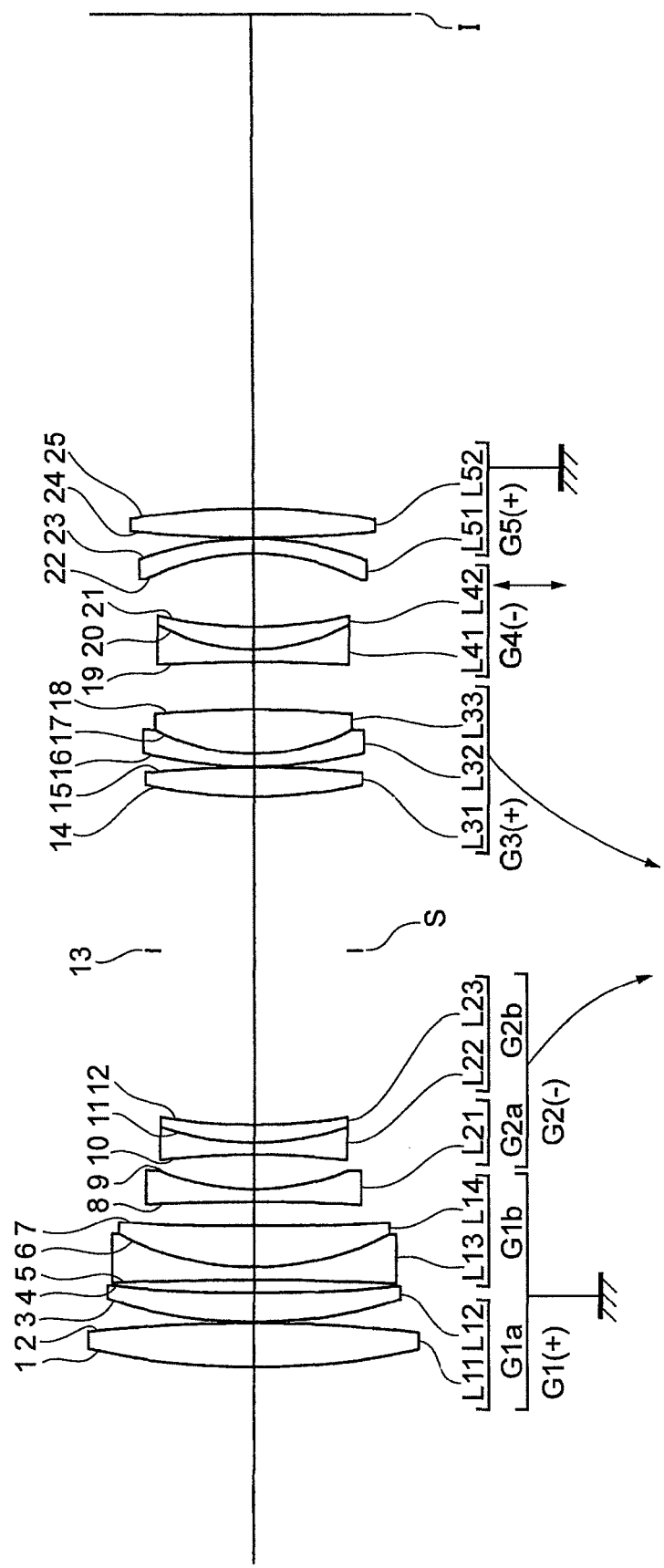
FIG. 22 are cross-sectional views depicting a configuration of an imaging lens according to Example 6.

Example 6 will now be described with reference to FIG. 22 to FIG. 25, and Table 6. FIG. 22 shows the configuration of the imaging lens 1 according to Example 6. The imaging lens 1 according to Example 6 has a positive lens group G1, a negative lens group G2 that moves during focusing, an aperture stop S, a positive lens group G3 that moves during focusing, a negative lens group G4 that can move so as to have a movement component in a direction substantially vertical to the optical axis, and a positive lens group G5, which are disposed in order from an object. An image surface I is formed on an image sensing element 7 in FIG. 1, and the image sensing element 7 is a CCD or CMOS, for example.

The positive lens group G1 is comprised of a positive lens subgroup G1a and a negative lens subgroup G1b. The positive lens subgroup G1a has a biconvex positive lens L11, and a positive meniscus lens L12 having a convex surface facing the object, which are disposed in order from the object. The negative lens subgroup G1b has a cemented negative lens formed by a biconcave negative lens L13 and a positive meniscus lens L14 having a convex surface facing the object, which are disposed in order from the object. This positive lens group G1 has a positive refractive power as a whole, and is fixed with respect to the image surface I during focusing.

The negative lens group G2 is comprised of a negative lens subgroup G2a and a negative lens subgroup G2b, which are disposed in order from the object. The negative lens subgroup G2a has a biconcave lens L21 disposed in order from the object. The negative lens subgroup G2b has a cemented negative lens formed by a biconcave negative lens L22 and a positive meniscus lens L23 having a convex surface facing the object. This negative lens group G2 has a negative refractive power as a whole, and moves from the object to the image during focusing.

The aperture stop S determines the F number, and is fixed with respect to the image surface I during focusing.

The positive lens group G3 is comprised of a biconvex positive lens L31, and a cemented positive lens formed by a negative meniscus lens L32 having a convex surface facing the object, and a biconvex positive lens L33, which are disposed in order from the object, and this positive lens group G3 has a positive refractive power as a whole, and moves from the image to the object during focusing.

The negative lens group G4 is comprised of a cemented negative lens formed by a biconcave lens L41 and a positive meniscus lens L42 having a convex surface facing the object, which are disposed in order from the object, and has a negative refractive power as a whole, and this negative lens group G4 is a vibration proof group which performs image blur correction by moving so as to have a movement component in a direction substantially vertical to the optical axis.

The positive lens group G5 is comprised of a negative meniscus lens L51 having a convex surface facing the image, and a biconvex positive lens L52, which are disposed in order from the object, and has a positive refractive power as a whole, and this positive lens group G5 is fixed with respect to the image surface I during focusing.

Table 6 shows the parameters in Example 6. The surface numbers 1 to 25 in Table 6 correspond to the surfaces 1 to 25 in FIG. 22. In Table 6, d7 is an axial air distance between the positive lens group G1 and the negative lens group G2, d12 is an axial air distance between the negative lens group G2 and the aperture stop S, is an axial air distance between the aperture stop S and the positive lens group G3, d18 (corresponds to d34 in conditional expression (8) upon focusing on infinity) is an axial air distance between the positive lens group G3 and the negative lens group G4, and d21 is an axial air distance between the negative lens group G4 and the positive lens group G5. In the tables, the values corresponding to the above conditional expressions (8) to (16) are also shown.

TABLE 6

[All parameters]

f = 85.04 mm, 2ω = 19.2°, FNO = 3.6

[Lens parameters]

| Surface Number | r | d | nd | vd |
|---|---|---|---|---|
| 1 | 76.3604 | 4.5000 | 49.60 | 1.772499 |
| 2 | −148.8912 | 0.1000 | | |
| 3 | 47.5894 | 3.0000 | 55.53 | 1.696797 |
| 4 | 156.5583 | 1.3000 | | |
| 5 | −295.4947 | 1.3000 | 29.52 | 1.717362 |
| 6 | 29.2740 | 4.2000 | 48.08 | 1.699998 |

TABLE 6-continued

| | | | | |
|---|---|---|---|---|
| 7 | 268.6211 | d7 | | |
| 8 | −257.6864 | 1.3000 | 64.12 | 1.516800 |
| 9 | 25.1073 | 3.5000 | | |
| 10 | −81.4668 | 1.3000 | 64.12 | 1.516800 |
| 11 | 29.1916 | 1.8000 | 23.78 | 1.846660 |
| 12 | 58.9804 | d12 | | |
| 13 | Aperture stop S | d13 | | |
| 14 | 48.3475 | 3.0000 | 63.38 | 1.618000 |
| 15 | −105.1379 | 0.1000 | | |
| 16 | 45.0100 | 1.3000 | 27.51 | 1.755199 |
| 17 | 20.9466 | 4.5000 | 82.56 | 1.497820 |
| 18 | −113.1907 | d18 | | |
| 19 | −163.2115 | 1.3000 | 37.16 | 1.834000 |
| 20 | 19.3875 | 2.3000 | 23.78 | 1.846660 |
| 21 | 41.5812 | d21 | | |
| 22 | −22.7307 | 1.5000 | 58.90 | 1.518229 |
| 23 | −30.7407 | 0.1000 | | |
| 24 | 117.2261 | 3.0000 | 45.30 | 1.795000 |
| 25 | −66.5666 | BF | | |

[Variable distance during focusing]

| | Infinite distance | | Close distance |
|---|---|---|---|
| f, β | 85.04034 | −0.70000 | −1.00000 |
| d0 | 0.0000 | 173.6938 | 144.9021 |
| d7 | 2.48485 | 14.40920 | 17.88657 |
| d12 | 17.79213 | 5.86779 | 2.39042 |
| d13 | 15.77190 | 6.23243 | 1.44831 |
| d18 | 4.95458 | 14.49406 | 19.27818 |
| d21 | 7.56351 | 7.56351 | 7.56351 |
| BF | 50.60784 | 50.60784 | 50.60784 |

[Camera lens group data]

| Group No. | First surface of group | Focal length of group |
|---|---|---|
| G1 | 1 | 48.7258 (=f1) |
| G2 | 8 | −30.2128 (=f2) |
| G3 | 14 | 36.9275 (=f3) |
| G4 | 19 | −39.9953 (=f4) |
| G5 | 22 | 73.7000 (=f5) |

[Conditional expressions]

Conditional expression (8) VR = 1.328
Conditional expression (9) (−f4)/d34 = 8.07 (d34 = 4.955)
Conditional expression (10) f5/d34 = 14.87
Conditional expression (11) f3/d34 = 7.45
Conditional expression (12) (−f2)/d34 = 6.10
Conditional expression (13) f1/d34 = 9.83
Conditional expression (14) (rb + ra)/(rb − ra) = −0.8224
Conditional expression (15) Da/Fo = 0.0153
Conditional expression (16) Db/Fo = 0.0412

As the parameters in Table 6 show, the imaging lens 1 according to the present example satisfies all the above conditional expressions (8) to (16).

Figure 24A:
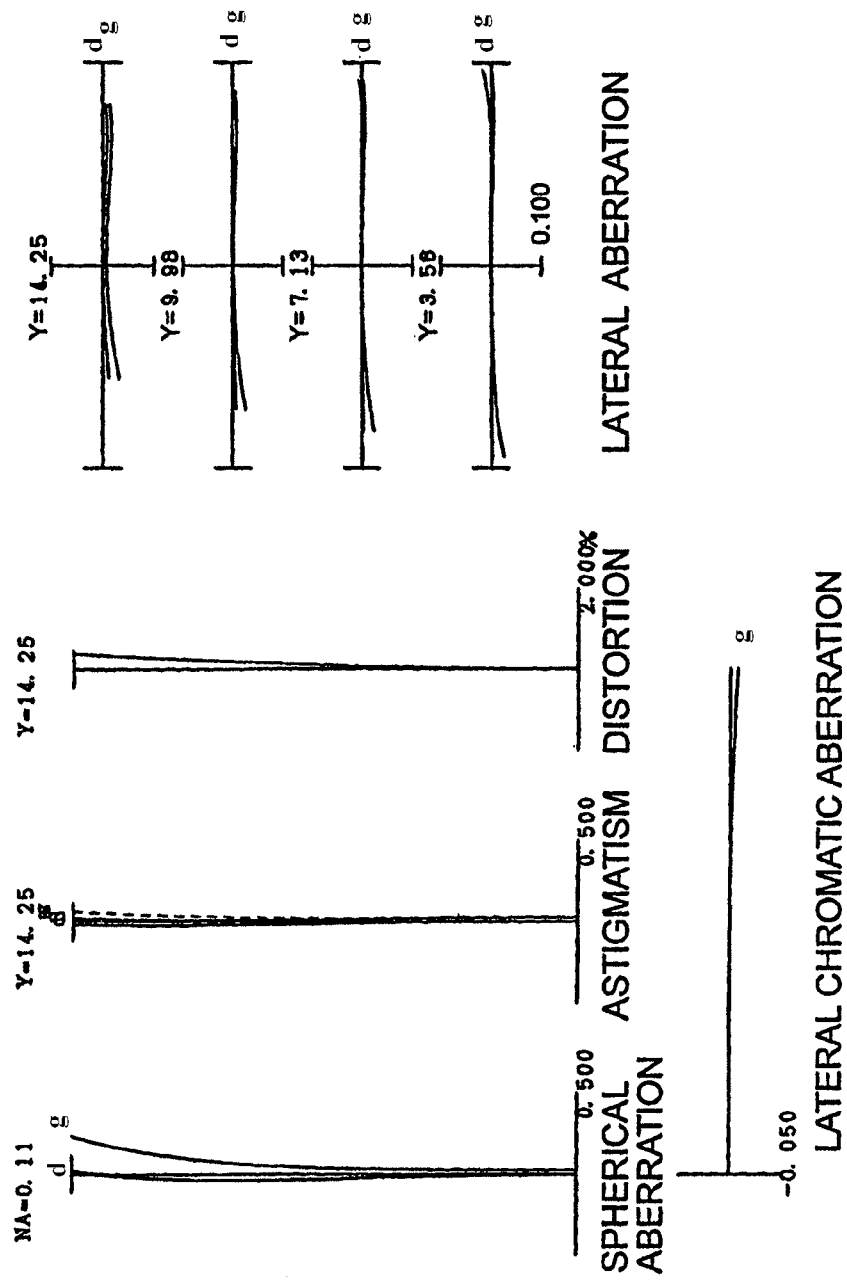
FIG. 24A are graphs showing various aberrations according to Example 6 upon focusing on close distance (photographing magnification −0.7 times), and FIG. 24B are graphs showing coma aberrations according to Example 6 when image blur correction is performed upon focusing on close distance.
Figure 24B:
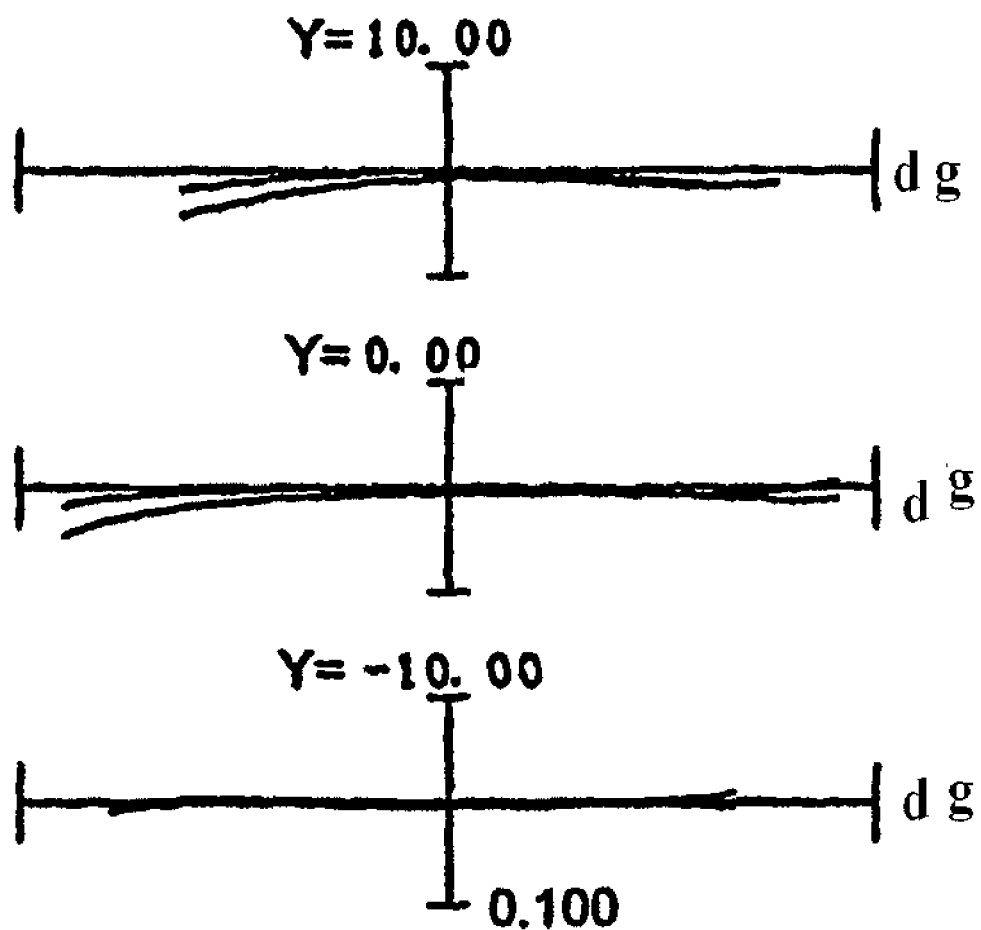
Figure 25A:
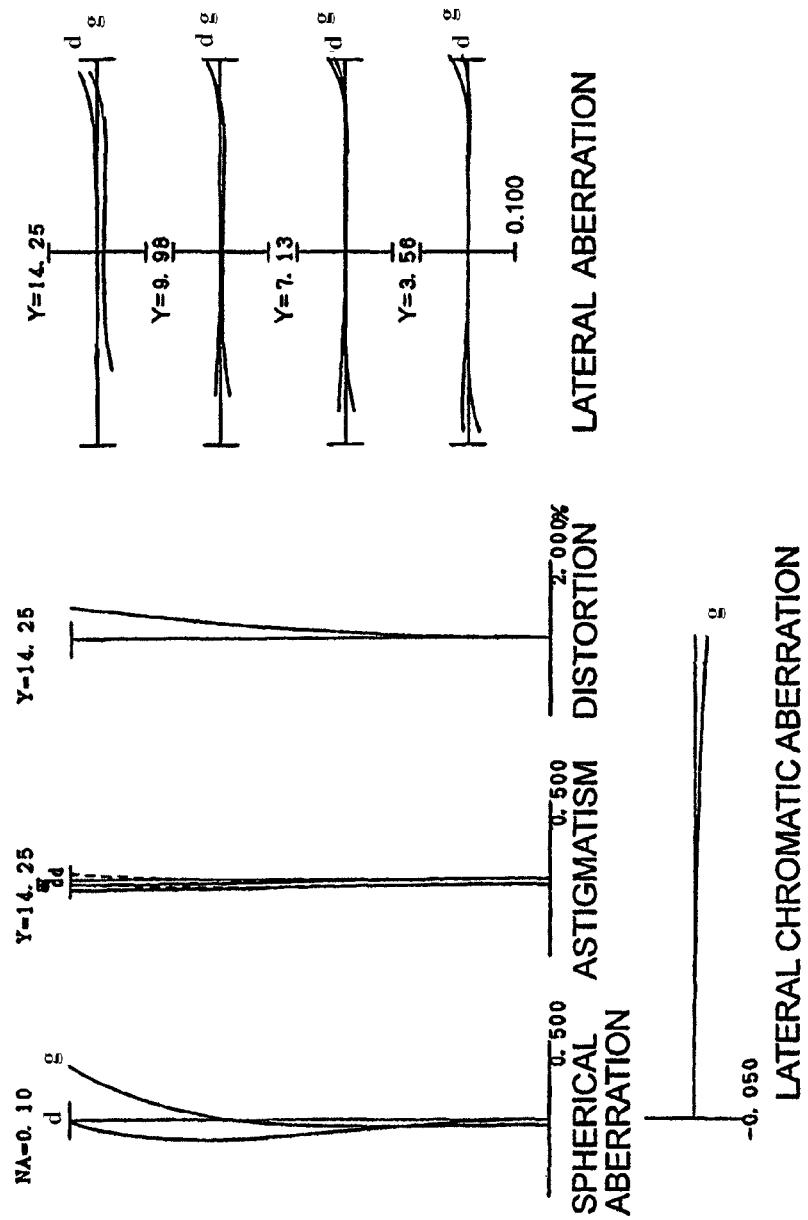
FIG. 25A are graphs showing various aberrations according to Example 6 upon focusing on close distance (photographing magnification −1.0 times), and FIG. 25B are graphs showing coma aberrations according to Example 6 when image blur correction is performed upon focusing on close distance.
Figure 25B:
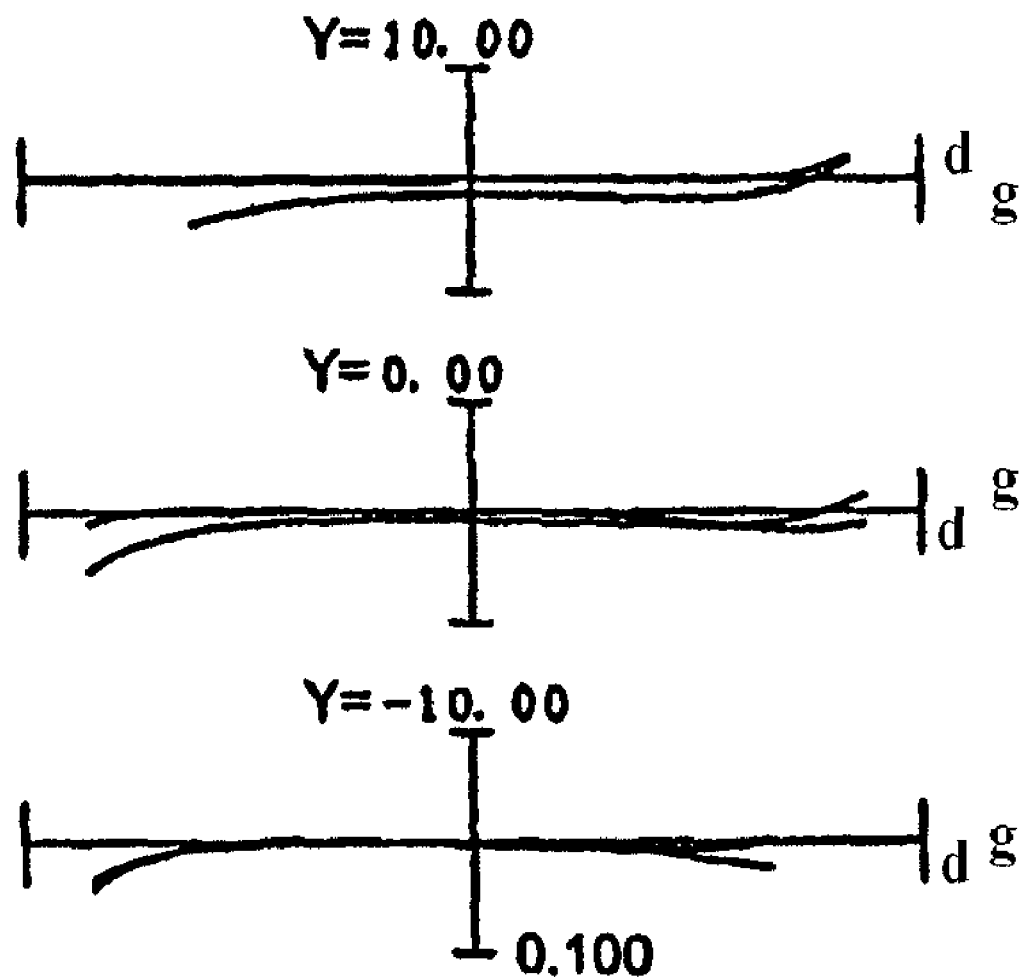

FIG. 23A are graphs showing various aberrations upon focusing on infinity according to Example 6, and FIG. 23B are graphs showing coma aberrations when image blur correction (shift amount of vibration proof group G4=−0.383) is performed upon focusing on infinity according to Example 6. FIG. 24A are graphs showing various aberrations upon focusing on close distance (magnification −0.7 times) according to Example 6, and FIG. 24B are graphs showing lateral aberrations when image blur correction (shift amount of vibration proof group G4=−0.553) is performed upon focusing on close distance according to Example 6. FIG. 25A are graphs showing various aberrations upon focusing on close distance (magnification 1.0 times) according to Example 6, and FIG. 25B are graphs showing lateral aberrations when image blur correction (shift amount of vibration proof group G4=−0.700) is performed upon focusing on close distance (magnification 1.0 times) according to Example 6.

As each of the graphs showing aberrations clarifies, in the imaging lens 1 according to Example 6, various aberrations are well corrected, and excellent image formation performance is implemented. Therefore by installing the imaging lens 1 of Example 6, excellent optical performance can be insured for a digital single-lens reflex camera CAM (optical device, see FIG. 1).

In the above embodiments and examples, the following content can be used within a scope without diminishing the optical performance.

In each of the examples described above, a fifth group configuration is used, but other groups configurations, such as a sixth group or seventh group, can be used. In concrete terms, a configuration where a lens or a lens group is added on the side closest to the object, or a configuration where a lens or a lens group is added to the side closest to the image, may be used. A lens or a lens group may be added between the third group (positive lens group G3) and the fourth group (negative lens group G4), but in this case, d34 is a minimum value of the distance between the lens surface closest to the image in the lens group disposed closest to the object of the fourth group, and the lens surface closest to the object of the fourth group. A negative lens group may be added between the fourth group and fifth group (positive lens group G5) to improve the vibration proof performance.

In the present embodiment, a single or a plurality of lens group(s) or a part of a lens group may be a focusing lens group which moves in the optical axis direction so as to perform focusing from an infinite object to a close distant object. This focusing lens group can be applied to auto focus, and is suitable for a motor drive (by an ultrasonic motor, for example) for auto focus.

In the present embodiment, the negative lens group that can move so as to have a movement component in a direction substantially vertical to the optical axis may move in a diagonal direction to the optical axis, instead of the vertical direction to the optical axis, or may oscillate with a point on the optical axis as a center of rotation.

In the present embodiment, the lens surface may be aspherical. The aspherical surface may be an aspherical surface created by grinding processing, a glass mold aspherical surface created by forming glass to be an aspherical shape using a die, or a composite aspherical surface created by forming resin in an aspherical shape on the surface of glass. The lens surface may be a diffraction surface, and the lens may be a refractive index distributed lens (GRIN lens) or a plastic lens.

In the present embodiment, it is preferable that the aperture stop S is fixed between the second group (negative lens group G2) and the third group (positive lens group G3), with respect to the image surface I during focusing, but the aperture stop may not be disposed, but can be replaced by a lens frame.

In the present embodiment, an anti-reflection film having high transmittance in a wide wavelength range may be formed on each lens surface so that flares and ghosts are decreased, and good optical performance with high contrast is implemented.

In the imaging lens 1 of the present embodiment, the focal length, converted to 35 mm film size, is about 100 to 135 mm.

In the present embodiment, it is preferable that the first group (positive lens group G1) has two positive lens components and one negative lens component. It is also preferable that the first group has the lens components in order of positive, positive and negative from the object, which are disposed with air distance therebetween. It is even more preferable to use a cemented lens for the negative lens components.

In the present embodiment, it is preferable that the third group (positive lens group G3) has two positive lens components. It is also preferable that the third group has the lens components in order of positive and positive from the object, which are disposed with air distance therebetween. It is even more preferable to use a cemented lens for the second positive lens component.

In the present embodiment, it is preferable that the fifth group (positive lens group G5) has one positive lens component and one negative lens component. It is preferable that the fifth group has the lens components in order of negative and positive in order from the object, which are disposed with air distance therebetween.

In the present embodiment, it is preferable that the fourth group (negative lens group G4) is comprised of one lens component. It is even more preferable to use a cemented lens for this lens component.

In order to assist in understanding the present invention, the present invention was described with composing requirements of the embodiments, but needless to say the present invention is not limited to this.

Camera Lens Manufacturing Method

Figure 26:
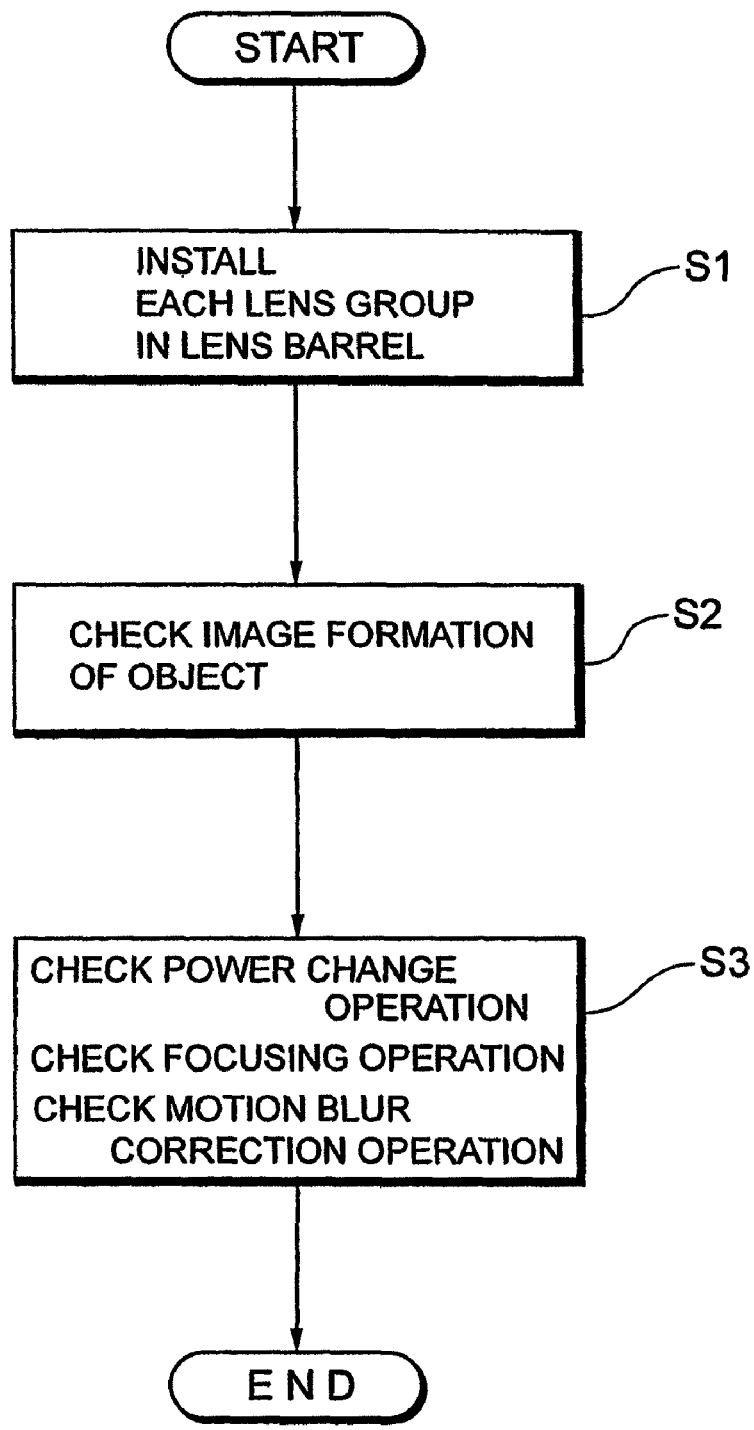
FIG. 26 is a flow chart depicting a manufacturing method for the imaging lens.

Now a method for manufacturing the imaging lens will be described with reference to FIG. 26.

First the positive lens group G1, negative lens group G2, positive lens group G3, negative lens group G4 and positive lens group G5 according to the present embodiment are installed in the cylindrical lens-barrel (step S1). When each lens group is installed in the lens-barrel, the lens groups may be installed in the lens-barrel one by one in sequence along the optical axis, or a part or all of the lens groups may be integrated and held by a holding element, and then installed in the lens-barrel. After each lens group is installed in the lens-barrel, it is preferable to check whether an image of the object is formed in a state where each lens group is installed in the lens-barrel (step S2).

After assembling the imaging lens, as mentioned above, various operations of the imaging lens are confirmed (step S3). Examples of various operations according to the present embodiment are the focusing operation, in which the negative lens group G2 and the positive lens group G3 which focus from a long distance object to a close distance object, moving along the optical axis, and motion blur operation, in which at least a part of the negative lens group G4 move so as to have components in a direction perpendicular to the optical axis. The sequence of confirming various operations is arbitrary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging lens, comprising at least a positive lens group, a negative lens group that moves during focusing, a positive lens group that moves toward an object during focusing from infinity to close distance, a negative lens group that is adapted to move so as to have a movement component in a direction substantially vertical to an optical axis, and a positive lens group, which are disposed in order from the object, wherein a condition of a following expression $$2.0 < (-f4)/d34 < 20.8$$

is satisfied, where
f4 is a focal length of the negative lens group that is adapted to move in a direction substantially vertical to an optical axis, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

2. The imaging lens according to claim 1, wherein a condition of the following expression $$1.0 < f5/d34 < 41.4$$

is satisfied, where
f5 is a focal length of the positive lens group which is disposed to an image side of the negative lens group that is adapted to move in a direction substantially vertical to the optical axis, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

3. The imaging lens according to claim 1, wherein a condition of the following expression $$1.0 < f3/d34 < 20.0$$

is satisfied, where
f3 is a focal length of the positive lens group that moves during focusing, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

4. The imaging lens according to claim 1, wherein a condition of the following expression $$1.0 < (-f2)/d34 < 17.0$$

is satisfied, where
f2 is a focal length of the negative lens group that moves during focusing, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

5. The imaging lens according to claim 1, wherein a condition of the following expression $$1.0 < f1/d34 < 23.0$$

is satisfied, where
f1 is a focal length of the positive lens group that is disposed closest to the object, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

6. The imaging lens according to claim 1, wherein the negative lens group that moves during focusing comprises a negative lens and a cemented lens formed by a negative lens and a positive lens, which are disposed in order from the object.

7. The imaging lens according to claim 1, wherein the negative lens group that moves during focusing comprises a single lens having a negative refractive power, and a cemented lens formed by a negative lens and a positive lens, which are disposed in order from the object, and a condition of the following expression $$-5.0<(rb+ra)/(rb-ra)<-1.0$$

is satisfied, where
ra is a radius of curvature of an object side surface of the single lens having the negative refractive power, and rb is a radius of curvature of an image side surface of the single lens having the negative refractive power.

8. The imaging lens according to claim 1, wherein a condition of the following expression $$1.48<N2nav<1.65$$

is satisfied, where
N2nav is an average refractive index with respect to the d-line of all the negative lenses included in the negative lens group that moves during focusing.

9. An optical apparatus in which the imaging lens according to claim 1 is installed.

10. The imaging lens according to claim 1, wherein the negative lens group that moves during focusing moves away from the object during focusing from infinity to close distance.

11. An imaging lens, comprising at least a positive lens group, a negative lens group that moves during focusing, a positive lens group that moves during focusing, a negative lens group that is adapted to move so as to have a movement component in a direction substantially vertical to an optical axis, and a positive lens group, which are disposed in order from an object side, wherein a condition of the following expression $$1.21<VR<3.0$$

is satisfied, where
VR is called a vibration proof coefficient, and the vibration proof coefficient is defined as $VR=|(1-Bvr)\times Br|$,
Bvr is a lateral magnification of the negative lens group that is adapted to move so as to have a movement component in a direction substantially vertical to the optical axis, Br is a lateral magnification of an entire optical system which is disposed closer to the image than the negative lens group that is adapted to move so as to have a movement component in a direction substantially vertical to the optical axis.

12. The imaging lens according to claim 11, wherein a condition of the following expression $$1.0<(-f4)/d34<20.0$$

is satisfied, where
f4 is a focal length of the negative lens that is adapted to move so as to have a movement component in a direction substantially vertical to the optical axis, and
d34 is an air distance on the optical axis upon focusing on infinity, between a lens surface disposed closest to the image side of a lens group which is disposed to the object side of the negative lens group that is adapted to move so as to have a movement component in a direction substantially vertical to the optical axis, and a lens surface disposed closest to the object side of the negative lens group that is adapted to move so as to have a movement component in a direction substantially vertical to the optical axis.

13. The imaging lens according to claim 11, wherein the positive lens group disposed closest to the object comprises a positive lens subgroup G1a and a negative lens subgroup G1b, wherein a condition of the following expression $$0.005<Da/Fo<0.09$$

is satisfied, where
Da is an air distance on the optical axis between the positive lens subgroup G1a and the negative lens subgroup G1b, and Fo is a focal length of the imaging lens upon focusing on infinity.

14. The imaging lens according to claim 11, wherein the negative lens group that moves during focusing comprises a negative lens subgroup G2a and a negative lens subgroup G2b, wherein
a condition of the following expression $$0.02<Db/Fo<0.08$$

is satisfied, where
Db is an air distance on the optical axis between the negative lens subgroup G2a and the negative lens subgroup G2b, and Fo is a focal length of the imaging lens upon focusing on infinity.

15. An optical apparatus in which the imaging lens according to claim 11 is installed.

16. A method for manufacturing an imaging lens, comprising steps of:
disposing a positive lens group, a negative lens group that moves during focusing, a positive lens group that moves toward an object during focusing from infinity to close distance, a negative lens group that is adapted to move so as to have a movement component in a direction substantially vertical to an optical axis, and a positive lens group, which are disposed in order from the object;
moving the negative lens group that moves during focusing and the positive lens group that moves during focusing, in the optical axis direction upon focusing from a long distant object to a close distant object; and
moving the negative lens group that is adapted to move in a direction substantially vertical to the optical axis, in a direction substantially vertical to the optical axis during blur correction for vibration proof, wherein a condition of a following expression $$2.0<(-f4)/d34<20.8$$

is satisfied,
where f4 is a focal length of the negative lens group that is adapted to move in a direction substantially vertical to the optical axis, and
d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

17. The method for manufacturing an imaging lens according to claim 16, wherein a condition of the following expression $$1.0 < f5/d34 < 41.4$$

is satisfied, where
- f5 is a focal length of the positive lens group which is disposed to an image side of the negative lens group that is adapted to move in a direction substantially vertical to the optical axis, and
- d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

18. The method for manufacturing an imaging lens according to claim 16, wherein a condition of the following expression $$1.0 < f3/d34 < 20.0$$

is satisfied, where
- f3 is a focal length of the positive lens group that moves during focusing, and
- d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

19. The method for manufacturing an imaging lens according to claim 16, wherein a condition of the following expression $$1.0 < (-f2)/d34 < 17.0$$

is satisfied, where
- f2 is a focal length of the negative lens group that moves during focusing, and
- d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

20. The method for manufacturing an imaging lens according to claim 16, wherein a condition of the following expression $$1.0 < f1/d34 < 23.0$$

is satisfied, where
- f1 is a focal length of the positive lens group that is disposed closest to the object, and
- d34 is an air distance on the optical axis upon focusing on infinity, between a lens surface disposed closest to the image side of a lens group which is disposed to the object side of the negative lens group that is adapted to move in a direction substantially vertical to the optical axis, and a lens surface disposed closest to the object side of the negative lens group that is adapted to move in a direction substantially vertical to the optical axis.

21. The method for manufacturing an imaging lens according to claim 16, wherein the negative lens group that moves during focusing comprises a negative lens and a cemented lens formed by a negative lens and a positive lens, which are disposed in order from the object.

22. The method for manufacturing an imaging lens according to claim 16, wherein the negative lens group that moves during focusing comprises a single lens having a negative refractive power, and a cemented lens formed by a negative lens and a positive lens, which are disposed in order from the object, and a condition of the following expression $$-5.0 < (rb + ra)/(rb - ra) \leq -1.0$$

is satisfied, where
- ra is a radius of curvature of an object side surface of the single lens having the negative refractive power, and rb is a radius of curvature of an image side surface of the single lens having the negative refractive power.

23. The method for manufacturing an imaging lens according to claim 16, wherein a condition of the following expression $$1.48 < N2nav < 1.65$$

is satisfied, where N2nav is an average refractive index with respect to the d-line of all the negative lenses included in the negative lens group that moves during focusing.

24. The method according to claim 16, wherein the negative lens group that moves during focusing moves away from the object during focusing from infinity to close distance.

25. A method for manufacturing an imaging lens, comprising steps of:
- disposing a positive lens group, a negative lens group that moves during focusing, a positive lens group that moves during focusing, a negative lens group that is adapted to move so as to have a movement component in a direction substantially vertical to an optical axis, and a positive lens group, which are disposed in order from an object;
- moving the negative lens group that moves during focusing and the positive lens group that moves during focusing, in the optical axis direction upon focusing from a long distant object to a short distant object; and
- moving the negative lens group that is adapted to move so as to have a moving component in a direction substantially vertical to the optical axis during motion blur correction, wherein
- a condition of the following expression $$1.21 < VR < 3.0$$

is satisfied, where
- VR is called a vibration proof coefficient, and the vibration proof coefficient is defined as VR=|(1−Bvr)×Br |,
- Bvr is a lateral magnification of the negative lens group that is adapted to move so as to have a movement component in a direction substantially vertical to the optical axis, Br is a lateral magnification of an entire optical system which is disposed closer to the image than the negative lens group that is adapted to move so as to have a movement component in a direction substantially vertical to the optical axis.

26. The method for manufacturing an imaging lens according to claim 25, wherein a condition of the following expression $$1.0 < (-f4)/d34 < 20.0$$

is satisfied, where
- f4 is a focal length of the negative lens group that is adapted to move so as to have a movement component in a direction substantially vertical to the optical axis, and d34 is an air distance on the optical axis upon focusing on infinity, between a lens surface disposed closest to the image side of a lens group which is disposed to the object side of the negative lens group that is adapted to move so as to have a movement component in a direction substantially vertical to the optical axis, and a lens surface disposed closest to the object side of the negative lens group that is adapted to move so as to have a movement component in a direction substantially vertical to the optical axis.

27. The method for manufacturing an imaging lens according to claim 25, wherein the positive lens group disposed closest to the object comprises a positive lens subgroup G1$a$ and a negative lens subgroup G1$b$, which are disposed in order from the object, and a condition of the following expression $$0.005 < Da/Fo < 0.09$$

is satisfied, where

Da is an air distance on the optical axis between the positive lens subgroup G1$a$ and the negative lens subgroup G1$b$, and Fo is a focal length of the imaging lens upon focusing on infinity.

28. The method for manufacturing an imaging lens according to claim 25, wherein the negative lens group that moves during focusing comprises a negative lens subgroup G2$a$ and a negative lens subgroup G2$b$, which are disposed in order from the object, and a condition of the following expression $$0.02 < Db/Fo < 0.08$$

is satisfied, where

Db is an air distance on the optical axis between the negative lens subgroup G2$a$ and the negative lens subgroup G2$b$, and Fo is a focal length of the imaging lens upon focusing on infinity.

* * * * *